(12) United States Patent
Paulsen

(10) Patent No.: US 11,428,812 B2
(45) Date of Patent: Aug. 30, 2022

(54) LIDAR SYSTEM WITH RANGE-AMBIGUITY MITIGATION

(71) Applicant: Luminar LLC, Orlando, FL (US)

(72) Inventor: David L. Paulsen, Mountain View, CA (US)

(73) Assignee: Luminar, LLC, Orlando, FL (US)

( * ) Notice: Subject to any disclaimer, the term of this patent is extended or adjusted under 35 U.S.C. 154(b) by 686 days.

(21) Appl. No.: 16/456,504

(22) Filed: Jun. 28, 2019

(65) Prior Publication Data

US 2020/0284908 A1 Sep. 10, 2020

Related U.S. Application Data

(60) Provisional application No. 62/834,086, filed on Apr. 15, 2019, provisional application No. 62/815,042, filed on Mar. 7, 2019.

(51) Int. Cl.

| | |
|---|---|
| *G01S 17/10* | (2020.01) |
| *G01S 17/89* | (2020.01) |
| *G01S 7/481* | (2006.01) |
| *G01S 7/4861* | (2020.01) |
| *G01S 7/48* | (2006.01) |
| *G01S 7/486* | (2020.01) |

(52) U.S. Cl.
CPC ............. *G01S 17/10* (2013.01); *G01S 7/481* (2013.01); *G01S 7/486* (2013.01); *G01S 7/4808* (2013.01); *G01S 7/4861* (2013.01); *G01S 17/89* (2013.01)

(58) Field of Classification Search
CPC ........ G01S 17/10; G01S 7/4808; G01S 7/481; G01S 7/486; G01S 7/4861; G01S 17/89; G01S 7/4865; G01S 17/42
See application file for complete search history.

(56) References Cited

U.S. PATENT DOCUMENTS

| | | |
|---|---|---|
| 4,694,300 A | 9/1987 | McRoberts et al. |
| 7,151,483 B2 | 12/2006 | Dizaji et al. |
| 9,952,323 B2 | 4/2018 | Deane |
| 10,132,616 B2 | 11/2018 | Wang |
| 10,250,883 B2 | 4/2019 | Wang et al. |
| 10,401,480 B1* | 9/2019 | Gaalema ............... G01S 7/4816 |
| 2006/0061772 A1 | 3/2006 | Kulawiec et al. |
| 2019/0018119 A1 | 1/2019 | Laifenfeld et al. |

(Continued)

OTHER PUBLICATIONS

Monson et al. "Characterization of Scannerless Ladar," SPIE vol. 3707, Apr. 1999, pp. 409-420.

(Continued)

*Primary Examiner* — Nam D Pham

(57) ABSTRACT

In one embodiment, a lidar system includes a light source configured to emit multiple optical signals directed into a field of regard of the lidar system. The optical signals include: a first optical signal; a second optical signal emitted a first time period $\tau_1$ after the first optical signal; and a third optical signal emitted a second time period $\tau_2$ after the second optical signal, where $\tau_2$ is different from $\tau_1$. The lidar system also includes a receiver configured to detect a first input optical signal and a second input optical signal. The first and second input optical signals each include light from one of the emitted optical signals that is scattered by a target located a distance from the lidar system.

30 Claims, 28 Drawing Sheets

(56) References Cited

U.S. PATENT DOCUMENTS

2019/0207706 A1 7/2019 Fireaizen et al.
2019/0277970 A1 9/2019 Deane

OTHER PUBLICATIONS

Ponsford et al., "HF Surface Wave radar Operation in Adverse Conditions," IEEE, Radar 2003, pp. 593-598.
Non-Final Office Action dated Sep. 24, 2019 for U.S. Appl. No. 16/456,622.

* cited by examiner

LIDAR SYSTEM WITH RANGE-AMBIGUITY MITIGATION

PRIORITY

This application claims the benefit, under 35 U.S.C. § 119(e), of U.S. Provisional Patent Application No. 62/815,042, filed 7 Mar. 2019, and U.S. Provisional Patent Application No. 62/834,086, filed 15 Apr. 2019, both of which are incorporated herein by reference.

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

DESCRIPTION OF EXAMPLE EMBODIMENTS

Figure 1:
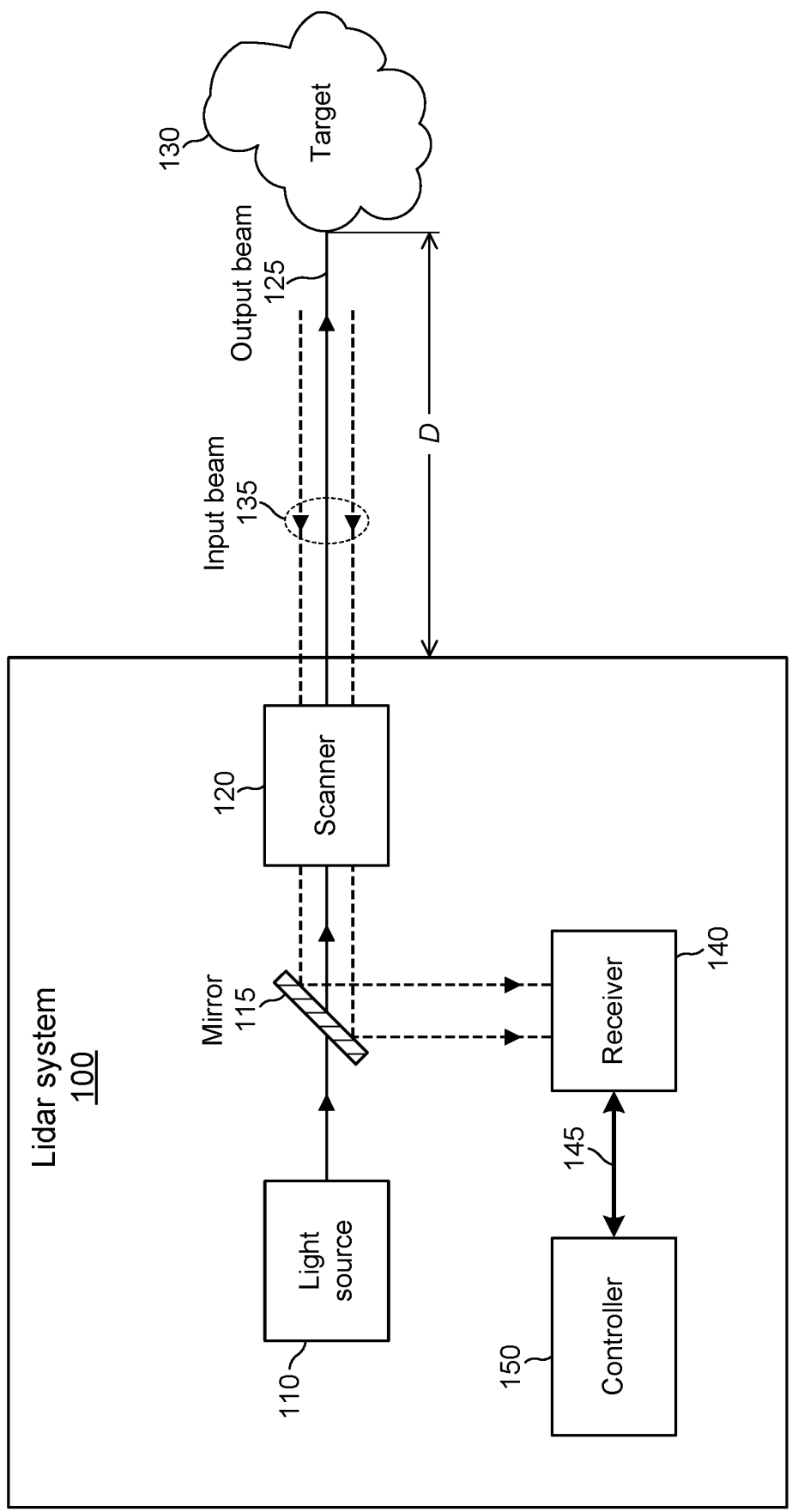
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (µJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may include or may be referred to as an optical signal, output optical signal, emitted optical signal, laser beam, light beam, optical beam, emitted beam, emitted light, or beam. In particular embodiments, input beam 135 may include or may be referred to as a received optical signal, input optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D=c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 µs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 80 kHz to 10 MHz or a pulse period (e.g., a time between consecutive pulses) of approximately 100 ns to 12.5 µs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 µs. As another example, light source 110 may have a pulse repetition frequency (which may be referred to as a repetition rate) that can be varied from approximately 200 kHz to 2 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 µJ, 0.1 µJ, 0.5 µJ, 1 µJ, 2 µJ, 10 µJ, 100 µJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E = P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 µJ has a peak power of approximately 1 kW. The average power ($P_{av}$) of an output beam 125 can be related to the pulse repetition frequency (PRF) and pulse energy by the expression $P_{av} = PRF \cdot E$. For example, if the pulse repetition frequency is 500 kHz, then the average power of an output beam 125 with 1-µJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive light from the seed laser diode and amplify the light as it propagates through the waveguide. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by a SOA, which in turn is followed by a fiber-optic amplifier. For example, the seed laser diode may produce relatively low-power seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a $\Theta$-degree rotation by a scanning mirror results in a $2\Theta$-degree angular scan of output beam 125).

In particular embodiments, a scanning mirror may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 1° to 30° angular range. As another example, a scanner 120 may include a scanning mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, or AlInAsSb (aluminum indium arsenide antimonide). The active region may refer to an area over which a detector may receive or detect input light. An active region may have any suitable size or diameter, such as for example, a diameter of approximately 10 μm, 25 μm, 50 μm, 80 μm, 100 μm, 200 μm, 500 μm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 250 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time τ between the emission of successive optical signals by the expression $R_{OP}=c·τ/2$. For a lidar system 100 with a 200-m operating range ($R_{OP}$=200 m), the time τ between successive pulses (which may be referred to as a pulse period, a pulse repetition interval (PM), or a time period between pulses) is approximately $2·R_{OP}/c≅1.33$ μs. The pulse period τ may also correspond to the time of flight for a pulse to travel to and from a target 130 located a distance $R_{OP}$ from the lidar system 100. Additionally, the pulse period τ may be related to the pulse repetition frequency (PRF) by the expression τ=1/PRF. For example, a pulse period of 1.33 μs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5×10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, or emitted light) may include pulses of light, CW light, amplitude-modulated light, frequency-modulated light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may include a light source 110 configured to produce pulses of light. Alternatively, a lidar system 100 may be configured to operate as a frequency-modulated continuous-wave (FMCW) lidar system and may include a light source 110 configured to produce CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered by the remote target) relative to the modulation frequency of the emitted light. A round-trip time for the emitted light to travel to a target 130 and back to the lidar system may correspond to a frequency difference between the received scattered light and a portion of the emitted light.

For example, for a linearly chirped light source (e.g., a frequency modulation that produces a linear change in frequency with time), the larger the frequency difference between the emitted light and the received light, the farther away the target 130 is located. The frequency difference may be determined by mixing the received light with a portion of the emitted light (e.g., by coupling the two beams onto a detector, or by mixing analog electric signals corresponding to the received light and the emitted light) and determining the resulting beat frequency. For example, an electrical signal from an APD may be analyzed using a fast Fourier transform (FFT) technique to determine the frequency difference between the emitted light and the received light. If a linear frequency modulation m (e.g., in units of Hz/s) is applied to a CW laser, then the round-trip time T may be related to the frequency difference between the received scattered light and the emitted light $\Delta f$ by the expression $T=\Delta f/m$. Additionally, the distance D from the target 130 to the lidar system 100 may be expressed as $D=c \cdot \Delta f/(2m)$, where c is the speed of light. For example, for a light source 110 with a linear frequency modulation of $10^{12}$ Hz/s (or, 1 MHz/μs), if a frequency difference (between the received scattered light and the emitted light) of 330 kHz is measured, then the distance to the target is approximately 50 meters (which corresponds to a round-trip time of approximately 330 ns). As another example, a frequency difference of 1.33 MHz corresponds to a target located approximately 200 meters away.

The light source 110 for a FMCW lidar system may be a fiber laser (e.g., a seed laser diode followed by one or more optical amplifiers) or a direct-emitter laser diode. The seed laser diode or the direct-emitter laser diode may be operated in a CW manner (e.g., by driving the laser diode with a substantially constant DC current), and the frequency modulation may be provided by an external modulator (e.g., an electro-optic phase modulator). Alternatively, the frequency modulation may be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) may have any suitable frequency or shape (e.g., piecewise linear, sinusoidal, triangle-wave, or sawtooth).

Figure 2:
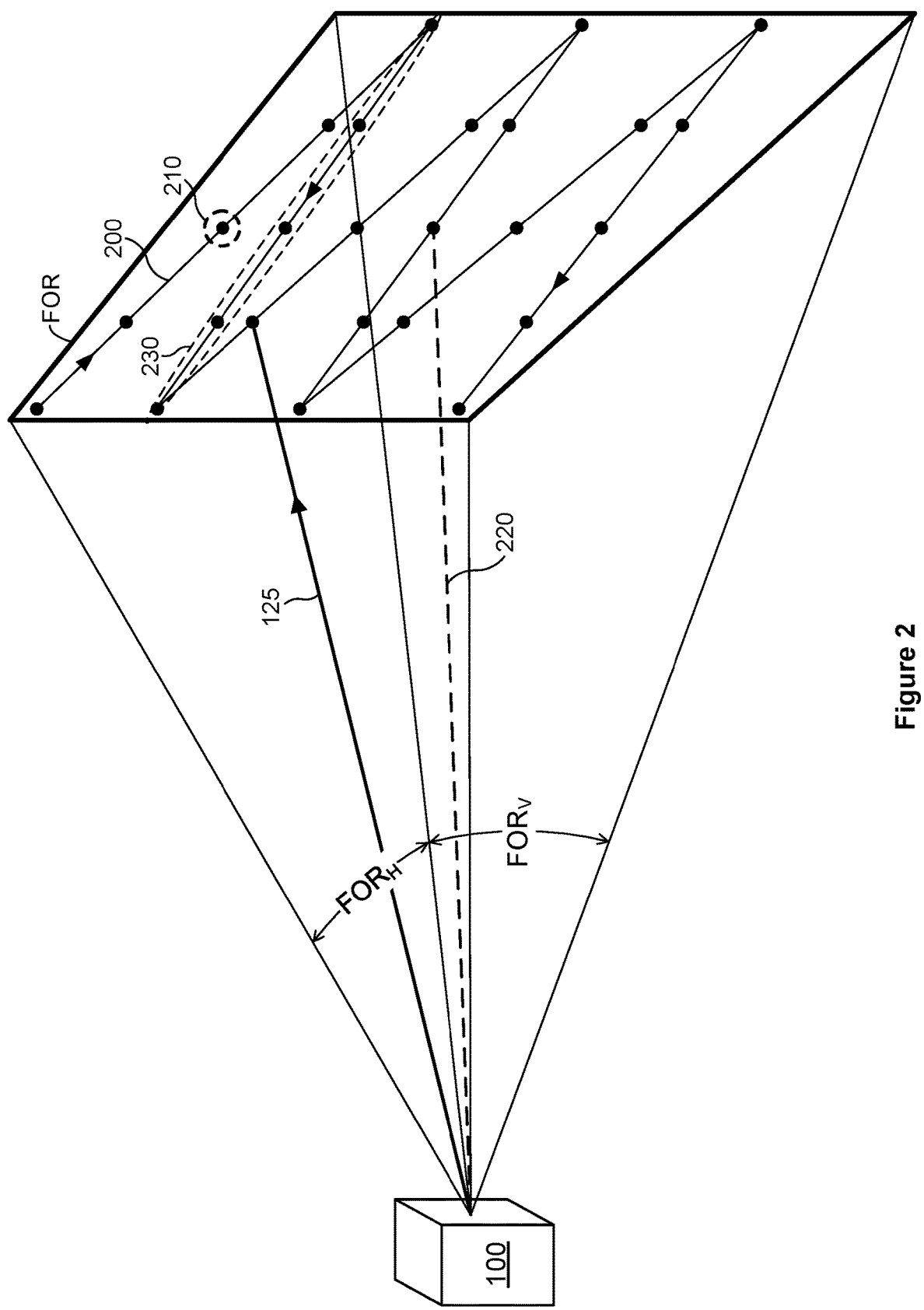
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a FOR of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
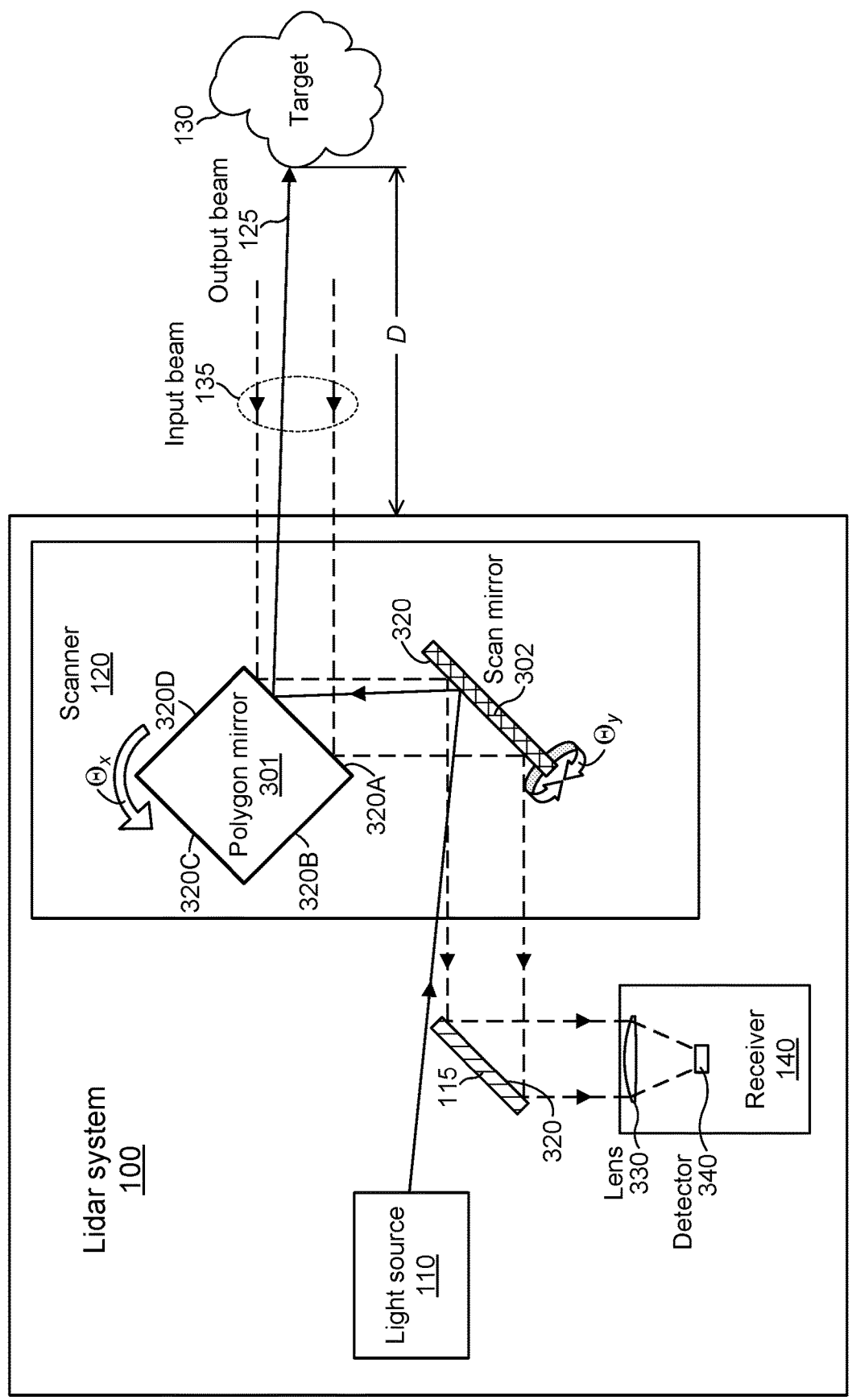
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the $\Theta_x$ direction and (2) a scanning mirror 302 that oscillates back and forth along the $\Theta_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

Figure 4:
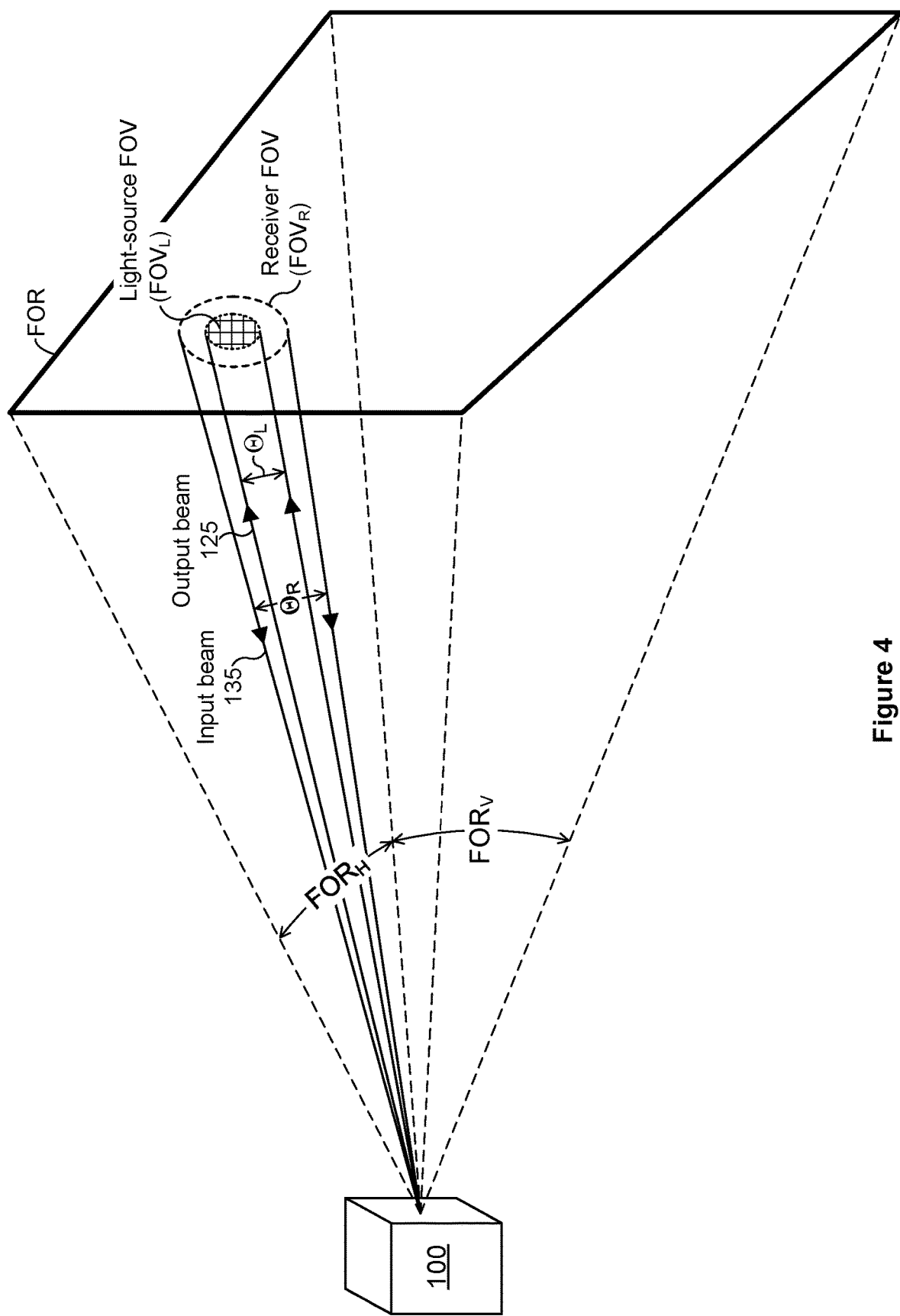
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
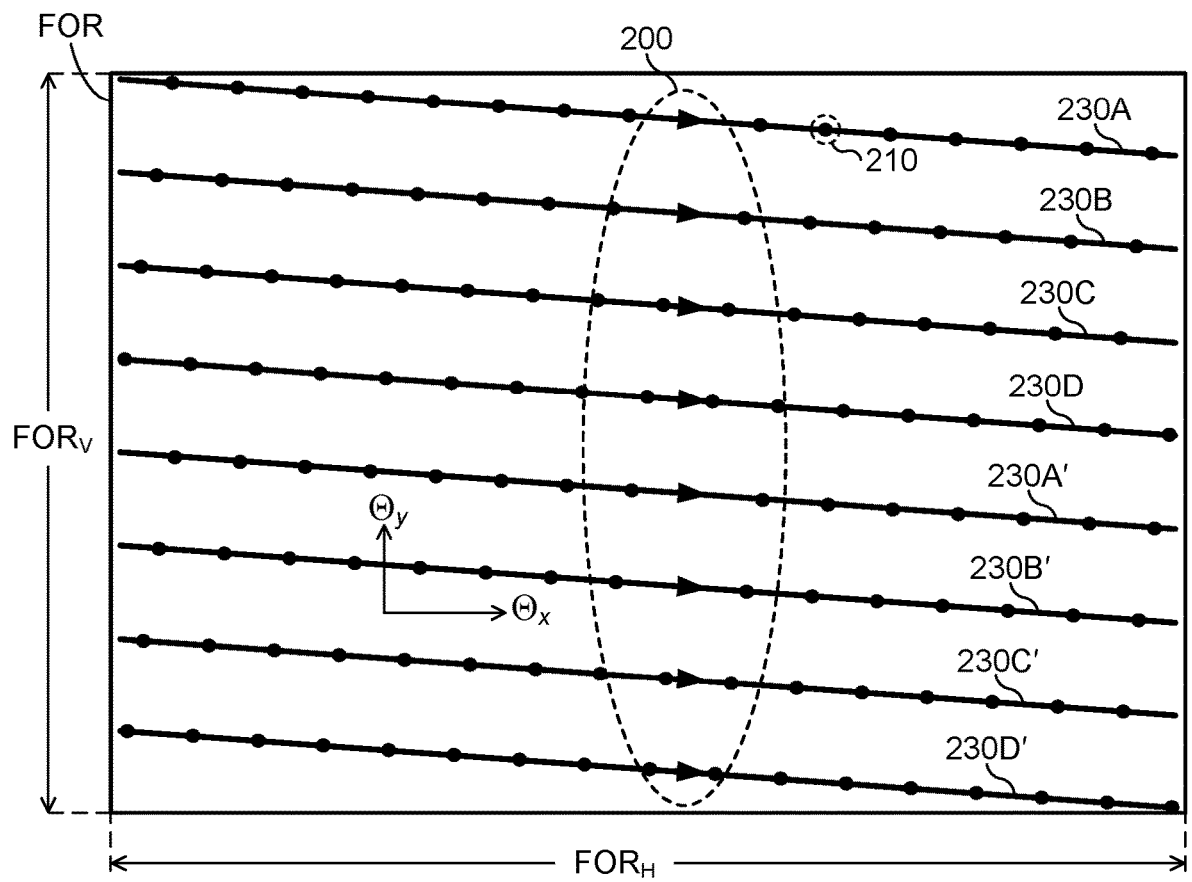
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
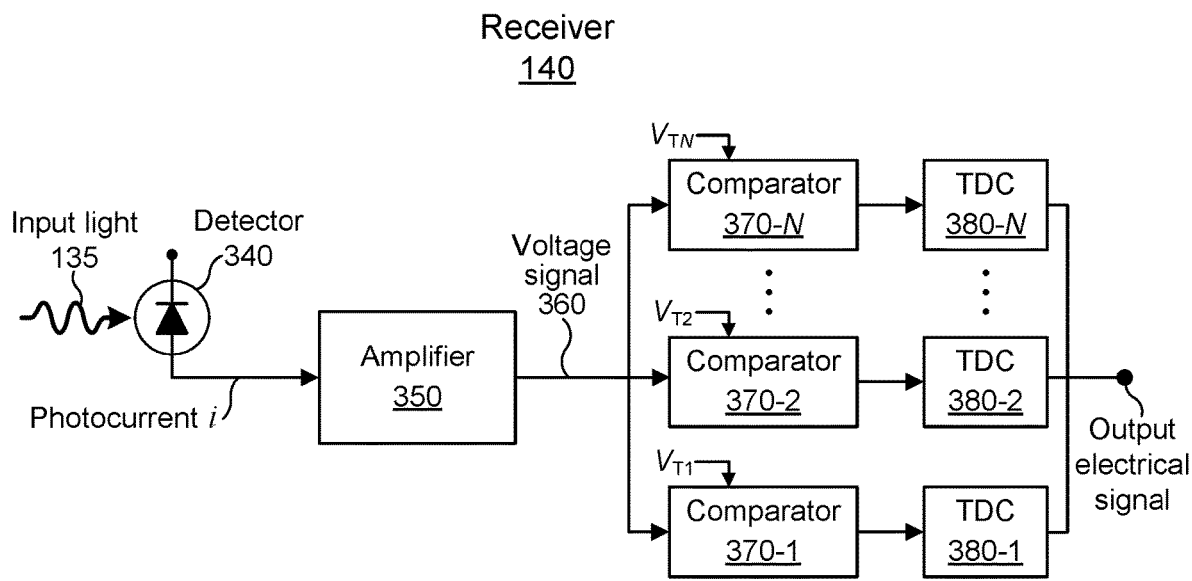
FIG. 6 illustrates an example receiver.

FIG. 6 illustrates an example receiver 140. In particular embodiments, a receiver 140 of a lidar system 100 may include one or more detectors 340, one or more amplifiers 350, or one or more comparators 370. Additionally, a receiver 140 may include one or more time-to-digital converters (TDCs) 380 associated with each of the comparators 370. A light source 110 of a lidar system 100 may emit an optical signal, and a receiver 140 may be configured to detect a received optical signal (e.g., input light 135) that includes a portion of the emitted optical signal that is scattered by a remote target 130.

The example receiver 140 illustrated in FIG. 6 includes a detector 340 configured to receive an input optical signal (input light 135) and produce a photocurrent i that corresponds to the received optical signal. The detector 340 may include an APD, PN photodiode, or PIN photodiode, and the photocurrent i produced by the detector 340 may be referred to as a photocurrent signal or an electrical-current signal. The detector 340 may include a silicon APD configured to detect light at an 800-1100 nm operating wavelength of a lidar system 100 or an InGaAs APD configured to detect light at a 1200-1600 nm operating wavelength. In FIG. 6, the detector 340 is coupled to an electronic amplifier 350 configured to receive the photocurrent i and produce a voltage signal 360 that corresponds to the received photocurrent. For example, the detector 340 may be an APD that produces a pulse of photocurrent in response to detecting an input optical pulse, and the voltage signal 360 may be an analog voltage pulse that corresponds to the pulse of photocurrent. The amplifier 350 may include a transimpedance amplifier configured to receive the photocurrent i and produce a voltage signal that corresponds to the photocurrent signal. Additionally, the amplifier 350 may include a voltage amplifier that amplifies the voltage signal or an electronic filter (e.g., a low-pass filter) that filters the photocurrent or the voltage signal.

In FIG. 6, the voltage signal 360 produced by the amplifier 350 is coupled to N comparators (comparators 370-1, 370-2, . . . , 370-N), and each comparator is supplied with a particular threshold or reference voltage ($V_{T1}$, $V_{T2}$, . . . , $V_{TN}$). For example, receiver 140 may include N=10 comparators, and the threshold voltages may be set to 10 values between 0 volts and 1 volt (e.g., $V_{T1}$=0.1 V, $V_{T2}$=0.2 V, and $V_{T10}$=1.0 V). A comparator may produce an edge signal (e.g., a rising or falling electrical edge) when the voltage signal 360 rises above or falls below a particular threshold voltage. For example, comparator 370-2 may produce a rising edge when the voltage signal 360 rises above the threshold voltage $V_{T2}$. Additionally or alternatively, comparator 370-2 may produce a falling edge when the voltage signal 360 falls below the threshold voltage $V_{T2}$.

The receiver 140 in FIG. 6 includes N time-to-digital converters (TDCs 380-1, 380-2, . . . , 380-N), and each comparator is coupled to one of the TDCs. Each TDC may act as a timer that produces an output electrical signal (e.g., a digital signal, a digital word, or a digital value) that represents a time when an edge signal is received from a comparator. For example, if the voltage signal 360 rises above the threshold voltage $V_{T1}$, then the comparator 370-1 may produce an edge signal that is supplied to the input of TDC 380-1, and the TDC 380-1 may produce a digital value corresponding to a time when the edge signal was received by TDC 380-1. The digital time value may be referenced to the time when a pulse of light is emitted, and the digital time value may correspond to a round-trip time for the pulse of light to travel to a target 130 and back to the lidar system 100. Each comparator-TDC pair in FIG. 6 (e.g., comparator 370-1 and TDC 380-1) may be referred to as a threshold detector.

In FIG. 6, the amplifier 350, comparators 370, and TDCs 380 together may be referred to as a pulse-detection circuit. For example, if an input light signal 135 includes an optical pulse, a pulse-detection circuit may receive an electrical-current pulse (photocurrent i) from detector 340 and produce an output electrical signal that corresponds to the received optical pulse. In particular embodiments, an output electrical signal produced by a receiver 140 may be a digital signal that corresponds to an input light signal 135. For example, the output electrical signal may be a digital signal that corresponds to the analog voltage signal 360, which in turn corresponds to the photocurrent signal i, which in turn corresponds to the input light signal 135. As another example, the output electrical signal may include a series of digital values that represent the analog voltage signal 360, and the analog voltage signal 360 may in turn correspond to the photocurrent signal i, which in turn corresponds to the input light signal 135. The output electrical signal in FIG. 6 may correspond to electrical signal 145 in FIG. 1.

In particular embodiments, an output electrical signal may include one or more digital values that each correspond to a time interval between (1) a time when an optical signal 125 is emitted and (2) a time when an input light signal 135 is received by a receiver 140. The output electrical signal in FIG. 6 may include digital values from each of the TDCs that receive an edge signal from a comparator, and each digital value may represent a time interval between the emission of an optical pulse by a light source 110 and the receipt of an edge signal from a comparator. For example, a light source 110 may emit a pulse of light that is scattered by a target 130, and a receiver 140 may receive a portion of the scattered pulse of light as an input optical signal 135. The TDCs in the receiver 140 may be reset to zero counts, and when the light source 110 emits the pulse of light, the TDCs may begin to accumulate counts that correspond to elapsed time (e.g., the TDCs may count in terms of clock cycles or some fraction of clock cycles). When TDC 380-1 receives an edge signal from comparator 370-1, the TDC 380-1 may stop accumulating time counts and may produce a digital signal that represents the time interval between emission of the optical pulse and receipt of the edge signal. For example, the digital signal may include a digital value that corresponds to the number of clock cycles that elapsed between emission of the optical pulse and receipt of the edge signal. Alternatively, the TDCs in receiver 140 may accumulate counts continuously over two or more pulse periods (e.g., the TDCs may accumulate counts for a time corresponding to the emission of approximately 10, 100, 1,000, 10,000, or 100,000 pulses). When a pulse of light is emitted, the TDC count may be stored in memory, and when a TDC receives a subsequent edge signal from a comparator, the count of that TDC may also be stored in memory. The output electrical signal may include digital values corresponding to one or more times when pulses of light were emitted and one or more times when a TDC received an edge signal. The output electrical signal from the TDCs may correspond to the input light signal 135 detected by the detector 340 and may include the digital values from each of the TDCs that receive an edge signal from a comparator. The output electrical signal may be sent to a controller 150, and the controller may determine the distance to the target 130 based at least in part on the output electrical signal. Additionally or alternatively, the controller 150 may determine an optical characteristic of the input light signal 135 based at least in part on the output electrical signal received from the TDCs.

In particular embodiments, a receiver 140 of a lidar system 100 may include one or more analog-to-digital converters (ADCs). As an example, instead of including multiple comparators and TDCs, a receiver 140 may include an ADC that receives a voltage signal 360 from amplifier 350 and produces a digitized output electrical signal corresponding to the voltage signal 360. Although this disclosure describes or illustrates example receivers 140 that include one or more comparators 370 and one or more TDCs 380, a receiver 140 may additionally or alternatively include one or more ADCs. As an example, in FIG. 6, instead of the N comparators 370 and N TDCs 380, the receiver 140 may include an ADC configured to receive the voltage signal 360 and provide an output electrical signal that includes digitized values that correspond to the voltage signal 360.

Figure 7:
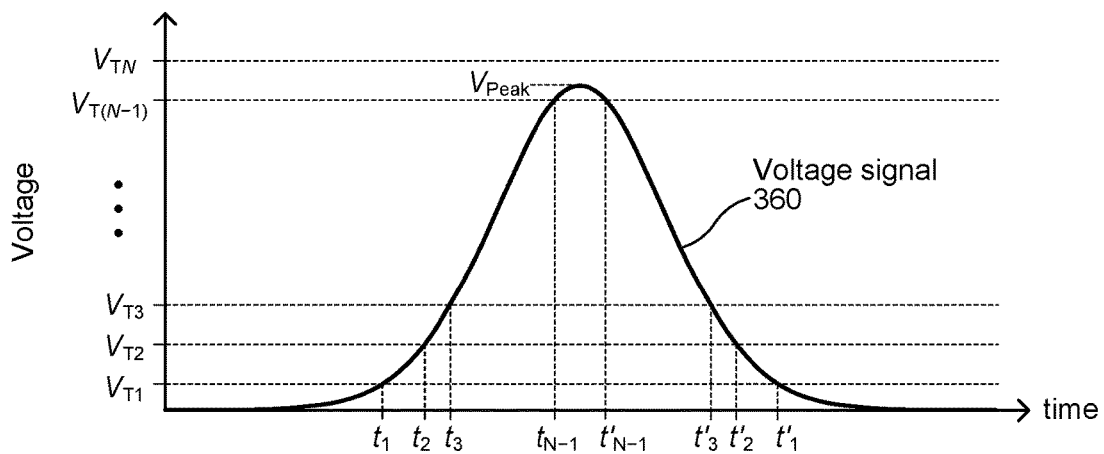
FIG. 7 illustrates an example voltage signal corresponding to a received optical signal.

FIG. 7 illustrates an example voltage signal 360 corresponding to a received optical signal 135. The voltage signal 360 illustrated in FIG. 7 may be an analog signal produced by an electronic amplifier 350 and may correspond to a pulse of light detected by the receiver 140 in FIG. 6. The voltage levels on the y-axis correspond to the threshold voltages $V_{T1}$, $V_{T2}$, . . . , $V_{TN}$ of the respective comparators 370-1, 370-2, . . . , 370-N. The time values $t_1$, $t_2$, $t_3$, . . . , $t_{N-1}$ correspond to times when the voltage signal 360 exceeds the corresponding threshold voltages, and the time values $t'_1$, $t'_2$, $t'_3$, . . . , $t'_{N-1}$ correspond to times when the voltage signal 360 falls below the corresponding threshold voltages. For example, at time $t_1$ when the voltage signal 360 exceeds the threshold voltage $V_{T1}$, comparator 370-1 may produce an edge signal, and TDC 380-1 may output a digital value corresponding to the time $t_1$. Additionally, the TDC 380-1 may output a digital value corresponding to the time $t'_1$ when the voltage signal 360 falls below the threshold voltage $V_{T1}$. Alternatively, the receiver 140 may include an additional TDC (not illustrated in FIG. 6) configured to produce a digital value corresponding to time $t'_1$ when the voltage signal 360 falls below the threshold voltage $V_{T1}$. The output electrical signal from receiver 140 may include one or more digital values that correspond to one or more of the time values $t_1$, $t_2$, $t_3$, . . . , $t_{N-1}$ and $t'_1$, $t'_2$, $t'_3$, . . . , $t'_{N-1}$. Additionally, the output electrical signal may also include one or more values corresponding to the threshold voltages associated with the time values. Since the voltage signal 360 in FIG. 7 does not exceed the threshold voltage $V_{TN}$, the corresponding comparator 370-N may not produce an edge signal. As a result, TDC 380-N may not produce a time value, or TDC 380-N may produce an output electrical signal indicating that no edge signal was received.

In particular embodiments, an output electrical signal produced by a receiver 140 may correspond to or may be used to determine an optical characteristic of a received optical signal detected by the receiver 140. An optical characteristic may correspond to a peak optical intensity of a received optical signal, a peak optical power of a received optical signal, an average optical power of a received optical signal, an optical energy of a received optical signal (e.g., the energy of a received optical pulse), a temporal duration of a received optical signal (e.g., the temporal duration of a received optical pulse), a shape or amplitude of a received optical signal (e.g., the temporal shape of a received optical pulse), or a center of a received optical signal (e.g., a time associated with a temporal center of a received optical pulse). For example, an optical pulse detected by receiver 140 may have one or more of the following optical characteristics: a peak optical power of between 1 nanowatt and 10 watts; a pulse energy of between 1 attojoule and 10 nanojoules; and a pulse duration of between 0.1 ns and 50 ns. In particular embodiments, an optical characteristic of a received optical signal may be determined from an output electrical signal provided by one or more TDCs 380 of a receiver 140 (e.g., as illustrated in FIG. 6), or an optical characteristic may be determined from an output electrical signal provided by one or more ADCs of a receiver 140.

In particular embodiments, a peak optical power or peak optical intensity of a received optical signal may be determined from one or more values of an output electrical signal provided by a receiver 140. As an example, a controller 150 may determine the peak optical power of an input optical pulse 135 based on a peak voltage ($V_{peak}$) of the voltage signal 360. The controller 150 may use a formula or lookup table that correlates a peak voltage of the voltage signal 360 with a peak optical power of a received optical signal. In the example of FIG. 7, the peak optical power of an input optical pulse may be determined from the threshold voltage $V_{T(N-1)}$, which is approximately equal to the peak voltage $V_{peak}$ of the voltage signal 360 (e.g., the threshold voltage $V_{T(N-1)}$ may be associated with an input optical pulse 135 having a peak optical power of 10 mW). As another example, a controller 150 may apply a curve-fit or interpolation operation to the values of an output electrical signal to determine the peak voltage of the voltage signal 360, and then this peak voltage may be used to determine the peak optical power of an input optical pulse.

In particular embodiments, an energy of a received optical signal may be determined from one or more values of an output electrical signal. For example, a controller 150 may perform a summation of digital values that correspond to a voltage signal 360 to determine an area under the voltage-signal curve, and the area under the voltage-signal curve may be correlated with a pulse energy of an input optical pulse 135. As an example, the approximate area under the voltage-signal curve in FIG. 7 may be determined by subdividing the curve into M subsections (where M is approximately the number of time values included in the output electrical signal) and adding up the areas of each of the subsections (e.g., using a numerical integration technique such as a Riemann sum, trapezoidal rule, or Simpson's rule). For example, the approximate area A under the voltage-signal curve 360 in FIG. 7 may be determined from a Riemann sum using the expression $A=\Sigma_{k=1}^{M} V_{Tk} \times \Delta t_k$, where $V_{Tk}$ is a threshold voltage associated with the time value $t_k$, and $\Delta t_k$ is a width of the subsection associated with time value $t_k$. In the example of FIG. 7, the voltage signal 360 may correspond to a received optical pulse with a pulse energy of 1 picojoule.

In particular embodiments, a duration of a received optical signal may be determined from a duration or width of a corresponding voltage signal 360. For example, the difference between two time values of an output electrical signal may be used to determine a duration of an optical pulse. In the example of FIG. 7, the duration of the optical signal corresponding to voltage signal 360 may be determined from the difference ($t'_3-t_3$), which may correspond to a received optical pulse with a pulse duration of 2 nanoseconds. One or more of the approaches for determining an optical characteristic of a received optical signal as described above may be implemented using a receiver 140 that includes multiple comparators 370 and TDCs 380 (as illustrated in FIG. 6) or using a receiver 140 that includes one or more ADCs.

Figure 8:
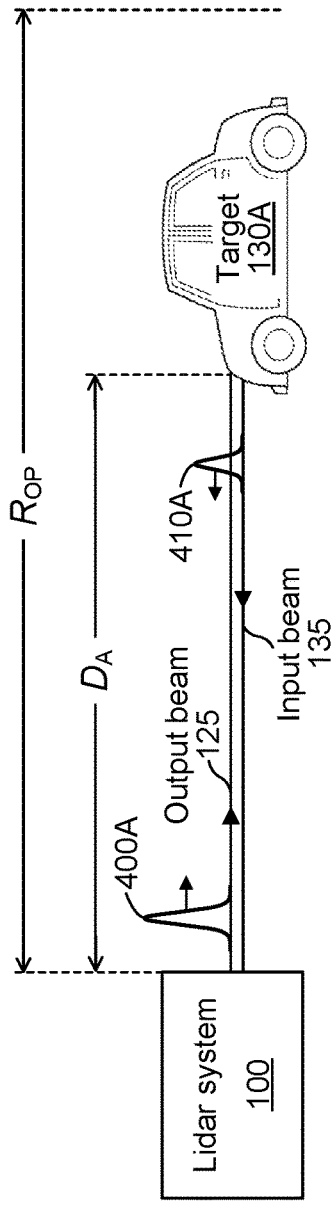
FIG. 8 illustrates an example lidar system and a target that is located within an operating range of the lidar system.

FIG. 8 illustrates an example lidar system 100 and a target 130A that is located within an operating range ($R_{OP}$) of the lidar system 100. For example, the distance DA to the target 130A may be 150 m, and $R_{OP}$ may be 200 m. In particular embodiments, a lidar system 100 may include a light source 110 configured to emit multiple pulses of light that are directed into a field of regard of the lidar system 100. The lidar system 100 in FIG. 8 emits an output beam 125 that includes an optical pulse 400A. The optical pulse 400A propagates to a target 130A located a distance $D_A$ from the lidar system, where $D_A$ is less than the operating range $R_{OP}$. The optical pulse 400A is scattered by the target 130A, and a portion of the scattered light propagates back to the lidar system 100 as input beam 135. The input beam 135 includes optical pulse 410A which includes a portion of the optical pulse 400A emitted by the lidar system 100 and scattered by the target 130A. The lidar system 100 may include a receiver 140 that detects the received optical pulse 410A. Additionally, the lidar system 100 may include a controller 150 that determines the distance $D_A$ to the target 130A based on the time interval between emission of the optical pulse 400A and detection of the optical pulse 410A.

Figure 9:
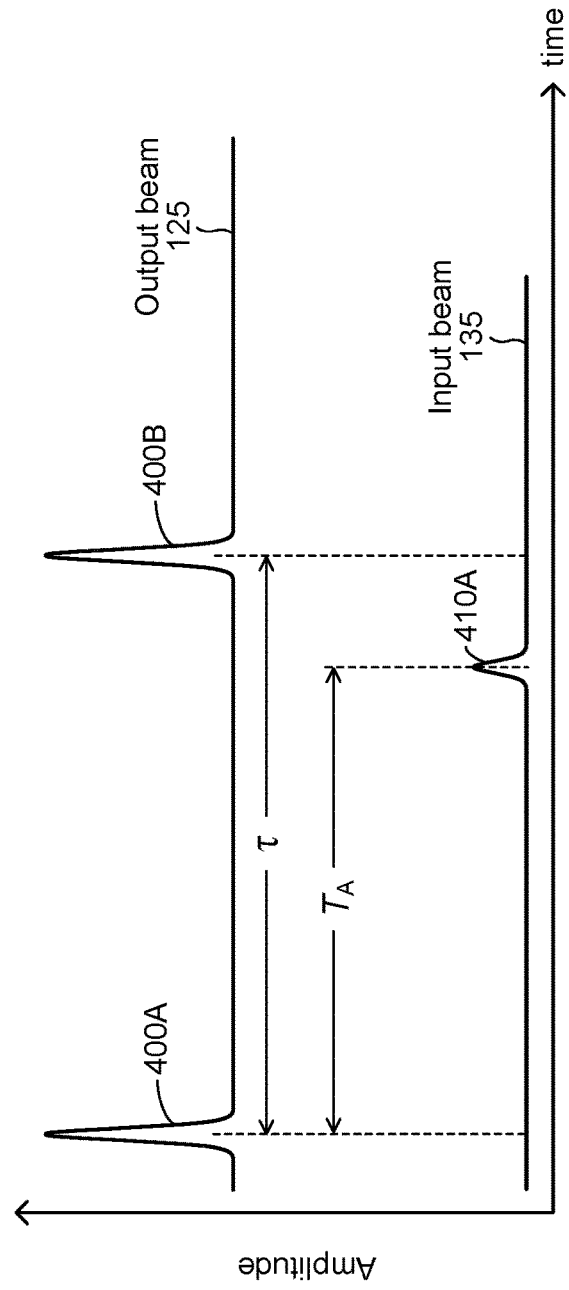
FIG. 9 illustrates a temporal profile for an output beam emitted by the lidar system in FIG. 8 and a corresponding temporal profile for an input beam received by the lidar system.

FIG. 9 illustrates a temporal profile for an output beam 125 emitted by the lidar system 100 in FIG. 8 and a corresponding temporal profile for an input beam 135 received by the lidar system 100. A temporal profile may represent a time variation of the amplitude of an output or input beam (e.g., a variation with time of the optical power or intensity of the output or input beam). The temporal profile of an input beam 135 may also correspond to a voltage signal 360 produced by a receiver 140, where the voltage signal 360 has a voltage variation with time that corresponds to the amplitude variation of the input beam 135.

In FIG. 9, the output beam 125 includes the emitted optical pulses 400A and 400B, and the input beam 135 includes the received optical pulse 410A. In particular embodiments, a lidar system 100 may be configured to emit multiple pulses of light, where each pulse of light is emitted a particular time period after the previously emitted pulse of light. The lidar system 100 in FIG. 8 emits optical pulse 400B a time period τ after optical pulse 400A is emitted. For example, the time period τ (which may be referred to as a pulse period, a pulse repetition interval (PRI) or a time interval) between two successive optical pulses may be approximately 20 ns, 50 ns, 100 ns, 500 ns, 1 μs, 2 μs, 5 μs, 10 μs, or any other suitable interval of time. In FIG. 9, the received optical signal 135 includes optical pulse 410A (which includes scattered light from emitted optical pulse 400A), and optical pulse 410A is received a time interval $T_A$ after the emission of the optical pulse 400A. The lidar system 100 may include a receiver 140 that produces a voltage signal 360 that corresponds to the received optical signal 135. The voltage signal 360 may include an electrical pulse that corresponds to the received optical pulse 410A, and the voltage signal 360 may be produced a time interval $T_A$ after the emission of the optical pulse 400A. The lidar system 100 may determine the distance $D_A$ to the target 130A based on the time interval $T_A$ between emission of the optical pulse 400A and detection of the received optical pulse 410A. The distance $D_A$ may be determined from the expression $D_A = c \cdot T_A/2$. For example, if $T_A$ is 1 μs, then the distance $D_A$ to the target 130A is approximately 150 m. Additionally, the operating range $R_{OP}$ in FIG. 8, which is greater than $D_A$, may be approximately 200 m.

Figure 10:
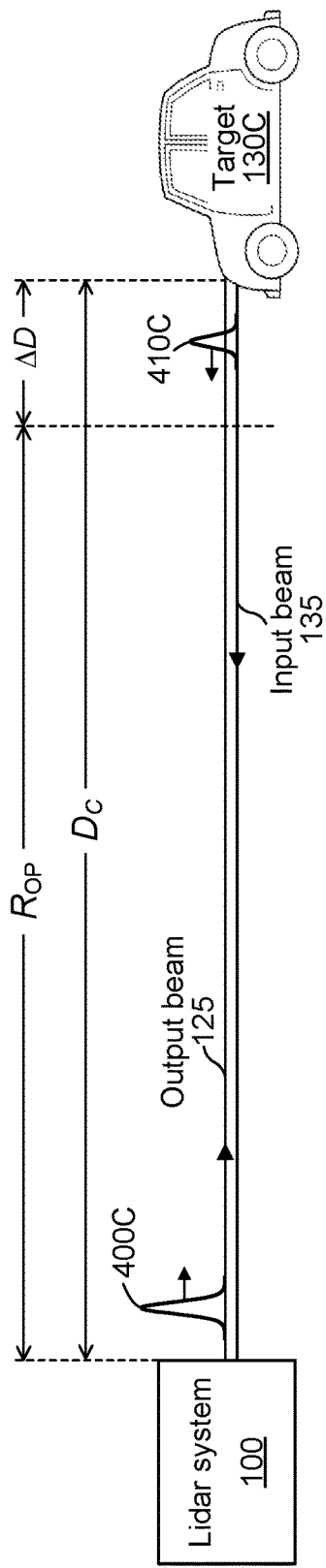
FIG. 10 illustrates an example lidar system and a target that is located beyond an operating range of the lidar system.

FIG. 10 illustrates an example lidar system 100 and a target 130C that is located beyond an operating range ($R_{OP}$) of the lidar system 100. For example, the distance $D_C$ to the target 130C may be 250 m, and $R_{OP}$ may be 200 m. The lidar system 100 in FIG. 10 emits an output beam 125 that includes an optical pulse 400C. The optical pulse 400C propagates to a target 130C located a distance $D_C$ from the lidar system, where $D_C$ is greater than the operating range $R_{OP}$. The optical pulse 400C is scattered by the target 130C, and a portion of the scattered light propagates back to the lidar system 100 as input beam 135. The input beam 135 includes optical pulse 410C which includes a portion of the optical pulse 400C emitted by the lidar system 100 and scattered by the target 130C. The lidar system 100 may include a receiver 140 that detects the received optical pulse 410C.

Figure 11:
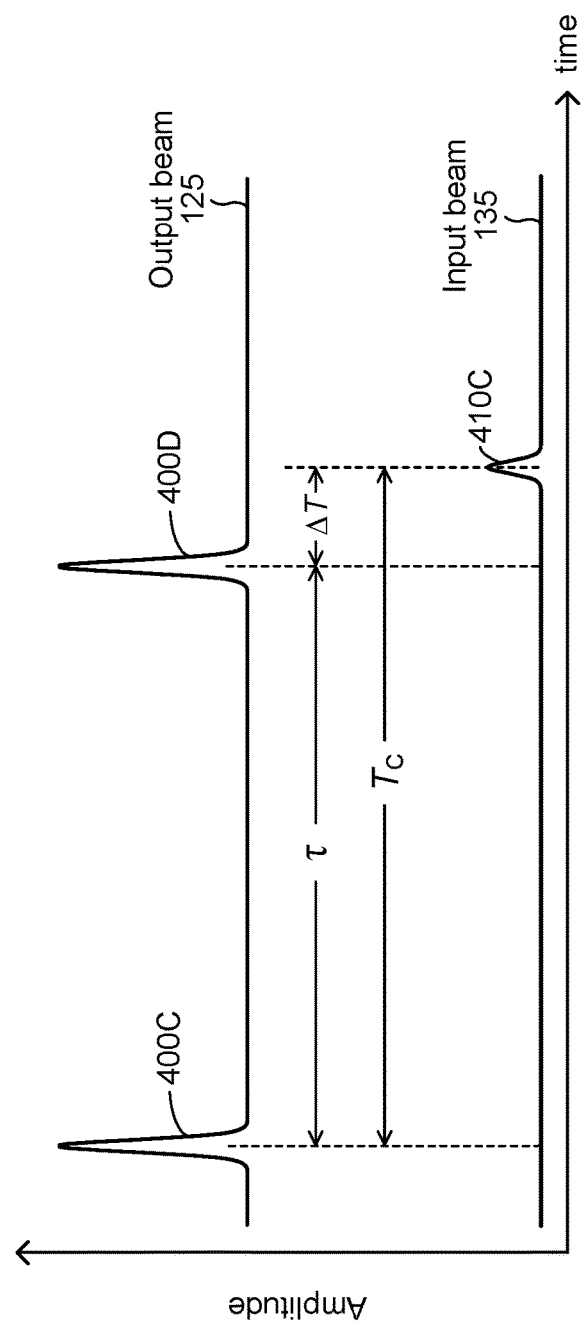
FIG. 11 illustrates a temporal profile for an output beam emitted by the lidar system in FIG. 10 and a corresponding temporal profile for an input beam received by the lidar system.

FIG. 11 illustrates a temporal profile for an output beam 125 emitted by the lidar system 100 in FIG. 10 and a corresponding temporal profile for an input beam 135 received by the lidar system 100. The output beam 125 includes the emitted optical pulses 400C and 400D, and the input beam 135 includes the received optical pulse 410C. The lidar system 100 in FIG. 10 emits optical pulse 400D a time period τ after optical pulse 400C is emitted. The received optical signal 135 includes optical pulse 410C which includes scattered light from the emitted optical pulse 400C. The input optical pulse 410C is received a time interval $T_C$ after the emission of the optical pulse 400C and a time interval ΔT after the optical pulse 400D is emitted. A receiver 140 of the lidar system 100 may produce a voltage signal 360 that corresponds to the received optical signal 135. The voltage signal 360 may include an electrical pulse that corresponds to the received optical pulse 410C, and the voltage signal may be produced a time interval $T_C$ after the emission of the optical pulse 400C. The receiver 140 may produce an output electrical signal corresponding to the received optical signal 135, and the receiver 140 may send the output electrical signal to a controller 150 of the lidar system 100.

In particular embodiments, a range-ambiguity event may occur when a distance to a target 130 is greater than an operating range $R_{OP}$ of a lidar system 100. A range-ambiguity event (which may be referred to as range ambiguity or range wrap) refers to a situation where a lidar system 100 may determine an incorrect distance to a target 130 due to an ambiguity as to which emitted optical pulse a received optical pulse is associated with. In FIGS. 8 and 9, the distance $D_A$ to the target 130A may be determined without range ambiguity, since $D_A$ is less than the operating range $R_{OP}$. Because the receipt of the optical pulse 410A occurs prior to the emission of the subsequent optical pulse 400B, the lidar system 100 may not experience range ambiguity. That is, the received optical pulse 410A in FIG. 9 may be unambiguously associated with the emitted optical pulse 400A, and as a result, the distance $D_A$ to the target 130A may be determined without ambiguity.

In FIGS. 10 and 11, a range-ambiguity event may result from the target 130C being located beyond $R_{OP}$, the operating range of the lidar system 100. In FIG. 10, the correct distance to the target 130C may be determined by associating the received optical pulse 410C with the emitted optical pulse 400C. For example, the correct distance to the target 130C may be determined from the expression $D_C = c \cdot T_C/2$ or $D_C = R_{OP}$ $c \cdot \Delta T/2$. However, if the received optical pulse 410C is incorrectly associated with the subsequently emitted optical pulse 400D, then a lidar system may determine an incorrect distance to the target 130C that is closer than the actual distance $D_C$. The optical pulse 410C scattered by the target 130C is received by the lidar system 100 a time $\Delta T$ after the optical pulse 400D is emitted. As a result, a lidar system may incorrectly associate the received optical pulse 410C (which corresponds to a pulse in voltage signal 360) with the subsequently emitted optical pulse 400D, and the distance from lidar system 100 to the target 130C may be incorrectly determined to be $\Delta D = c \cdot \Delta T/2$. The correct distance to the target ($D_C$) is larger than the incorrect distance ($\Delta D$) by an amount approximately equal to the operating distance ($R_{OP}$), so that $D_C = \Delta D + R_{OP}$. As an example, if the operating distance $R_{OP}$ is 200 m and the correct distance to the target $D_C$ is 250 m, then, due to range ambiguity, the distance to the target may incorrectly be determined to be $\Delta D = 50$ m.

In particular embodiments, an operating range $R_{OP}$ of a lidar system 100 may correspond to a distance over which the lidar system 100 is configured to detect scattered light from a target 130 and determine the distance to the target. Additionally, an operating range $R_{OP}$ may correspond to a distance over which a lidar system 100 may determine the distance to a target 130 without range ambiguity. The operating range $R_{OP}$ of a lidar system 100 may be approximately 25 m, 50 m, 100 m, 150 m, 200 m, 250 m, 500 m, 1000 m, or any other suitable distance. For a target 130 located a distance less than $R_{OP}$, a lidar system 100 may determine the distance to the target without range ambiguity. If a target 130 is located a distance greater than $R_{OP}$, a lidar system 100 may experience range ambiguity and may not determine the correct distance to the target. In FIG. 8, the target 130A is located a distance $D_A$ from the lidar system 100, where $D_A$ is less than $R_{OP}$, and the lidar system 100 may determine the distance $D_A$ without range ambiguity. For example, the operating range may be 200 m, and the distance to the target 130A may be determined to be 150 m. In FIG. 10, the target 130C is located a distance $D_C$ from the lidar system 100, where $D_C$ is greater than $R_{OP}$. For example, the operating range may be 200 m, and the distance to the target 130C may be 250 m. In the event of range ambiguity, a lidar system may determine an incorrect distance to the target 130C (e.g., an incorrect distance of 50 m).

In particular embodiments, an operating range $R_{OP}$ of a lidar system 100 may be related to a time period $\tau$ between successive pulses by the expression $R_{OP} = c \cdot \tau/2$. For example, if the time between successive pulses is 1.33 µs, then the operating range may be approximately 200 m. If a target 130 is located a distance less than $R_{OP}$, then scattered light from the target may be received by a lidar system 100 before the time $\tau$ has elapsed and before a subsequent pulse is emitted. As a result, the lidar system 100 may determine the distance to the target 130 without range ambiguity. If a target 130 is located beyond the operating range $R_{OP}$, then scattered light from the target 130 may be received after a subsequent pulse is emitted (e.g., after a time period $\tau$ has elapsed since the previous pulse was emitted). In FIGS. 10 and 11, a lidar system may experience range ambiguity and may not be able to determine whether the received pulse 410C is associated with the previously emitted pulse 400C or the subsequent pulse 400D. For example, pulse 400D may be emitted $\tau = 1.33$ µs after pulse 400C is emitted (corresponding to a 200-m operating range), and the scattered pulse 410C may be received $\Delta T = 0.34$ µs after pulse 400D is emitted (corresponding to a 250-m distance to target 130C). As a result of range ambiguity, a lidar system may be unable to determine the correct distance to the target 130.

In particular embodiments, a dead time may be included during or between the emission of successive pulses of light by a lidar system 100. A dead time may refer to a relatively short period of time when part of the lidar system 100 is inactive. For example, a receiver 140 may be inactivated for a short period of time by reducing the reverse bias of an APD of the receiver 140, reducing the gain of the receiver 140, or powering off the receiver 140. Inactivating the receiver 140 may allow the receiver to reset its operating parameters between pulses or may prevent the receiver 140 from saturating or becoming damaged by internally scattered light produced by an emitted pulse of light (e.g., light from an emitted pulse that is scattered from within a lidar system 100 before the emitted pulse is directed out of the lidar system 100). The duration of a dead time ($t_d$) may be any suitable percentage of the pulse period $\tau$, such as for example, approximately 10%, 1%, or 0.1% of the pulse period. For example, a lidar system 100 with a pulse period $\tau$ of approximately 1.0 µs may have a dead time with a duration of $t_d = 20$ ns, corresponding to 2% of the pulse period.

In particular embodiments, a dead time may approximately coincide with the emission of a pulse. The duration of a dead time ($t_d$) may be expressed as $t_d = t_{d1} + t_{d2}$, where $t_{d1}$ is a pre-pulse dead time that corresponds to the portion of the dead time that occurs prior to when the pulse is emitted. For example, a receiver 140 may be inactivated for a short period of time ($t_{d1}$) prior to the emission of a pulse and for a short period of time ($t_{d2}$) after the pulse has been emitted. For a lidar system 100 with a pulse period $\tau$ of approximately 1.5 µs, the receiver 140 may be inactivated for approximately $t_{d1} = 0$-20 ns prior to the emission of a pulse and for approximately $t_{d2} = 0$-20 ns after the emission of the pulse. During the pre-pulse dead time tai, the receiver 140 may be inactivated and may not detect scattered light from the previously emitted pulse of light. The pre-pulse dead time tai may reduce the effective operating range of the lidar system 100 by a distance of approximately $c \cdot t_{d1}/2$. For example, without considering dead time, a lidar system 100 with a pulse period of $\tau=1.67$ μs may have a corresponding operating range ($R_{OP}$) of approximately 250.5 m. A pre-pulse dead time $t_{di}$ of 10 ns may reduce the effective operating range by approximately 1.5 m to approximately 249 m. As used herein, the term operating range ($R_{OP}$) may refer to, for example, (1) an operating range of a lidar system 100 without considering a pre-pulse dead time (e.g., the operating range may be expressed as $R_{OP}=c\cdot\tau/2$) or (2) an operating range of a lidar system with an adjustment for a pre-pulse dead time (e.g., the operating range may be expressed as $R_{OP}=c\cdot(\tau-t_{d1})/2$).

In particular embodiments, a lidar system 100 may be a pulsed lidar system configured to emit multiple optical pulses having one or more of the following optical characteristics: a pulse energy between 0.1 μJ and 100 μJ; a pulse repetition frequency between 80 kHz and 10 MHz; and a pulse duration between 0.1 ns and 50 ns. As an example, one or more of the lidar systems 100 illustrated in FIGS. 1, 2, 3, 4, 8, and 10 may include a light source 110 configured to emit pulses of light having a pulse energy of approximately 0.5-1 μJ, a pulse repetition frequency of approximately 400-800 kHz, and a pulse duration of approximately 2-5 ns. In particular embodiments, a lidar system 100 may be a FMCW lidar system configured to emit multiple optical signals that each include frequency-modulated light. One or more of the lidar systems 100 illustrated in FIGS. 1, 2, 3, 4, 8, and 10 may be configured to operate as a FMCW lidar system.

Figure 12:
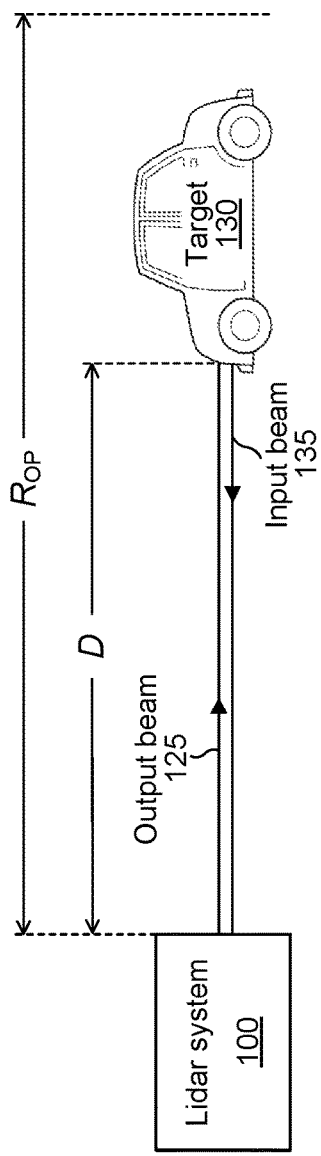
FIG. 12 illustrates an example lidar system and a target that is located within an operating range of the lidar system.

FIG. 12 illustrates an example lidar system 100 and a target 130 that is located within an operating range ($R_{OP}$) of the lidar system 100. For example, the distance D to the target 130 may be 200 m, and $R_{OP}$ may be 300 m. The arrangement of the lidar system 100, the target 130, and the operating range in FIG. 12 is similar to the arrangement in FIG. 8. The output beam 125 in FIG. 12 may include a series of optical signals directed into the field of regard of the lidar system 100, and the input beam 135 may include light from one or more of the optical signals that is scattered by the target 130. The lidar system 100 may be a pulsed lidar system that emits pulses of light, or the lidar system 100 may be a FMCW lidar system that emits frequency-modulated light.

Figure 13:
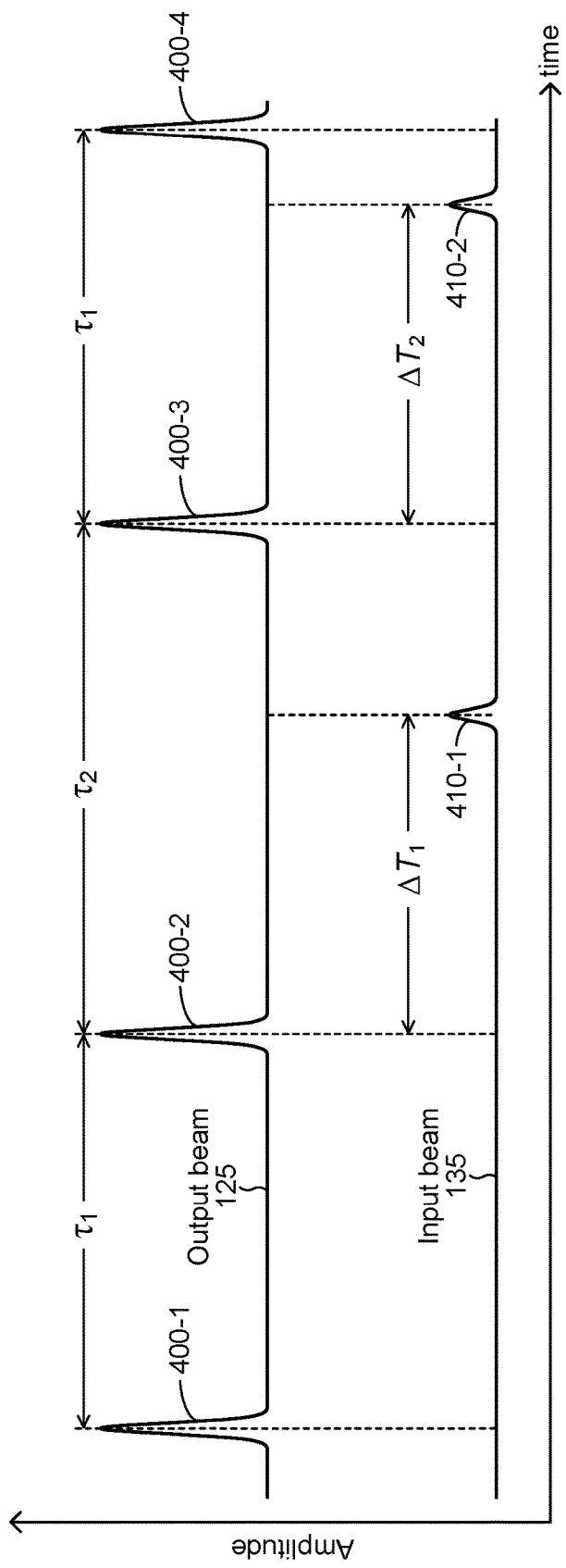
FIG. 13 illustrates a temporal profile for an output beam emitted by the lidar system in FIG. 12 and a corresponding temporal profile for an input beam received by the lidar system.

FIG. 13 illustrates a temporal profile for an output beam 125 emitted by the lidar system 100 in FIG. 12 and a corresponding temporal profile for an input beam 135 received by the lidar system 100. In particular embodiments, a lidar system 100 may include a light source 110 configured to emit multiple optical signals that are directed into a field of regard of the lidar system 100. In FIG. 13, the output beam 125 includes the emitted optical pulses 400-1, 400-2, 400-3, and 400-4, which may be referred to as a first emitted optical signal, a second emitted optical signal, a third emitted optical signal, and a fourth emitted optical signal, respectively. The second optical pulse 400-2 is emitted a time period $\tau_1$ after the first optical pulse 400-1, and the third optical pulse 400-3 is emitted a time period $\tau_2$ after the second optical pulse 400-2, where the time periods $\tau_1$ and $\tau_2$ are not equal to one another. For example, time period $\tau_1$ may be approximately 1.5 μs, and time period $\tau_2$ may be approximately 1.6 μs, corresponding to a 0.1-μs difference between the two time periods. As another example, the time periods $\tau_1$ and $\tau_2$ may differ from one another by approximately 1 ns, 2 ns, 5 ns, 10 ns, 20 ns, 50 ns, 0.1 μs, 0.2 μs, 0.5 μs, 1 μs, or any other suitable time difference. In FIG. 13, the lidar system 100 emits optical pulses with time periods that alternate between $\tau_1$ and $\tau_2$. Accordingly, the fourth optical pulse 400-4 is emitted the time period $\tau_1$ after the third optical pulse 400-3, and a fifth optical pulse (not illustrated in FIG. 13) may be emitted the time period $\tau_2$ after the fourth optical pulse 400-4.

The input beam 135 in FIG. 13 includes the received optical pulses 410-1 and 410-2, which may be referred to as a first input optical signal and a second input optical signal, respectively. The input optical pulses 410-1 and 410-2 may each include light from an emitted optical pulse (e.g., pulse 400-1, 400-2, or 400-3) that is scattered by the target 130. For example, the input optical pulse 410-1 may include scattered light from emitted optical pulse 400-2 (e.g., the optical pulse 400-2 is scattered by the target 130, and a portion of the scattered light returns to the lidar system as the input optical pulse 410-1). Additionally, the input optical pulse 410-2 may include scattered light from emitted optical pulse 400-3 (e.g., the optical pulse 400-3 is scattered by the target 130, and a portion of the scattered light returns to the lidar system as the input optical pulse 410-2). The lidar system 100 may include a receiver 140 configured to detect the first input optical pulse 410-1 and the second input optical pulse 410-2.

In FIG. 13, the first input optical pulse 410-1 is detected a time interval $\Delta T_1$ after the second optical pulse 400-2 is emitted, and the second input optical pulse 410-2 is detected a time interval $\Delta T_2$ after the third optical pulse 400-3 is emitted. Additionally, the first input optical pulse 410-1 is detected before the third optical pulse 400-3 is emitted, which corresponds to the time interval $\Delta T_1$ being less than the second time period $\tau_2$. Similarly, the second input optical pulse 410-2 is detected before the fourth optical pulse 400-4 is emitted, which corresponds to the time interval $\Delta T_2$ being less than the first time period $\tau_1$. During each of the time intervals $\Delta T_1$ and $\Delta T_2$, no other optical pulses are emitted and no other input optical pulses are detected. For example, during the time interval $\Delta T_1$ between the emission of optical pulse 400-2 and the detection of input optical pulse 410-1, no other pulses are emitted or detected. In particular embodiments, the time intervals $\Delta T_1$ and $\Delta T_2$ may be determined by a processor (e.g., an ASIC or FPGA located in the receiver 140). For example, time counts (e.g., numerical values corresponding to clock cycles or some fraction of clock cycles) may be recorded when an optical pulse is emitted and when an input optical pulse is detected. The time interval $\Delta T_1$ may be determined by subtracting a time-count value corresponding to emission of optical pulse 400-2 from a time-count value corresponding to detection of input optical pulse 410-1. Similarly, the time interval $\Delta T_2$ may be determined by subtracting a time-count value corresponding to emission of optical pulse 400-3 from a time-count value corresponding to detection of input optical pulse 410-2.

In FIG. 13, the distance D to the target 130 associated with input optical pulse 410-1 may be determined from the expression $D=c\cdot\Delta T_1/2$, where $\Delta T_1$ corresponds to the time interval between emission of the optical pulse 400-2 and detection of the received optical pulse 410-1 (e.g., $\Delta T_1$ may be the round-trip time for the optical pulse 400-2 to travel to the target 130 and then to travel back to the lidar system as input optical pulse 410-1). Similarly, the distance D to the target 130 associated with input optical pulse 410-2 may be determined from the expression $D=c\cdot\Delta T_2/2$, where $\Delta T_2$ corresponds to the time interval between emission of the optical pulse 400-3 and detection of the received optical pulse 410-2. For example, if $\Delta T_1$ is 1.33 μs, then the distance D associated with input optical pulse 410-1 is approximately 199.5 m. Additionally, the operating range $R_{OP}$ in FIG. 12, which is greater than D, may be approximately 300 m.

Figure 14:
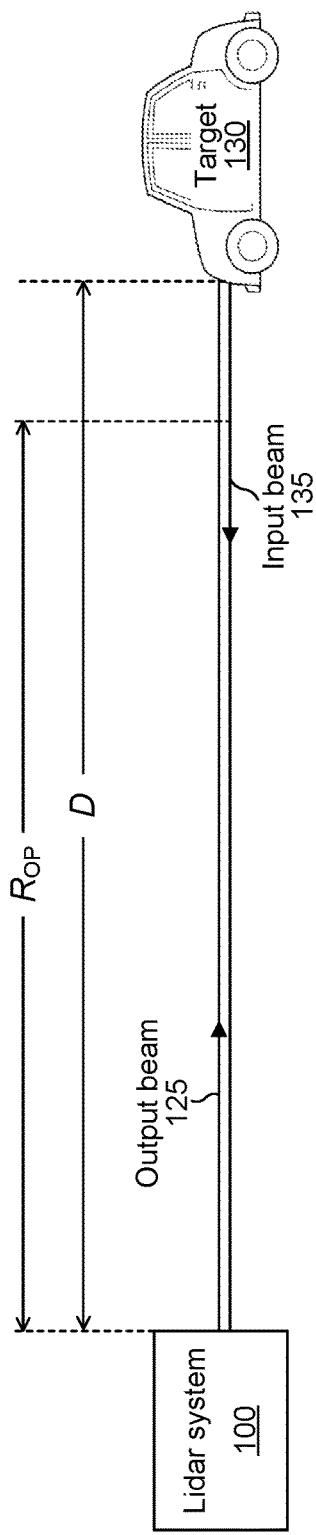
FIG. 14 illustrates an example lidar system and a target that is located beyond an operating range of the lidar system.

FIG. 14 illustrates an example lidar system 100 and a target 130 that is located beyond an operating range ($R_{OP}$) of the lidar system 100. The arrangement of the lidar system 100, the target 130, and the operating range in FIG. 14 is similar to the arrangement in FIG. 10. In FIG. 14, the lidar system 100 emits an output beam 125 that may include an optical signal (e.g., an emitted pulse of light) directed into a field of regard of the lidar system 100. The optical signal propagates to the target 130 located a distance D from the lidar system 100, where D is greater than the operating range $R_{OP}$. For example, the distance D to the target 130 may be 250 m, and $R_{OP}$ may be 200 m. The optical signal is scattered by the target 130, and a portion of the scattered optical signal propagates back to the lidar system 100 as input beam 135. The lidar system 100 may include a receiver 140 that detects an input optical signal that includes light from the scattered optical signal.

Figure 15:
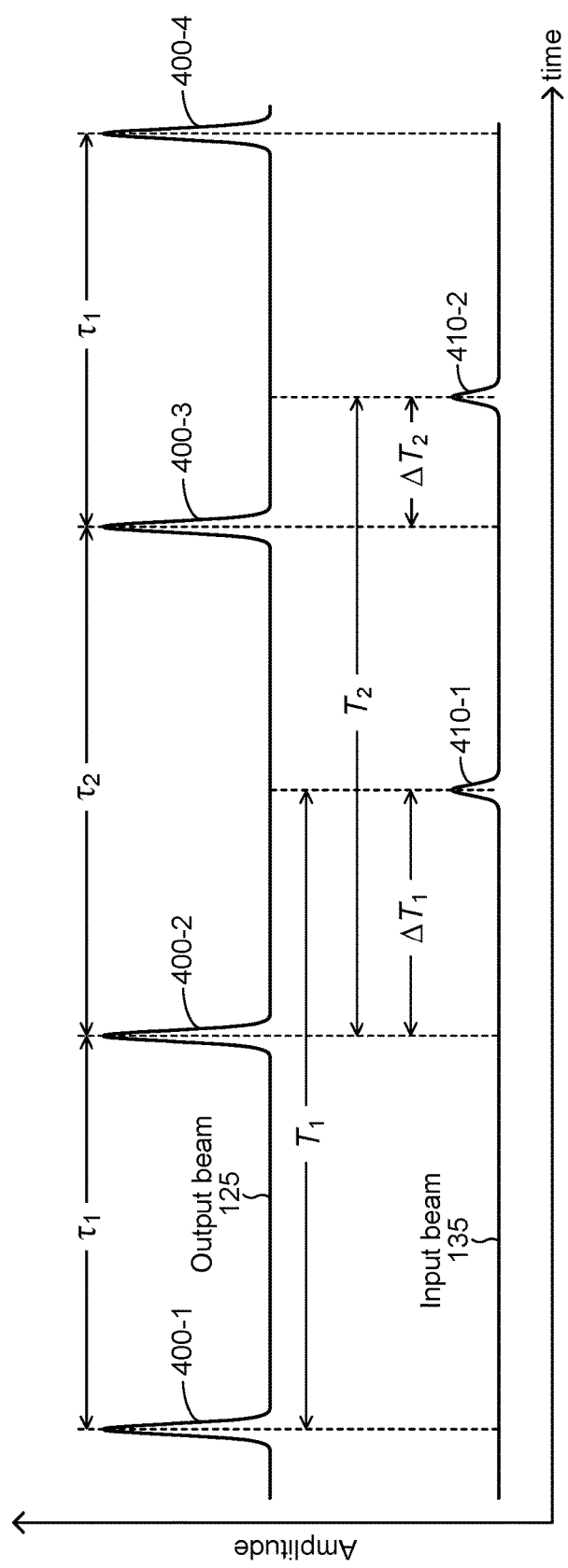
FIGS. 15, 16, and 17 each illustrate a temporal profile for an output beam emitted by the lidar system in FIG. 14 and a corresponding temporal profile for an input beam received by the lidar system.
Figure 16:
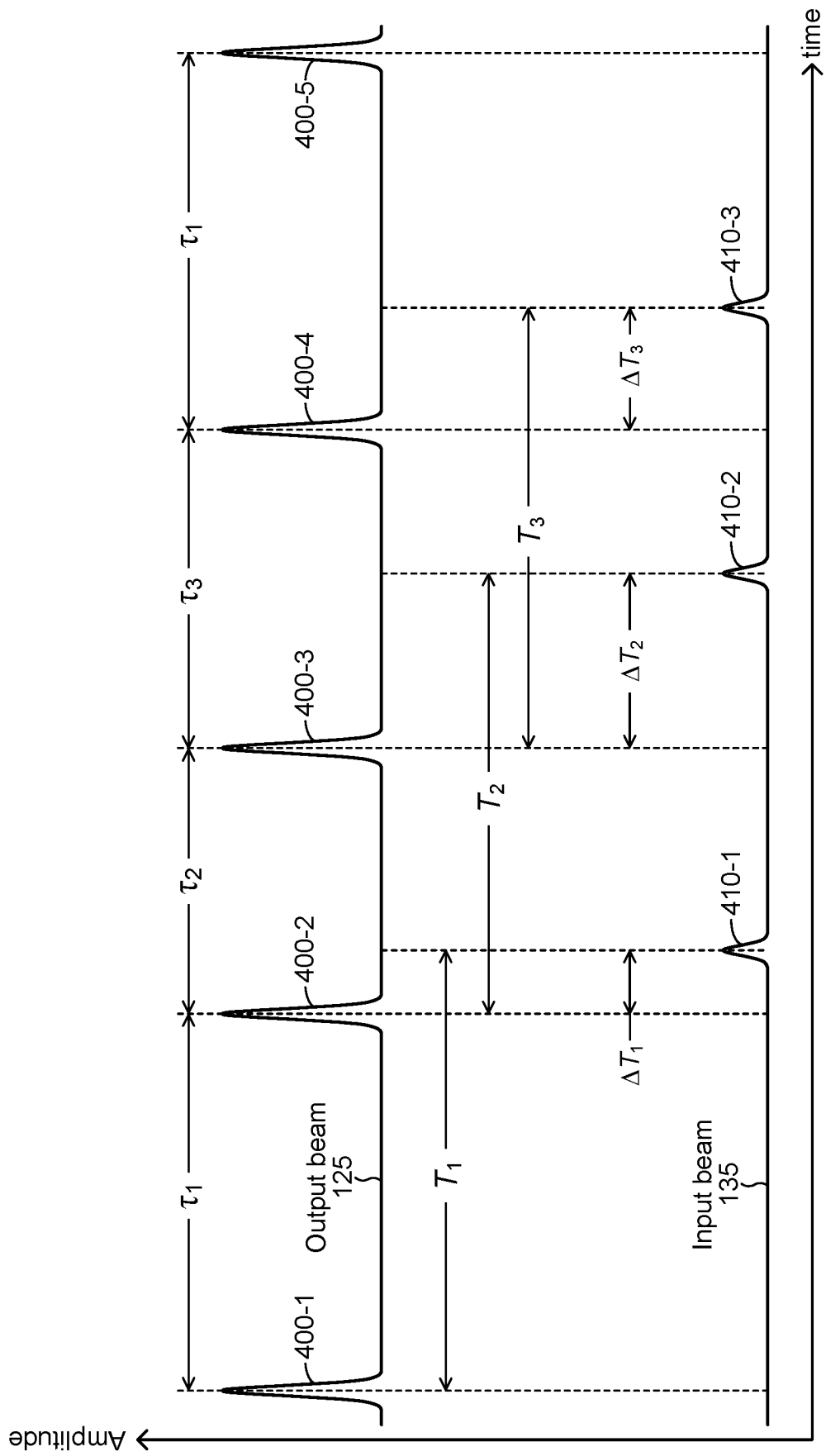
Figure 17:
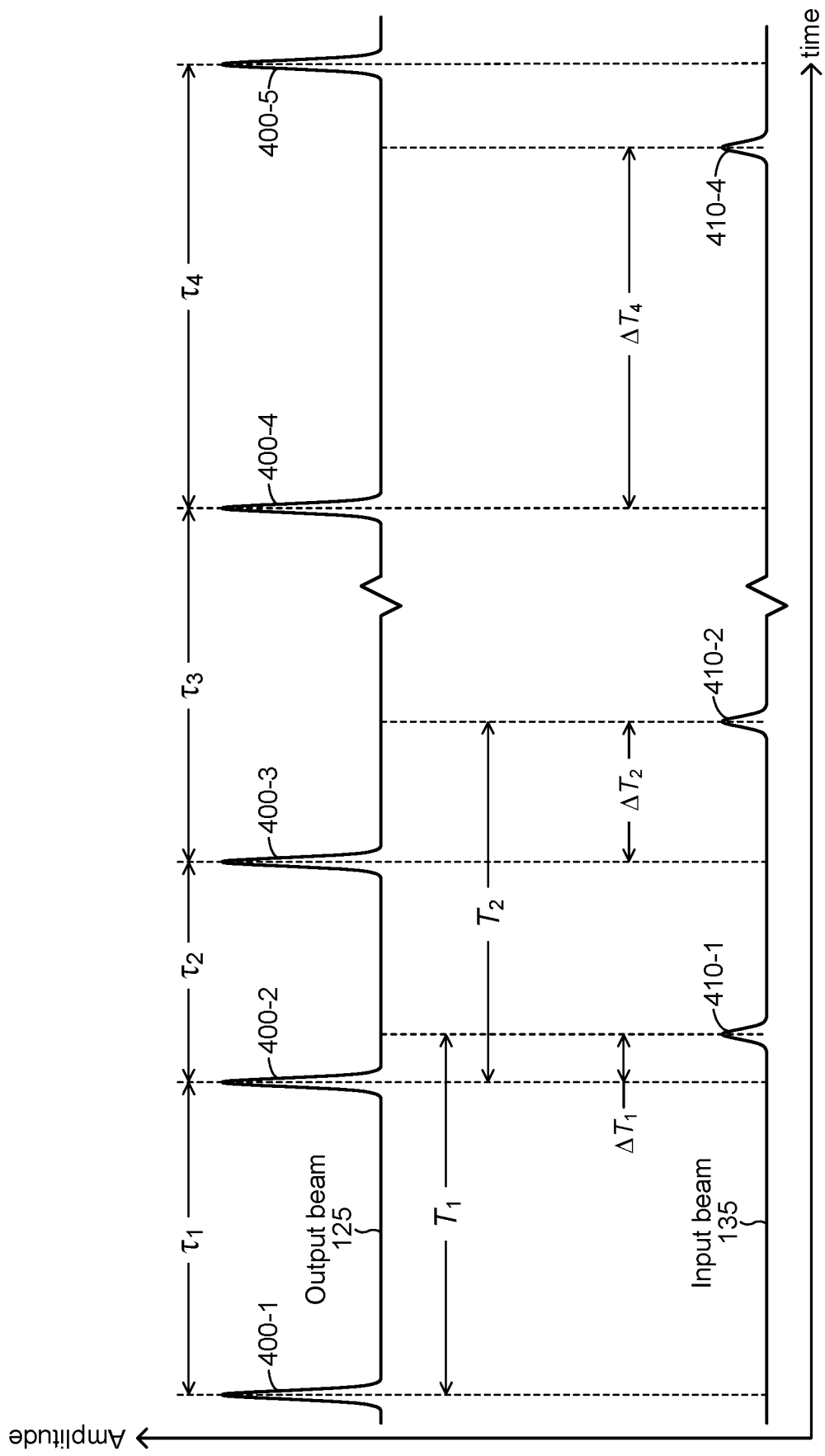

FIGS. 15, 16, and 17 each illustrate a temporal profile for an output beam 125 emitted by the lidar system 100 in FIG. 14 and a corresponding temporal profile for an input beam 135 received by the lidar system 100. In FIG. 15, the output beam 125 includes the emitted optical pulses 400-1, 400-2, 400-3, and 400-4. The second optical pulse 400-2 is emitted a time period $\tau_1$ after the first optical pulse 400-1, and the third optical pulse 400-3 is emitted a time period $\tau_2$ after the second optical pulse 400-2, where the time periods $\tau_1$ and $\tau_2$ are not equal. In FIG. 15, the lidar system 100 emits optical pulses with time periods that alternate between $\tau_1$ and $\tau_2$. Accordingly, the fourth optical pulse 400-4 is emitted the time period $\tau_1$ after the third optical pulse 400-3, and a fifth optical pulse (not illustrated in FIG. 15) may be emitted the time period $\tau_2$ after the fourth optical pulse 400-4.

The input beam 135 in FIG. 15 includes the received optical pulses 410-1 and 410-2, which may be referred to as a first input optical signal and a second input optical signal, respectively. The input optical pulses 410-1 and 410-2 may each include light from an emitted optical pulse (e.g., pulse 400-1, 400-2, or 400-3) that is scattered by the target 130. For example, the input optical pulse 410-1 may include scattered light from emitted optical pulse 400-1 (e.g., the optical pulse 400-1 is scattered by the target 130, and a portion of the scattered light returns to the lidar system as the input optical pulse 410-1), and the input optical pulse 410-2 may include scattered light from emitted optical pulse 400-2. The lidar system 100 may include a receiver 140 configured to detect the first input optical pulse 410-1 and the second input optical pulse 410-2. The first input optical pulse 410-1 is detected a time interval $T_1$ after the first optical pulse 400-1 is emitted and a time interval $\Delta T_1$ after the second optical pulse 400-2 is emitted. The second input optical pulse 410-2 is detected a time interval $T_2$ after the second optical pulse 400-2 is emitted and a time interval $\Delta T_2$ after the third optical pulse 400-3 is emitted. Additionally, the first input optical pulse 410-1 is detected before the third optical pulse 400-3 is emitted, which corresponds to the time interval $\Delta T_1$ being less than the second time period $\tau_2$. Similarly, the second input optical pulse 410-2 is detected before the fourth optical pulse 400-4 is emitted, which corresponds to the time interval $\Delta T_2$ being less than the first time period $\tau_1$.

In FIG. 15, during each of the time intervals $\Delta T_1$ and $\Delta T_2$, no other optical pulses are emitted and no other input optical pulses are detected. For example, during the time interval $\Delta T_1$ between the emission of optical pulse 400-2 and the detection of input optical pulse 410-1, no other pulses are emitted or detected. In particular embodiments, the time intervals $\Delta T_1$ and $\Delta T_2$ may be determined by a processor. For example, time counts may be recorded when an optical pulse is emitted and when an input optical pulse is detected. The time interval $\Delta T_1$ may be determined by subtracting a time-count value corresponding to emission of optical pulse 400-2 from a time-count value corresponding to the subsequent detection of input optical pulse 410-1 (e.g., with no other intervening emitted or detected pulses occurring during the time interval $\Delta T_1$). Similarly, the time interval $\Delta T_2$ may be determined by subtracting a time-count value corresponding to emission of optical pulse 400-3 from a time-count value corresponding to the subsequent detection of input optical pulse 410-2.

In FIG. 16, the output beam 125 includes the emitted optical pulses 400-1, 400-2, 400-3, 400-4, and 400-5. The second optical pulse 400-2 is emitted a time period $\tau_1$ after the first optical pulse 400-1, and the third optical pulse 400-3 is emitted a time period $\tau_2$ after the second optical pulse 400-2. The fourth optical pulse 400-4 is emitted a time period $\tau_3$ after the third optical pulse 400-3, where the three time periods $\tau_1$, $\tau_2$, and $\tau_3$ are different from one another. For example, time period $\tau_1$ may be approximately 1.7 μs, time period $\tau_2$ may be approximately 1.5 μs, and time period $\tau_3$ may be approximately 1.6 μs. In FIG. 16, the lidar system 100 emits optical pulses with time periods that alternate between $\tau_1$, $\tau_2$, and $\tau_3$. Accordingly, the fifth optical pulse 400-5 is emitted the time period $\tau_1$ after the fourth optical pulse 400-4, and a sixth optical pulse (not illustrated in FIG. 16) may be emitted the time period $\tau_2$ after the fifth optical pulse 400-5.

The input beam 135 in FIG. 16 includes the received optical pulses 410-1, 410-2, and 410-3, which may be referred to as a first input optical signal, a second input optical signal, and a third input optical signal, respectively. The input optical pulses 410-1, 410-2, and 410-3 may each include light from an emitted optical pulse (e.g., pulse 400-1, 400-2, 400-3, or 400-4) that is scattered by the target 130. For example, the input optical pulse 410-1 may include scattered light from emitted optical pulse 400-1, and the input optical pulse 410-2 may include scattered light from emitted optical pulse 400-2. Additionally, the input optical pulse 410-3 may include scattered light from emitted optical pulse 400-3. The lidar system 100 may include a receiver 140 configured to detect the first input optical pulse 410-1, the second input optical pulse 410-2, and the third input optical pulse 410-3. The first input optical pulse 410-1 is detected a time interval $T_1$ after the first optical pulse 400-1 is emitted and a time interval $\Delta T_1$ after the second optical pulse 400-2 is emitted. The second input optical pulse 410-2 is detected a time interval $T_2$ after the second optical pulse 400-2 is emitted and a time interval $\Delta T_2$ after the third optical pulse 400-3 is emitted. The third input optical pulse 410-3 is detected a time interval $T_3$ after the third optical pulse 400-3 is emitted and a time interval $\Delta T_3$ after the fourth optical pulse 400-4 is emitted. Additionally, the first input optical pulse 410-1 is detected before the third optical pulse 400-3 is emitted, which corresponds to the time interval $\Delta T_1$ being less than the second time period $\tau_2$. Similarly, the second input optical pulse 410-2 is detected before the fourth optical pulse 400-4 is emitted, which corresponds to the time interval $\Delta T_2$ being less than the third time period $\tau_3$. Similarly, the third input optical pulse 410-3 is detected before the fifth optical pulse 400-5 is emitted, which corresponds to the time interval $\Delta T_3$ being less than the first time period $\tau_1$. The time intervals $\Delta T_1$, $\Delta T_2$, and $\Delta T_3$ may each be determined by a processor, for example, by determining a difference between time-count values associated with the emission of an optical pulse and the subsequent detection of an input optical signal (e.g., with no other intervening emitted or detected pulses occurring during the respective time interval).

In particular embodiments, a lidar system 100 may include a light source 110 configured to emit optical signals having different time periods between successive optical signals. For example, a lidar system 100 may emit a first optical signal, a second optical signal, and a third optical signal. The second optical signal may be emitted a time period $\tau_1$ after the first optical signal, and the third optical signal may be emitted a time period $\tau_2$ after the second optical signal, where $\tau_1$ and $\tau_2$ may be different time periods. In FIGS. 13 and 15, the emitted optical signals alternate between time period $\tau_1$ and time period $\tau_2$. In particular embodiments, the time periods $\tau_1$ and $\tau_2$ may have any suitable values and may differ by any suitable amount. For example, the time periods $T_1$ and $\tau_2$ may each have a value of approximately 20 ns, 50 ns, 100 ns, 500 ns, 1 μs, 2 μs, 5 μs, 10 μs, or any other suitable interval of time. Additionally, the difference ΔT between the two time periods (e.g., $\Delta T = \tau_2 - \tau_1$) may be approximately 1 ns, 2 ns, 5 ns, 10 ns, 20 ns, 50 ns, 0.1 μs, 0.2 μs, 0.5 μs, 1 μs, or any other suitable time difference. As another example, the time periods $\tau_1$ and $\tau_2$ may have the respective values: 1.00 μs and 1.01 μs; 1.50 μs and 1.55 μs; 1.5 μs and 1.6 μs; 2.0 μs and 2.2 μs; or any other suitable pair of different time periods.

In particular embodiments, a lidar system 100 may include a light source 110 configured to emit optical signals having two or more different time periods between successive optical signals. In the examples of FIGS. 13 and 15, the light source 110 alternates between the two time periods $\tau_1$ and $\tau_2$. In the example of FIG. 16, the light source 110 emits a series of optical signals that alternate sequentially between the three different time periods $\tau_1$, $\tau_2$, and $\tau_3$. The three time periods may have the following respective values: 1.22 μs, 1.20 μs, and 1.21 μs; 1.45 μs, 1.35 μs, and 1.40 μs; 1.6 μs, 1.4 μs, and 1.5 μs; or any other suitable set of three different time periods. As another example, a light source 110 may emit a series of optical signals with time periods that alternate sequentially between M different time periods, where M is an integer greater than or equal to 2 (e.g., M may be 2, 3, 4, 5, 10, 20, or any other suitable integer value). The M different time periods $\tau_1$, $\tau_2$, . . . , $\tau_M$ may each have a value of approximately 20 ns, 50 ns, 100 ns, 500 ns, 1 μs, 2 μs, 5 μs, 10 μs, or any other suitable interval of time. Additionally, the difference Δτ between the maximum ($\tau_{Max}$) and the minimum ($\tau_{Min}$) time periods (e.g., $\Delta\tau = \tau_{Max} - \tau_{Min}$) may be approximately 1 ns, 2 ns, 5 ns, 10 ns, 20 ns, 50 ns, 0.1 μs, 0.2 μs, 0.5 μs, 1 μs, or any other suitable time difference. For example, a series of optical signals having the four different time periods 1.40 μs, 1.45 μs, 1.51 μs; and 1.57 μs has a time difference Δτ of 0.17 μs.

In particular embodiments, a light source 110 may emit optical signals having a repeating pattern of time periods. For example, a light source 110 may emit optical pulses that alternate sequentially between three different time periods (e.g., the pulses may be emitted with the repeating time-period pattern $\tau_1, \tau_2, \tau_3, \tau_1, \tau_2, \tau_3, \ldots$). As another example, a light source 110 may emit optical pulses that alternate sequentially between M different time periods (e.g., the pulses may be emitted with the repeating time-period pattern $\tau_1, \tau_2, \ldots, \tau_M, \tau_1, \tau_2, \ldots, \tau_M, \ldots$). In particular embodiments, a light source 110 may emit optical signals having a pseudo-random pattern of time periods. As an example, a light source 110 may emit optical pulses that alternate in a pseudo-random pattern between M different time periods, where any two sequential optical pulses have different time periods.

In particular embodiments, for a lidar system 100 with a light source 110 that emits optical signals having two or more different time periods between the optical signals, the operating range $R_{OP}$ of the lidar system 100 may be based on a minimum time period ($\tau_{Min}$). For example, the operating range of a lidar system 100 may be determined from the expression $R_{OP} = c \cdot \tau_{Min}/2$, where $\tau_{Min}$ is the minimum time period of the optical signals emitted by the light source 110. If a lidar system 100 emits optical signals that alternate between the three time periods 1.7 μs, 1.8 μs, and 1.9 μs, then the minimum time period is $\tau_{Min}=1.7$ μs, and the corresponding operating range is approximately 255 meters. In the example of FIG. 16, if the values for the time periods $\tau_1$, $\tau_2$, and $\tau_3$ are 1.50 μs, 1.40 μs, and 1.45 μs, respectively, then the minimum time period is $\tau_{Min}=\tau_2=1.4$ μs, and the corresponding operating range is approximately 210 meters. For a target 130 located a distance less than the operating range of a lidar system 100, the lidar system 100 may determine the distance to the target 130 without range ambiguity. If a target 130 is located beyond the operating range of the lidar system, then the lidar system 100 may experience range ambiguity when determining the distance to the target 130.

In FIGS. 12 and 13, the distance D to the target 130 may be determined without range ambiguity since D is less than the operating range $R_{OP}$. For example, because the receipt of the input optical pulse 410-1 occurs prior to the emission of the subsequent optical pulse 400-3, the lidar system 100 may not experience range ambiguity. That is, the received optical pulse 410-1 in FIG. 13 may be unambiguously associated with the emitted optical pulse 400-2, and the distance D to the target 130 associated with the input optical pulse 410-1 may be determined without ambiguity (e.g., based on the expression $D = c \cdot \Delta T_1/2$). Similarly, the received optical pulse 410-2 may be associated with the emitted optical pulse 400-3, and the distance D to the target 130 associated with the input optical pulse 410-2 may be determined based on the expression $D = c \cdot \Delta T_2/2$.

In FIGS. 14-16, a range-ambiguity event may result from the target 130 being located beyond the operating range $R_{OP}$ of the lidar system 100. In each of FIG. 15 and FIG. 16, the received optical pulse 410-1 may include light from the emitted optical pulse 400-1, and the correct distance to the target 130 associated with the input optical pulse 410-1 may be determined based on the expression $D = c \cdot T_1/2$ or $D = c \cdot (\tau_1 + \Delta T_1)/2$. If the received optical pulse 410-1 is incorrectly associated with the emitted optical pulse 400-2, then an incorrect, range-wrapped distance that is closer than the actual distance D may be determined. Similarly, the received optical pulse 410-2 may include light from the emitted optical pulse 400-2, and the correct distance to the target 130 associated with the input optical pulse 410-2 may be determined based on the expression $D = c \cdot T_2/2$ or $D = c \cdot (\tau_2 + \Delta T_2)/2$. If the received optical pulse 410-2 is incorrectly associated with the emitted optical pulse 400-3, then an incorrect range-wrapped distance that is closer than the actual distance D may be determined. In FIG. 16, the received optical pulse 410-3 may include light from the emitted optical pulse 400-3, and the correct distance to the target 130 associated with the input optical pulse 410-3 may be determined based on the expression $D = c \cdot T_3/2$ or $D = c \cdot (\tau_3 + \Delta T_3)/2$. If the received optical pulse 410-3 is incorrectly associated with the emitted optical pulse 400-4, then an incorrect, range-wrapped distance that is closer than the actual distance D may be determined.

In particular embodiments, a processor (e.g., a controller 150 of lidar system 100) may be configured to determine whether a target 130 is located a distance D that is greater than an operating range ($R_{OP}$) of the lidar system based at least in part on two or more time intervals ΔT. Each time interval ΔT may correspond to a duration of time between the emission of an optical pulse and the detection of an input optical pulse following the emitted optical pulse, where there are no other pulses between those two pulses (e.g., during a time interval ΔT, there are no intervening emitted optical pulses or input optical pulses that occur or that are detected between those two pulses). The input optical pulse may include scattered light from the emitted optical pulse, or the input optical pulse may include scattered light from a previously emitted optical pulse. In the example of FIGS. 14 and 15, a processor may determine that the distance D to the target 130 is greater than the operating range based at least in part on the two time intervals $\Delta T_1$ and $\Delta T_2$. The determination that the distance D to the target 130 is greater than the operating range may be further based at least in part on the time periods $\tau_1$ and $\tau_2$. In the example of FIGS. 14 and 16, a processor may determine that the distance D to the target 130 is greater than the operating range based at least in part on the three time intervals $\Delta T_1$, $\Delta T_2$, and $\Delta T_3$. The determination that the distance D to the target 130 is greater than the operating range may be further based at least in part on the time periods $\tau_1$, $\tau_2$ and $\tau_3$.

In particular embodiments, a range-ambiguity time parameter Δτ may be expressed as $\Delta\tau=(\tau_2-\tau_1)$, and a target 130 may be determined to be located a distance D that is greater than an operating range if $(\Delta T_1-\Delta T_2)$ is approximately equal to ΔT. In FIGS. 13 and 15, the range-ambiguity time parameter Δτ represents the time difference between the time periods $\tau_1$ and $\tau_2$, and since $\tau_1$ and $\tau_2$ have different values, the range-ambiguity time parameter Δτ is nonzero. For example, if $\tau_1$ is approximately 1.5 μs and $\tau_2$ is approximately 1.6 μs, then the range-ambiguity time parameter Δτ is approximately 0.1 μs. In FIG. 13, if $\Delta T_1$ and $\Delta T_2$ are each approximately equal to 1.33 μs, then the expression $(\Delta T_1-\Delta T_2)$ is approximately equal to zero, and in this case, $(\Delta T_1-\Delta T_2)$ is not equal to ΔT. The expression $(\Delta T_1-\Delta T_2)$ being not equal to Δτ may indicate that the target 130 is located a distance D that is less than the operating range of the lidar system 100. Additionally, this may indicate that the pixels 210 associated with the input optical pulses 410-1 and 410-2 are not range-wrapped. In FIG. 15, if $\Delta T_1$ is approximately 0.5 μs and $\Delta T_2$ is approximately 0.4 μs, then the expression $(\Delta T_1-\Delta T_2)$ is approximately equal to 0.1 μs. In this case, $(\Delta T_1-\Delta T_2)$ is approximately equal to Δτ, which indicates that the target 130 is located a distance D that is beyond the operating range of the lidar system 100. Additionally, this indicates that the pixels associated with the input optical pulses 410-1 and 410-2 are range-wrapped.

The expression $(\Delta T_1-\Delta T_2)$ being approximately equal to the range-ambiguity time parameter Δτ may refer to $(\Delta T_1-\Delta T_2)$ being within any suitable percentage of Δτ (e.g., within 50%, 20%, 10%, 5%, 1%, or 0.2% of Δτ). The expression $(\Delta T_1-\Delta T_2)$ being within a percentage P of Δτ may refer to $(\Delta T_1-\Delta T_2)$ being between $\Delta\tau\cdot(1+P/100)$ and $\Delta\tau\cdot(1-P/100)$. For example, if Δτ equals 0.1 μs, then $(\Delta T_1-\Delta T_2)$ may be determined to be approximately equal to Δτ if $(\Delta T_1-\Delta T_2)$ is between 0.05 μs and 0.15 μs, which corresponds to $(\Delta T_1-\Delta T_2)$ being within 50% of Δτ (e.g., P=50). As another example, if Δτ equals 0.1 μs, then $(\Delta T_1-\Delta T_2)$ may be determined to be approximately equal to Δτ if $(\Delta T_1-\Delta T_2)$ is between 0.09 μs and 0.11 μs, which corresponds to $(\Delta T_1-\Delta T_2)$ being within 10% of Δτ (e.g., P=10).

In particular embodiments, a processor may be configured to determine whether a distance D to a target 130 is less than an operating range ($R_{OP}$) of a lidar system 100 based at least in part on one or more time intervals ΔT between the emission of an optical pulse and the subsequent detection of an input optical pulse. The time interval ΔT may correspond to a time between the emission of an optical pulse and the detection of an input optical pulse following the emitted optical pulse, where there are no other pulses between those two pulses (e.g., there are no intervening emitted optical pulses or detected input optical pulses between those two pulses). In the example of FIGS. 12 and 13, a processor may determine that the distance D to the target 130 is less than the operating range based at least in part on the two time intervals $\Delta T_1$ and $\Delta T_2$. A target 130 may be determined to be located a distance D that is less than the operating range if $\Delta T_1$ is approximately equal to $\Delta T_2$. In FIG. 13, if $\Delta T_1$ is 1.70 μs and $\Delta T_2$ is 1.70 μs, then the distance D to the target 130 may be less than $R_{OP}$, and the pixels 210 associated with the input optical pulses 410-1 and 410-2 may not be range-wrapped. The time interval $\Delta T_1$ being approximately equal to $\Delta T_2$ may refer to $\Delta T_1$ being within any suitable percentage of $\Delta T_2$ (e.g., $\Delta T_1$ may be within 50%, 20%, 10%, 5%, 1%, or 0.2% of $\Delta T_2$). For example, if $\Delta T_1$ is 1.51 μs and $\Delta T_2$ is 1.56 μs, then $\Delta T_1$ is within 5% of $\Delta T_2$, which may indicate that the target 130 is located a distance D that is less than the operating range of the lidar system 100. As another example, if $\Delta T_1$ is 1.4 μs and $\Delta T_2$ is 1.3 μs, then $\Delta T_1$ is within 10% of $\Delta T_2$, which may indicate that the target 130 is located a distance D that is less than the operating range of the lidar system 100.

A lidar system 100 as described or illustrated herein may be configured to mitigate range ambiguity. As an example, a lidar system 100 with a light source 110 that emits optical signals having different time periods between successive optical signals may be configured to mitigate range ambiguity. A lidar system 100 that provides range-ambiguity mitigation may be configured to make one or more of the following determinations: (1) determine that a target 130 is located at a distance that is greater than an operating range of the lidar system 100; (2) determine that a target 130 is located a distance that is within an operating range of the lidar system 100; (3) determine that one or more received optical pulses (or one or more pixels associated with one or more received optical pulses) may be associated with range ambiguity; (4) determine that one or more received optical pulses (or one or more pixels associated with one or more received optical pulses) may not be associated with range ambiguity. Additionally or alternatively, a lidar system 100 may be configured to ignore or discard a distance to a target 130 for a pulse or pixel associated with range ambiguity. Additionally or alternatively, a lidar system 100 may be configured to correct or compensate for range ambiguity by determining a corrected distance to a target 130 for a pulse or pixel associated with range ambiguity. Additionally or alternatively, a lidar system 100 may be configured to tag pixels 210 that are determined to be range-wrapped. Other conventional lidar systems that do not include a light source that emits optical signals having different successive time periods may be unable to mitigate range ambiguity or may provide incorrect distances to targets located beyond a lidar-system operating range.

For a target 130 located a distance D that is less than the operating range $R_{OP}$, the time interval ΔT (e.g., the time between emission of an optical pulse and the subsequent detection of an input optical pulse that includes scattered light from the emitted optical pulse) may not be related to or affected by the time-period variation between successive optical signals. In FIG. 13, since the input optical pulse 410-1 includes scattered light from the emitted pulse 400-2, the value of $\Delta T_1$ is not related to the time period $\tau_1$ or $\tau_2$. Similarly, since the input optical pulse 410-2 includes scattered light from the emitted pulse 400-3, the value of $\Delta T_2$ is not related to the time period $\tau_1$ or $\tau_2$. In the example of FIG. 13, the values of $\Delta T_1$ and $\Delta T_2$ are approximately the same and are not affected by which time period ($\tau_1$ or $\tau_2$) separates successive emitted optical pulses. Based on this, if the values for $\Delta T_1$ and $\Delta T_2$ are approximately the same, a processor may determine that the distance D is less than the operating range.

In contrast, for a target 130 located a distance D that is beyond the operating range $R_{OP}$, the time interval $\Delta T$ may be related to or affected by the time-period variation between successive optical signals. In FIG. 15, since the input optical pulse 410-1 includes scattered light from the emitted pulse 400-1 (and does not include scattered light from the emitted pulse 400-2), the value of $\Delta T_1$ depends on the time period $\tau_1$ (e.g., $\Delta T_1 = T_1 - \tau_1$). Similarly, since the input optical pulse 410-2 includes scattered light from the emitted pulse 400-2, the value of $\Delta T_2$ depends on the time period $\tau_2$ (e.g., $\Delta T_2 = T_2 - \tau_2$). The values $T_1$ and $T_2$ correspond to the respective round-trip times for the emitted optical pulses 400-1 and 400-2 to travel to the target 130 and back to the lidar system 100. Since the emitted optical pulses 400-1 and 400-2 may be scattered from nearby parts of the target 130, the values $T_1$ and $T_2$ may be approximately equal. This means that $\Delta T_1 + \tau_1$ is approximately equal to $\Delta T_2 + \tau_2$, or $(\Delta T_1 - \Delta T_2)$ is approximately equal to $(\tau_2 - \tau_1)$. In the example of FIG. 15, the values of $\Delta T_1$ and $\Delta T_2$ are unequal, and $\Delta T_1$ and $\Delta T_2$ differ by an amount that is approximately equal to the difference in the time periods $\tau_1$ and $\tau_2$. Based on this, if $(\Delta T_1 - \Delta T_2)$ is approximately equal to $\Delta \tau$, a processor may determine that the distance D is greater than the operating range.

In particular embodiments, in response to determining that a distance D to a target 130 is less than an operating range $R_{OP}$, a processor may be configured to determine a distance $D_1$ to the target 130 and determine a distance $D_2$ to the target 130. The distance $D_1$ corresponds to the distance D in FIG. 12 as determined from the round-trip time for emitted pulse 400-2, and the distance $D_2$ corresponds to the distance D as determined from the round-trip time for emitted pulse 400-3. In FIG. 13, the distance $D_1$ may be associated with emitted pulse 400-2 and received pulse 410-1 (e.g., $D_1$ corresponds to the round-trip distance traveled by the emitted pulse 400-2), and the distance $D_2$ may be associated with emitted pulse 400-3 and received pulse 410-2. Since the received pulses 410-1 and 410-2 are not range-wrapped, the distances $D_1$ and $D_2$ depend on the respective time intervals $\Delta T_1$ and $\Delta T_2$ (and do not depend on the pulse period $\tau_1$ or $\tau_2$). In FIG. 13, the distance $D_1$ may be associated with the first input optical signal 410-1 based on the expression $D_1 = c \cdot \Delta T_1 / 2$, where $\Delta T_1$ corresponds to the round-trip time for the emitted optical pulse 400-2 to travel to the target 130 and back to the lidar system 100. Similarly, the distance $D_2$ may be associated with the second input optical signal 410-2 based on the expression $D_2 = c \cdot \Delta T_2 / 2$, where $\Delta T_2$ corresponds to the round-trip time for the emitted optical pulse 400-3. Since the optical pulses 400-2 and 400-3 are emitted sequentially, they may be scattered from nearby parts of the target 130, and the distances $D_1$ and $D_2$ may be approximately equal (e.g., $D_1$ and $D_2$ may differ by less than approximately 10%, 5%, 2%, 1%, 0.5%, or 0.1%). For example, in FIG. 13, $\Delta T_1$ may be approximately 1.330 μs and $\Delta T_2$ may be approximately 1.333 μs, which corresponds to a distance $D_1$ of approximately 199.5 m and a distance $D_2$ of approximately 200.0 m.

In particular embodiments, in response to determining that a distance D to a target 130 is greater than an operating range $R_{OP}$, a processor may be configured to determine a distance $D'_1$ to the target 130 and determine a distance $D'_1$ to the target 130. The distance $D'_1$ corresponds to the distance D in FIG. 14 as determined from the round-trip time for emitted pulse 400-1, and the distance $D_2$ corresponds to the distance D as determined from the round-trip time for emitted pulse 400-2. Each of the distances $D'_1$ and $D'_2$ may be referred to as a corrected distance. In FIG. 15, distance $D'_1$ may be associated with emitted pulse 400-1 and received pulse 410-1 (e.g., received pulse 410-1 may include scattered light from emitted pulse 400-1), and distance $D'_2$ may be associated with emitted pulse 400-2 and received pulse 410-2. Since the received pulses 410-1 and 410-2 are range-wrapped, the distances $D'_1$ and $D'_2$ depend on the respective time intervals $T_1$ and $T_2$. In FIG. 15, the distance $D'_1$ may be associated with the emitted optical pulse 400-1 based on the expression $D'_1 = c \cdot T_1 / 2$. The time interval $T_1$ corresponds to the round-trip time for the emitted optical pulse 400-1 to travel to the target 130 and back to the lidar system 100 and may be determined from the expression $T_1 = \tau_1 + T_1$. Alternatively, the time interval $\tau_1$ may be determined by subtracting a time-count value corresponding to emission of optical pulse 400-1 from a time-count value corresponding to detection of input optical pulse 410-1. Additionally, in FIG. 15, the distance $D'_2$ may be associated with the emitted optical pulse 400-2 based on the expression $D'_2 = c \cdot T_2 / 2$. The time interval $T_2$ corresponds to the round-trip time for the emitted optical pulse 400-2 and may be determined from the expression $T_2 = \tau_2 + \Delta T_2$. Alternatively, the time interval $T_2$ may be determined by subtracting a time-count value corresponding to emission of optical pulse 400-2 from a time-count value corresponding to detection of input optical pulse 410-2. Since the optical pulses 400-1 and 400-2 are emitted sequentially, they may be scattered from nearby parts of the target 130, and the distances $D'_1$ and $D'_2$ may be approximately equal (e.g., $D'_1$ and $D'_2$ may differ by less than approximately 10%, 5%, 2%, 1%, 0.5%, or 0.1%). For example, in FIG. 15, the time periods $\tau_1$ and $\tau_2$ may be 1.5 μs and 1.6 μs, respectively, and the time intervals $\Delta T_1$ and $\Delta T_2$ may be 0.5 μs and 0.404 μs, respectively. Based on this, $T_1$ is 2.0 μs and $T_2$ is 2.004 μs, which corresponds to a distance $D'_1$ of approximately 300.0 m and a distance $D'_2$ of approximately 300.6 m.

In particular embodiments, the distances $D_1$ and $D_2$ may be approximately equal depending on (1) an amount of lidar-system jitter or error, (2) an amount of relative movement of the lidar system 100 and target 130 between measurements, or (3) a shape or orientation of the target 130. Similarly, the corrected distances $D'_1$ and $D'_2$ may be approximately equal depending on (1) an amount of lidar-system jitter or error, (2) an amount of relative movement of the lidar system 100 and target 130 between measurements, or (3) a shape or orientation of the target 130. The jitter or error in a lidar system 100 may arise from an inaccuracy in determining the time when a pulse is emitted or an inaccuracy in determining the time when a pulse is received. For example, if the actual distances $D_1$ and $D_2$ are equal, but the time intervals $\Delta T_1$ and $\Delta T_2$ differ by 0.001 μs due to lidar-system jitter or error, there may be a discrepancy of approximately 0.15 m between the determined values for the distances $D_1$ and $D_2$. If the lidar system 100 or target 130 is moving, then the distance values for two measurements may be different due to the movement between the measurements. For example, if the target 130 is moving at 100 mph (or, approximately 44.7 m/s) relative to the lidar system and two measurements are separated by a 2-ms time interval, then there may be a discrepancy of approximately 0.09 m between the two distance measurements. The shape or orientation of a target 130 may also contribute to a difference between the distances $D_1$ and $D_2$ or the distances $D'_1$ and $D'_2$. A target 130 that is tilted or oriented at an angle relative to the lidar system may result in a difference between the distances $D_1$ and $D_2$ or the distances $D'_1$ and $D'_2$ that is related to the transverse separation between the emitted pulses 400-1 and 400-2 and the angle of the target 130. For example, for a flat target 130 that is tilted at a 45-degree angle, if the transverse separation between pulses 400-1 and 400-2 at the target 130 is approximately 0.2 m, then there may be a difference of approximately 0.2 m between the distances (e.g., $D_1$ may be 150 m and $D_2$ may be 150.2 m).

In particular embodiments, when comparing two time or distance values to determine whether they are approximately equal, an amount of possible error or discrepancy between the two values may be accounted for when making the comparison. For example, if distance values may differ by up to 1 m (e.g., due to a combination of lidar-system jitter, relative movement, or the shape or orientation of a target 130), then two distance values that differ by less than 1 m may be determined to be approximately equal. As another example, if time intervals may differ by up to 0.02 µs (e.g., due to a combination of lidar-system jitter, relative movement, and the shape or orientation of a target 130), then two time values (e.g., $\Delta T_1$ and $\Delta T_2$) that differ by less than 0.02 µs may be determined to be approximately equal.

In FIG. 17, the output beam 125 includes the emitted optical pulses 400-1, 400-2, 400-3, 400-4 and 400-5. The second optical pulse 400-2 is emitted a time period $\tau_1$ after the first optical pulse 400-1, and the third optical pulse 400-3 is emitted a time period $\tau_2$ after the second optical pulse 400-2, where the time periods $T_1$ and $\tau_2$ are different. For example, time period $\tau_1$ may be approximately 1.6 µs, and time period $\tau_2$ may be approximately 1.5 µs. The input beam 135 in FIG. 17 includes the received optical pulses 410-1, 410-2, and 410-4. The input optical pulse 410-1 may include scattered light from emitted optical pulse 400-1, and the input optical pulse 410-2 may include scattered light from emitted optical pulse 400-2. Additionally, the input optical pulse 410-4 may include scattered light from the emitted optical pulse 400-4. The first input optical pulse 410-1 is detected a time interval $T_1$ after the first optical pulse 400-1 is emitted and a time interval $\Delta T_1$ after the second optical pulse 400-2 is emitted. The second input optical pulse 410-2 is detected a time interval $T_2$ after the second optical pulse 400-2 is emitted and a time interval $\Delta T_2$ after the third optical pulse 400-3 is emitted. Additionally, the first input optical pulse 410-1 is detected before the third optical pulse 400-3 is emitted, which corresponds to the time interval $\Delta T_1$ being less than the second time period $\tau_2$. Similarly, the second input optical pulse 410-2 is detected before the fourth optical pulse 400-4 is emitted, which corresponds to the time interval $\Delta T_2$ being less than the third time period $\tau_3$. The time intervals $\Delta T_1$, $\Delta T_2$, and $\Delta T_4$ may each be determined by a processor based on time-count values associated with the emission of an optical pulse and the subsequent detection of an input optical signal.

In particular embodiments, in response to determining that a distance D to a target 130 is greater than an operating range $R_{OP}$, a processor may be configured to instruct the light source 110 to emit a ranging pulse to determine the distance D. The ranging pulse may be followed by a subsequent optical pulse that is emitted a time period $\tau_4$ that is greater than a ranging time $\tau_R$, where the ranging time is approximately equal to a round-trip time for an optical pulse to travel to the target 130 and back to the lidar system 100. In the example of FIG. 17, the ranging time $\tau_R$ may be approximately equal to $(\tau_1+\Delta T_1)$ or $(\tau_2+\Delta T_2)$. In FIG. 17, the time intervals $\Delta T_1$ and $\Delta T_2$ associated with the received optical pulses 410-1 and 410-2, respectively, may be used to determine that the target 130 is located beyond the operating range, and the lidar system 100 may emit a fourth optical pulse 400-4 as a ranging pulse. The ranging pulse 400-4 may be emitted a time interval $\tau_3$ after pulse 400-3 that is greater than the ranging time, or the ranging pulse may be emitted at a later time (e.g., during a subsequent scan of a scan line or frame). The lidar system 100 may also emit a fifth optical pulse 400-5 a time interval $\tau_4$ after pulse 400-4 that is greater than the ranging time $\tau_R$. Setting the time interval $\tau_4$ to a value that is greater than the ranging time $\tau_R$ may allow the input pulse 410-4 (which includes scattered light from the emitted optical pulse 400-4) to be detected without range ambiguity before the optical pulse 400-5 is emitted. The distance D may be determined from the expression $D=c\cdot\Delta T_4/2$, where the time interval $\Delta T_4$ (which is less than $\tau_4$) is the round-trip time for the ranging pulse 400-4 to travel to the target 130 and back to the lidar system 100. For example, the time interval $\Delta T_4$ may be approximately equal to $(\tau_1+\Delta T_1)$ or $(\tau_2+\Delta T_2)$.

In particular embodiments, a range-ambiguity distance parameter $\Delta d$ may be expressed as $\Delta d=c\cdot(\tau_2-\tau_1)/2$, and a target 130 may be determined to be located a distance D that is greater than an operating range if $c\cdot(\Delta T_1-\Delta T_2)/2$ is approximately equal to $\Delta d$. The range-ambiguity distance parameter $\Delta d$ corresponds to the range-ambiguity time parameter $\Delta T$ expressed as a distance value. Similarly, the expression $c\cdot(\Delta T_1-\Delta T_2)/2$ corresponds to the time difference $(\Delta T_1-\Delta T_2)$ expressed as a distance value. In the example of FIG. 13, if $\tau_1$ is 1.5 µs and $\tau_2$ is 1.6 µs, then the range-ambiguity time parameter $\Delta \tau$ is 0.1 µs, and the corresponding range-ambiguity distance parameter $\Delta d$ is approximately 15 m. If $\Delta T_1$ and $\Delta T_2$ are each approximately equal to 1.10 µs, then the expression $c\cdot(\Delta T_1-\Delta T_2)/2$ equals zero and is not equal to $\Delta d$. The expression $c\cdot(\Delta T_1-\Delta T_2)/2$ being not equal to $\Delta d$ may indicate that the target 130 is not located beyond the operating range of the lidar system 100 (e.g., the target 130 may be located a distance D that is less than $R_{OP}$). Additionally, this may indicate that the pixels 210 associated with the input optical pulses 410-1 and 410-2 are not range-wrapped. In FIG. 15, if $\tau_1$ is 1.5 µs and $\tau_2$ is 1.6 µs, then the range-ambiguity distance parameter $\Delta d$ is approximately 15 m. If $\Delta T_1$ is approximately 0.5 µs and $\Delta T_2$ is approximately 0.4 µs, then the expression $c\cdot(\Delta T_1-T_2)/2$ is approximately equal to 15 m. In this case, the expression $c\cdot(\Delta T_1-T_2)/2$ is approximately equal to $\Delta d$, which may indicate that the target 130 is located a distance D that is beyond the operating range of the lidar system 100. Additionally, this may indicate that the pixels associated with the input optical pulses 410-1 and 410-2 are range-wrapped. The expression $c\cdot(\Delta T_1-\Delta T_2)/2$ being approximately equal to the range-ambiguity distance parameter $\Delta d$ may refer to $c\cdot(\Delta T_1-\Delta T_2)/2$ being within any suitable percentage of $\Delta d$ (e.g., within 50%, 20%, 10%, 5%, 1%, or 0.2% of $\Delta d$).

In particular embodiments, a processor may be configured to determine a preliminary distance $D_1$ associated with a first input optical signal 410-1 and a preliminary distance $D_2$ associated with a second input optical signal 410-2. The preliminary distance $D_1$ may be determined from the expression $D_1=c\cdot\Delta T_1/2$, and the preliminary distance $D_2$ may be determined from the expression $D_2=c\cdot\Delta T_2/2$. The time intervals $\Delta T_1$ and $\Delta T_2$ each correspond to a time between the emission of an optical pulse and the detection of an input optical pulse following the emitted optical pulse (e.g., there are no intervening emitted optical pulses or detected input optical pulses). In FIGS. 13, 15, 16, and 17, the time interval $\Delta T_1$ is the time between the emission of optical pulse 400-2 and the detection of input optical pulse 410-1 (with no intervening pulses between these two pulses), and the time interval $\Delta T_2$ is the time between the emission of optical pulse 400-3 and the detection of input optical pulse 410-2 (with no intervening pulses between these two pulses).

In the case where the preliminary distances $D_1$ and $D_2$ are approximately equal (e.g., $D_1$ is within 50%, 20%, 10%, 5%, 1%, or 0.2% of $D_2$), a processor may determine that the distance D to the target 130 is less than the operating range $R_{OP}$. This indicates that the input pulses 410-1 and 410-2 are not range-wrapped (e.g., input pulse 410-1 includes scattered light from emitted pulse 400-2, and input pulse 410-2 includes scattered light from emitted pulse 400-3). In response to determining that the distance to the target 130 is less than the operating range, the processor may determine that the distance to the target 130 associated with the emitted optical pulse 400-2 is $D_1$. Additionally, the processor may determine that the distance to the target 130 associated with the emitted optical pulse 400-3 is $D_2$. In FIG. 13, the time interval $\Delta T_1$ may be 1.200 μs (corresponding to a preliminary distance $D_1$ of approximately 180.0 m), and the time interval $\Delta T_2$ may be 1.202 μs (corresponding to a preliminary distance $D_2$ of approximately 180.3 m). Since $D_1$ is approximately equal to $D_2$ (e.g., $D_1$ is within 0.2% of $D_2$), the distance to the target 130 in FIG. 12 may be less than the operating range $R_{OP}$. Additionally, the distance to the target 130 associated with the emitted optical pulse 400-2 and the input optical pulse 410-1 is $D_1$ (180.0 m), and the distance to the target 130 associated with the emitted optical pulse 400-3 and the input optical pulse 410-2 is $D_2$ (180.3 m).

In the case where the difference between the preliminary distances, $D_1-D_2$, is approximately equal to the range-ambiguity distance parameter $\Delta d$, a processor may determine that the distance D to the target 130 is greater than the operating range $R_{OP}$. The range-ambiguity distance parameter $\Delta d$ may be expressed as $\Delta d=c\cdot(\tau_2-\tau_1)/2$. The expression $D_1-D_2$ being approximately equal to $\Delta d$ may correspond to $D_1-D_2$ being within 50%, 20%, 10%, 5%, 1%, or 0.2% of $\Delta d$. If $D_1-D_2$ is approximately equal to $\Delta d$, then the input pulses 410-1 and 410-2 may be range-wrapped (e.g., input pulse 410-1 includes scattered light from emitted pulse 400-1, and input pulse 410-2 includes scattered light from emitted pulse 400-2). In response to determining that the distance to the target 130 is greater than the operating range, the processor may determine a corrected distance $D'_1$ associated with the emitted optical pulse 400-1, where $D'_1$ is determined from the expression $D'_1=D_1+c\cdot\tau_1/2$. Additionally, the processor may determine a corrected distance $D'_2$ associated with the emitted optical pulse 400-2, where $D'_2$ is determined from the expression $D'_2=D_2+c\cdot\tau_2/2$. Here, the preliminary distances $D_1$ and $D_2$ correspond to range-wrapped distances, and the corrected distances $D'_1$ and $D'_2$ correspond to actual distances to the target 130. In FIG. 15, the pulse period $\tau_1$ may be 1.5 μs, and the pulse period $\tau_2$ may be 1.6 μs, which corresponds to a range-ambiguity distance parameter of $\Delta d=15$ m. The time interval $\Delta T_1$ may be 0.500 μs (corresponding to a preliminary distance $D_1$ of approximately 75.0 m), and the time interval $\Delta T_2$ may be 0.402 μs (corresponding to a preliminary distance $D_2$ of approximately 60.3 m). The difference between the preliminary distances is $D_1-D_2=14.7$ m, which is approximately equal to the 15-m range-ambiguity distance parameter. This indicates that the distance to the target 130 in FIG. 14 is greater than the operating range. Additionally, from the expression $D'_1=D_1+c\cdot\tau_1/2$, the actual distance to the target associated with the emitted optical pulse 400-1 and the input optical pulse 410-1 is $D'_1=75$ m+225 m=300 m. Similarly, from the expression $D'_2=D_2+c\cdot\tau_2/2$, the actual distance to the target associated with the emitted optical pulse 400-2 and the input optical pulse 410-2 is $D'_2=60.3$ m+240 m=300.3 m.

In the examples of FIGS. 14-17, the distance D to the target 130 being greater than the operating range $R_{OP}$ may be associated with: (1) the input optical pulse 410-1 including a portion of the emitted optical pulse 400-1 that is scattered by the target 130 and (2) the input optical pulse 410-2 including a portion of the emitted optical pulse 400-2 that is scattered by the target 130. Additionally, the input optical pulse 410-1 may include little or no light from the emitted optical pulse 400-2, and the input optical pulse 410-2 may include little or no light from the emitted optical pulse 400-1 or 400-3. In each of FIGS. 15, 16, and 17, the emitted optical pulse 400-1 propagates from the lidar system 100 to the target 130 and is scattered by the target 130. A portion of the scattered light from pulse 400-1 propagates back to the lidar system 100 and is received by the lidar system 100 as input optical pulse 410-1. The round-trip time for the emitted optical pulse 400-1 to propagate to the target 130 and back to the lidar system 100 is represented by the time interval $T_1$. Similarly, the emitted optical pulse 400-2 is scattered by the target 130, and a portion of the scattered light from pulse 400-2 is received by the lidar system 100 as input optical pulse 410-2. The round-trip time for the emitted optical pulse 400-2 to propagate to the target 130 and back to the lidar system 100 is represented by the time interval $T_2$.

In the examples of FIGS. 12 and 13, the distance D to the target 130 being less than the operating range $R_{OP}$ may be associated with: (1) the input optical pulse 410-1 including a portion of the emitted optical pulse 400-2 that is scattered by the target 130 and (2) the input optical pulse 410-2 including a portion of the emitted optical pulse 400-3 that is scattered by the target 130. Additionally, the input optical pulse 410-1 may include little or no light from the emitted optical pulse 400-1, and the input optical pulse 410-2 may include little or no light from the emitted optical pulse 400-1 or 400-2. In FIGS. 12 and 13, the emitted optical pulse 400-2 propagates from the lidar system 100 to the target 130 and is scattered by the target 130. A portion of the scattered light from pulse 400-2 propagates back to the lidar system 100 and is received by the lidar system 100 as input optical pulse 410-1. The round-trip time for the emitted optical pulse 400-2 to propagate to the target 130 and back to the lidar system 100 is represented by the time interval $\Delta T_1$. Similarly, the emitted optical pulse 400-3 is scattered by the target 130, and a portion of the scattered light from pulse 400-3 is received by the lidar system 100 as input optical pulse 410-2. The round-trip time for the emitted optical pulse 400-3 to propagate to the target 130 and back to the lidar system 100 is represented by the time interval $\Delta T_2$.

In particular embodiments, a processor or a receiver 140 of a lidar system 100 may determine three or more time intervals $\Delta T$, and the processor may determine whether the distance D to a target 130 is greater than an operating range $R_{OP}$ based at least in part on the three or more time intervals. Additionally or alternatively, the processor may determine whether the distance D is less than $R_{OP}$ based at least in part on the three or more time intervals. Each time interval $\Delta T$ may correspond to a duration of time between the emission of an optical pulse and the detection of a subsequent input optical pulse following the emitted optical pulse, where there are no other pulses between those two pulses (e.g., the time interval $\Delta T$ is free of intervening emitted optical pulses or detected input optical pulses between those two pulses). The input optical pulse may include scattered light from the emitted optical pulse, or the input optical pulse may include scattered light from a previously emitted optical pulse. By comparing three or more time intervals, a lidar system 100 may make a more accurate determination of whether or not a target 130 is range-wrapped (e.g., whether or not the target 130 is located beyond or within the operating range). For example, since three or more time intervals are considered, a single inaccurate time-interval measurement may be less likely to lead to an incorrect determination of whether a target 130 is range-wrapped.

In the example of FIGS. 14 and 16, a processor may determine that the distance D to the target 130 is greater than the operating range based at least in part on the three time intervals $\Delta T_1$, $\Delta T_2$, and $\Delta T_3$. For example, the processor may determine that the distance D is greater than $R_{OP}$ if the following two conditions are satisfied: (1) $\Delta T_2 - \Delta T_2$ is approximately equal to $(\tau_2 - \tau_1)$ and (2) $\Delta T_2 - \Delta T_3$ is approximately equal to $(\tau_3 - \tau_2)$. Both of these conditions must be met in order to determine that D is greater than $R_{OP}$. Similarly, for a series of four time intervals, there are three conditions that must be met in order to make the determination of whether D is greater than $R_{OP}$. In FIG. 16, the time periods $\tau_1$, $\tau_2$, and $\tau_3$ may be 1.7 µs, 1.5 µs, and 1.6 µs, respectively. If the three time intervals $\Delta T_1$, $\Delta T_2$, and $\Delta T_3$ are 0.3 µs, 0.5 µs, and 0.4 µs, respectively, then the above two conditions are satisfied, which indicates that the target 130 is located beyond the operating range of the lidar system 100. Additionally, the distance to the target 130 associated with the first input optical pulse 410-1 may be determined to be approximately 300 m based on the expression $D = c \cdot T_1 / 2$ or $D = c \cdot (\tau_1 + \Delta T_1) / 2$.

In the example of FIGS. 14 and 16, if the first time period $\tau_1$ is approximately equal to the third time period $\tau_3$ (e.g., the light source 110 alternates between the two time periods $\tau_1$ and $\tau_2$), then a processor may determine that the distance D is greater than $R_{OP}$ if the following two conditions are satisfied: (1) $\Delta T_1$ is approximately equal to $\Delta T_3$ and (2) $\Delta T_1 - \Delta T_2$ is approximately equal to $(\tau_2 - \tau_1)$. For example, if the time periods $\tau_1$, $\tau_2$, and $\tau_3$ are 1.6 µs, 1.5 µs, and 1.6 µs, respectively, and the time intervals $\Delta T_1$, $\Delta T_2$, and $\Delta T_3$ are 0.4 µs, 0.5 µs, and 0.4 µs, respectively, then the above two conditions are satisfied, which indicates that the target 130 is located beyond the operating range of the lidar system 100.

In particular embodiments, a processor or a receiver 140 of a lidar system 100 may determine three or more time intervals $\Delta T$, and the processor may determine whether the distance D to a target 130 is less than an operating range $R_{OP}$ based at least in part on the three or more time intervals. For example, if the three or more time intervals are approximately equal to one another, then the distance to the target 130 may be less than the operating range, which indicates that the pixels associated with the three or more time intervals are not range-wrapped. In the example of FIG. 16, if the values for $\Delta T_1$, $\Delta T_2$, and $\Delta T_3$ are each approximately equal to 0.5 µs, then this may indicate that D is less than $R_{OP}$. Additionally, the distance to the target 130 associated with the first input optical pulse 410-1 may be determined to be approximately 75 m based on the expression $D = c \cdot \Delta T_1 / 2$.

In particular embodiments, a processor of a lidar system 100 may be configured to determine whether a distance D to a target 130 is greater than an operating range $R_{OP}$ of the lidar system 100. This determination may be based at least in part on two or more time intervals associated with two or more respective input optical signals (e.g., time intervals $\Delta T_1$ and $\Delta T_2$ associated with the respective input optical signals 410-1 and 410-2 in FIG. 13, 15, 16, or 17). In response to determining that D is greater than $R_{OP}$, the processor may discard or disregard the optical signals, the time intervals, or one or more distances associated with the time intervals. In the example of FIG. 15, the processor may determine, based at least in part on the time intervals $\Delta T_1$ and $\Delta T_2$, that D is greater than $R_{OP}$. In response to this determination, the processor may discard the values for $\Delta T_1$ and $\Delta T_2$, or the processor may refrain from determining a distance to the target 130 associated with the input optical signal 410-1 or 410-2. Alternatively, in response to determining that D is greater than $R_{OP}$, a processor may determine one or more corrected distances to a target. In FIG. 15, the processor may determine a corrected distance associated with the emitted optical pulse 400-1 or the input optical pulse 410-1, where the corrected distance is based at least in part on the pulse period $\tau_1$, the time interval $\Delta T_1$, or the time interval $T_1$. Similarly, the processor may determine a corrected distance associated with the emitted optical pulse 400-2 or the input optical pulse 410-2, where the corrected distance is based at least in part on the pulse period $\tau_2$, the time interval $\Delta T_2$, or the time interval $T_2$.

In particular embodiments, in response to determining that a distance D to a target 130 is greater than an operating range $R_{OP}$, a processor may tag a pixel 210 that is associated with a range-wrapped input optical signal (e.g., input optical signal 410-1 or 410-2 in FIG. 15). Rather than discarding a pixel 210 or determining a corrected distance value for a pixel, the processor may tag the pixel to indicate that the pixel is range-wrapped. The information associated with the pixel (e.g., pixel location, pixel distance, a time value associated with the pixel, or a range-wrap tag) may be sent to another processor. The distance associated with the pixel 210 may be a range-wrapped distance, and the other processor may determine whether to discard the pixel or determine a corrected distance for the pixel.

In particular embodiments, a lidar system 100 may include a scanner 120 configured to scan an output beam 125 along a scan pattern 200 that includes multiple scan lines 230. In the example of FIG. 13, 15, 16, or 17, the emitted optical pulses 400-1, 400-2, 400-3, 400-4, or 400-5 may be associated with one scan line (e.g., scan line 230D in FIG. 5). For example, the emitted optical pulses may correspond to pixels 210 that are disposed in series on the scan line. In the example of FIG. 13, 15, 16, or 17, the input optical pulses 410-1 and 410-2 may correspond to pixels 210 that are disposed in series on a single scan line. A processor may determine whether the distance D to a target 130 is greater than an operating range based at least in part on two or more time intervals (e.g., time interval $\Delta T$ between emission of an optical pulse and detection of an input optical pulse) associated with two or more respective pixels 210. Additionally or alternatively, a processor may determine whether the distance D to a target 130 is greater than an operating range based at least in part on two or more distances (e.g., preliminary distances $D_1$ and $D_2$) associated with two or more respective pixels 210. The pixels 210 may be disposed in series on a single scan line or may be disposed on two or more different scan lines.

Figure 18:
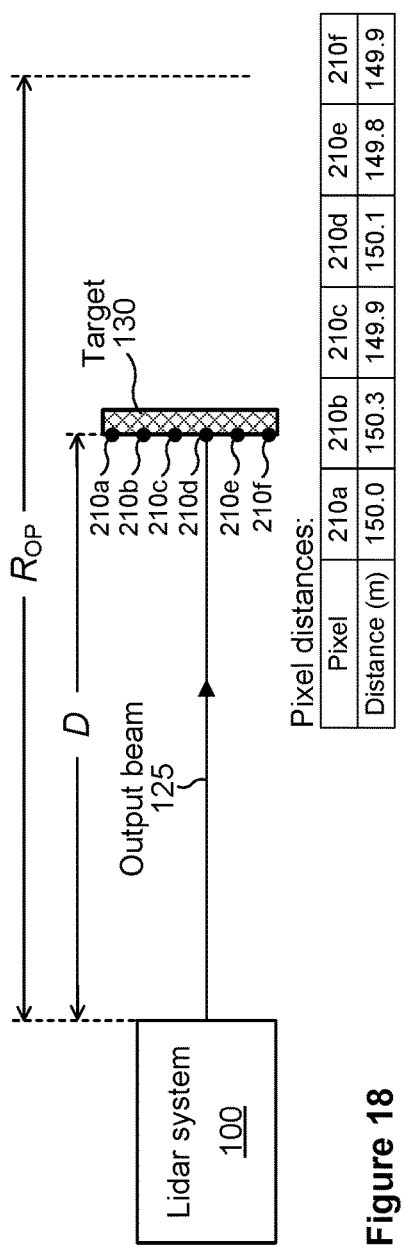
FIG. 18 illustrates a target located within an operating range of a lidar system and a group of pixels associated with the target.

FIG. 18 illustrates a target 130 located within an operating range $R_{OP}$ of a lidar system 100 and a group of pixels (210a, 210b, 210c, 210d, 210e, 210f) associated with the target 130. The target 130 is substantially flat and oriented substantially orthogonal to the output beam 125. The pixel distances listed in the table may correspond to preliminary distances, and each of the pixels in FIG. 18 may correspond to an emitted optical signal or an input optical signal. For example, pixel 210a may correspond to emitted optical pulse 400-2 and input optical pulse 410-1 in FIG. 13, and the associated distance for pixel 210a may be determined based on the time interval $\Delta T_1$. Similarly, pixel 210b may correspond to emitted optical pulse 400-3 and input optical pulse 410-2 in FIG. 13, and the associated distance for pixel 210b may be determined based on the time interval $\Delta T_2$. The target 130 in FIG. 18 is not range-wrapped since it is located a distance D that is less than $R_{OP}$. Accordingly, the pixels in FIG. 18 are not range-wrapped, and the distance associated with each pixel corresponds to an actual non-range-wrapped distance to the target 130. For example, the operating range may be approximately 200 m, and each of the pixels has an associated distance from the lidar system that is approximately equal to 150 m. The determination that the pixels in FIG. 18 are not range-wrapped may be based at least in part on the corresponding pixel distances (150.0 m, 150.3 m, 149.9 m, 150.1 m, 149.8 m, and 149.9 m) being approximately equal.

Figure 19:
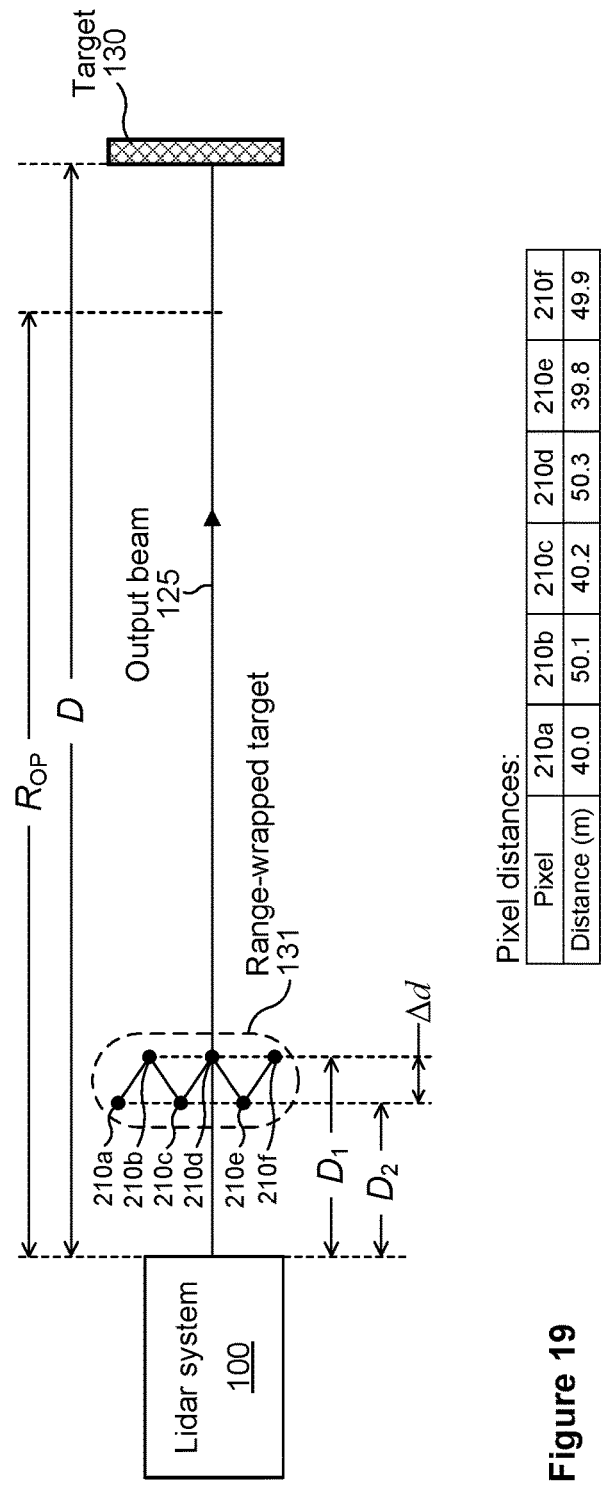
FIG. 19 illustrates a target located beyond an operating range of a lidar system and a group of range-wrapped pixels associated with the target.

FIG. 19 illustrates a target 130 located beyond an operating range $R_{OP}$ of a lidar system 100 and a group of range-wrapped pixels (210a, 210b, 210c, 210d, 210e, 210f) associated with the target 130. The pixel distances listed in the table correspond to preliminary distances, and each of the pixels in FIG. 19 may correspond to an emitted optical signal or an input optical signal. For example, pixel 210a may correspond to input optical pulse 410-1 in FIG. 15, 16, or 17, and the associated range-wrapped distance for pixel 210a may be determined based on the time interval $\Delta T_1$. Similarly, pixel 210b may correspond to input optical pulse 410-2 in FIG. 15, 16, or 17, and the associated range-wrapped distance for pixel 210b may be determined based on the time interval $\Delta T_2$. The target 130 in FIG. 19 is range-wrapped since it is located a distance D that is greater than $R_{OP}$. Due to range ambiguity, the actual target 130 may appear as a range-wrapped target 131 located at distances $D_1$ and $D_2$ from the lidar system 100. The range-wrapped pixel distances to the target vary sequentially between two values, approximately 40 m and approximately 50 m, and the variation between these two distances may correspond to the range-ambiguity distance parameter $\Delta d$, which is approximately 10 m. This 10-m variation between adjacent pixel distances is an indication that the target 130 is range-wrapped and that the actual target location is beyond the operating range. For example, if the operating range $R_{OP}$ is 200 m, then the actual distance D to the target 130 may be approximately 250 m.

Figure 20:
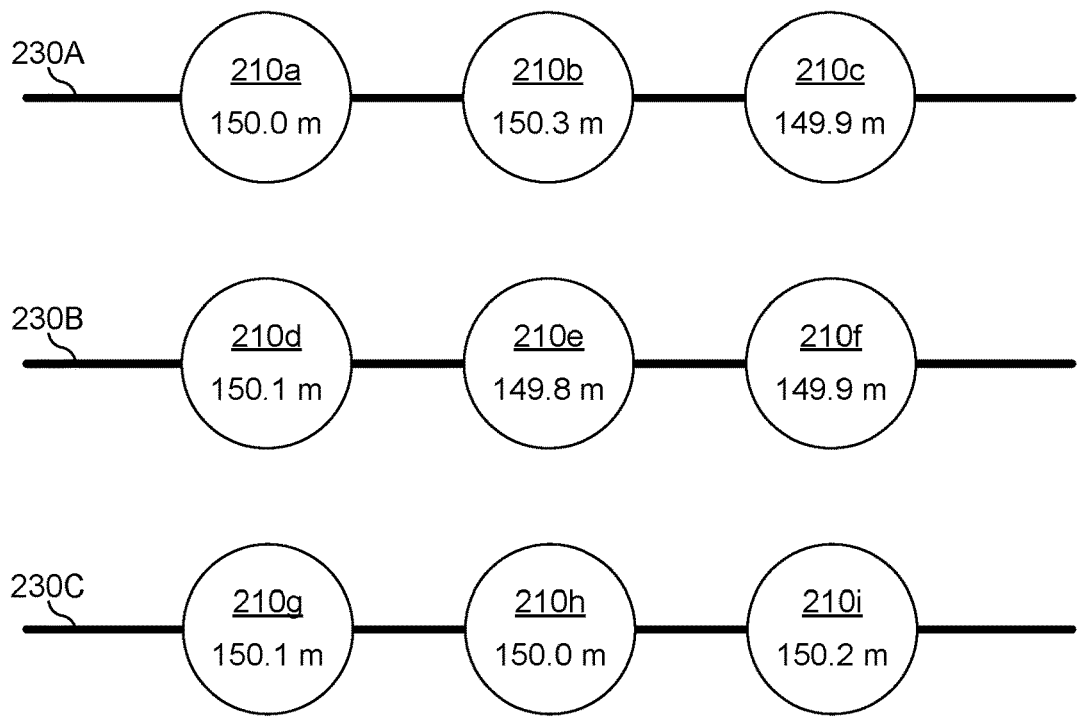
FIG. 20 illustrates a two-dimensional array of pixels for a target located within an operating range of a lidar system.

FIG. 20 illustrates a two-dimensional array of pixels (210a, 210b, 210c, 210d, 210e, 210f, 210g, 210h, 210i) for a target located within an operating range of a lidar system. The target may correspond to the non-range-wrapped target 130 in FIG. 18. The distance associated with each pixel is indicated within the pixel. For example, pixel 210a has an associated pixel distance of 150.0 m, and pixel 210b has an associated pixel distance of 150.3 m. The nine pixel distances in FIG. 20 are each approximately equal to 150 m, which may indicate that the target 130 is not range-wrapped and that each of the pixel distances corresponds to an actual non-range-wrapped distance. The scan lines 230A, 230B, and 230C may be part of a scan pattern 200, where: scan line 230A includes pixels 210a, 210b, and 210c; scan line 230B includes pixels 210d, 210e, and 210f; and scan line 230C includes pixels 210g, 210h, and 210i. The determination of whether a target is located beyond an operating range may be based at least in part on the distances associated with two or more pixels. For example, the distances for pixels 210d, 210e, and 210f may be compared to determine whether a target is located within the operating range. Additionally or alternatively, the distances for pixels on different scan lines (e.g., pixels 210b, 210e, and 210h) may be compared. Additionally or alternatively, the distances for three or more pixels within an area may be compared (e.g., the distances for the nine pixels in FIG. 20 may be compared) to determine whether a target is located beyond the operating range.

Figure 21:
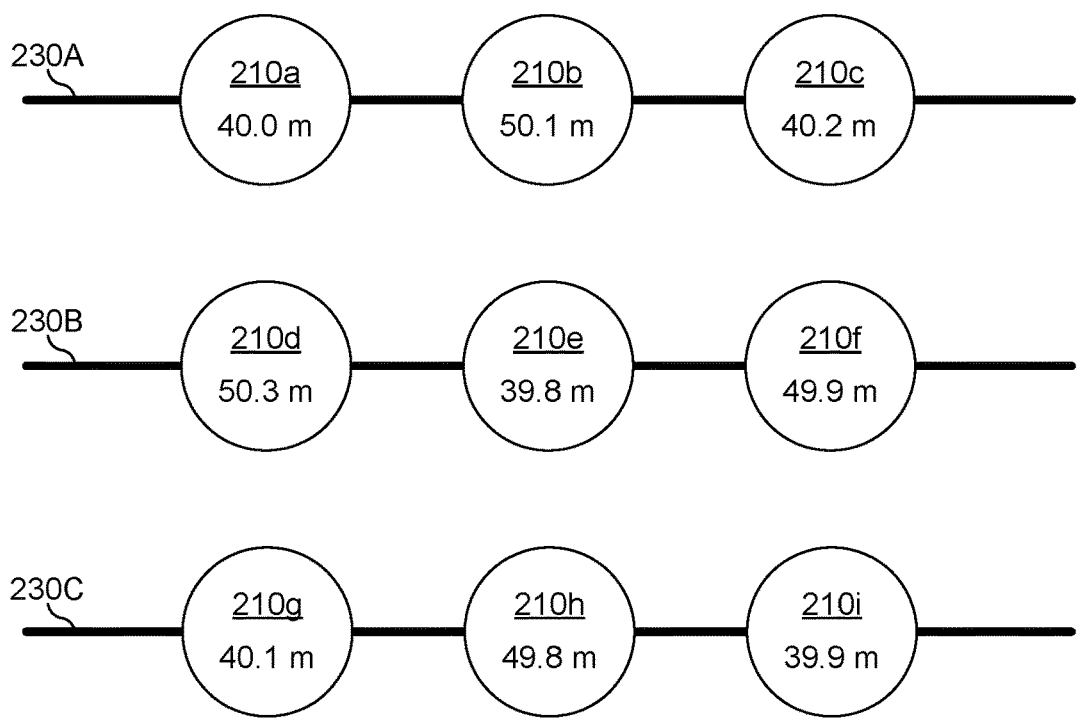
FIG. 21 illustrates a two-dimensional array of pixels for a target located beyond an operating range of a lidar system.

FIG. 21 illustrates a two-dimensional array of pixels (210a, 210b, 210c, 210d, 210e, 210f, 210g, 210h, 210i) for a target located beyond an operating range of a lidar system. The target may correspond to the range-wrapped target 130 in FIG. 19. The distance associated with each pixel is indicated within the pixel. For example, pixel 210a has an associated pixel distance of 40.0 m, and pixel 210b has an associated pixel distance of 50.1 m. The nine pixel distances in FIG. 21 vary between two values (approximately 40 m and approximately 50 m), and the 10-m variation between the pixel distances may indicate that the target is range-wrapped and that the actual target location is beyond the operating range. To determine whether a target is located beyond an operating range, a processor may compare: (1) the distances for pixels on one scan line (e.g., pixels 210d, 210e, and 210f), (2) the distances for pixels on two or more scan lines (e.g., pixels 210b, 210e, and 210h), or (3) the distances for multiple pixels located within a particular area (e.g., the nine pixels in FIG. 21).

Figure 22:
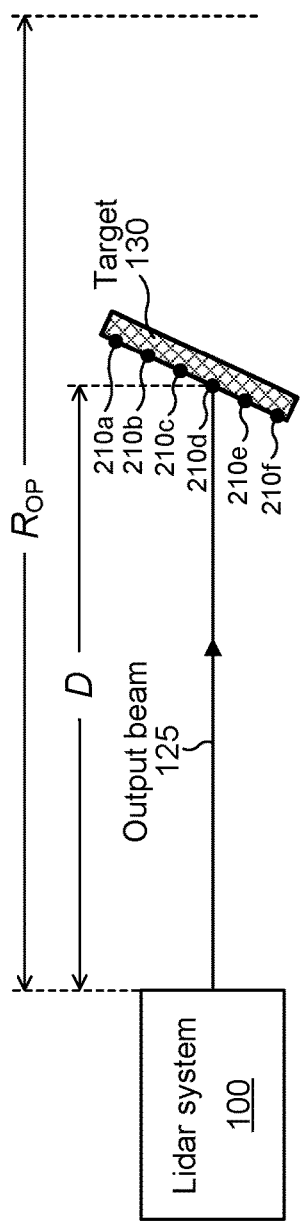
FIG. 22 illustrates a tilted target located within an operating range of a lidar system and group of pixels associated with the target.

FIG. 22 illustrates a tilted target 130 located within an operating range $R_{OP}$ of a lidar system 100 and group of pixels (210a, 210b, 210c, 210d, 210e, 210f) associated with the target 130. The target 130 is tilted with respect to the output beam 125, and this tilt results in a variation of the pixel distances from 149.0 m to 150.0 m. However, when determining whether the target 130 is located beyond the operating range, the pixel distances may be considered to be approximately equal since the variation in distance due to tilt is relatively small (e.g., less than 1% variation). As a result, even though the target 130 is oriented at an angle, a processor may determine that the pixels in FIG. 22 are not range-wrapped, and the distance associated with each pixel corresponds to an actual non-range-wrapped distance to the target 130.

Figure 23:
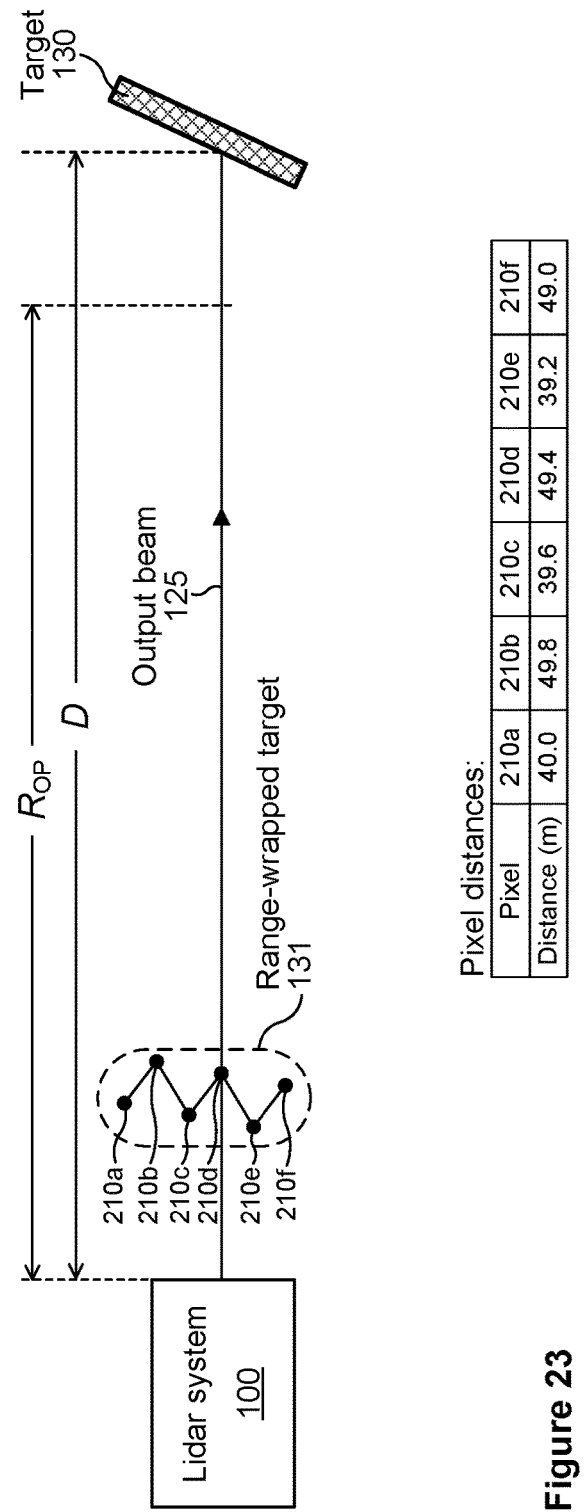
FIG. 23 illustrates a tilted target located beyond an operating range of a lidar system and a group of range-wrapped pixels associated with the target.

FIG. 23 illustrates a tilted target 130 located beyond an operating range $R_{OP}$ of a lidar system 100 and a group of range-wrapped pixels (210a, 210b, 210c, 210d, 210e, 210f) associated with the target 130. The pixel distances in FIG. 23 vary with respect to one another due to (1) the tilt of the target and (2) range ambiguity. However, the variation in distance due to tilt is relatively small (e.g., less than 1 m) compared to the approximate 10-m variation due to range ambiguity. As a result, even though the tilting of the target 130 causes an additional variation in pixel distance, a processor may determine that the pixels in FIG. 23 are range-wrapped because the pixel-distance variation is approximately equal to the 10-m range-ambiguity distance parameter $\Delta d$.

Figure 24:
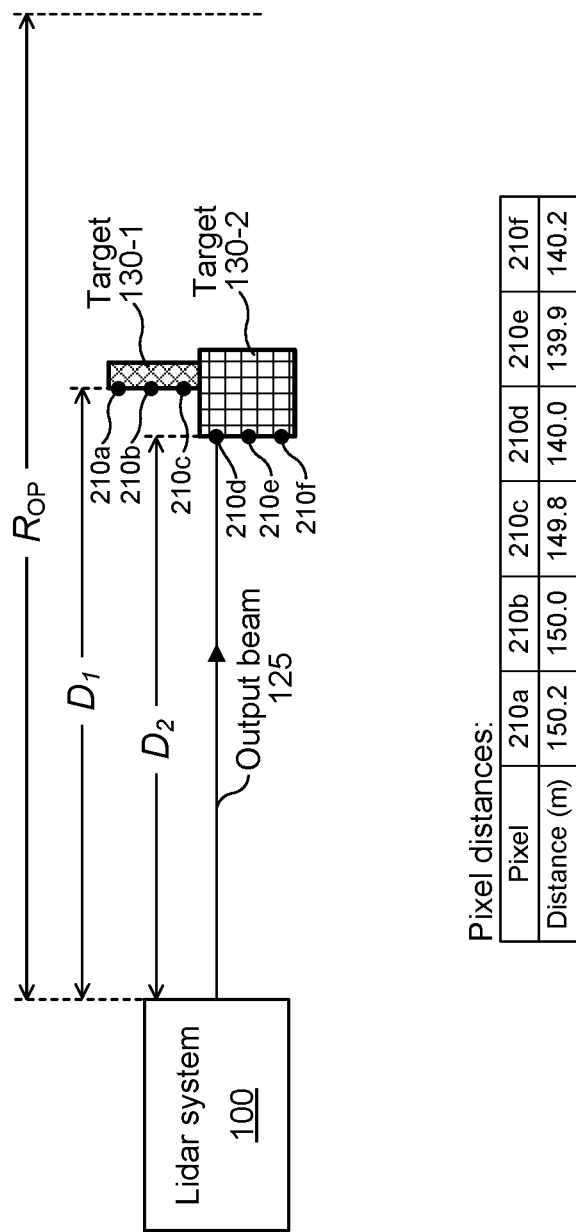
FIG. 24 illustrates two targets and two groups of associated pixels.

FIG. 24 illustrates two targets (130-1 and 130-2) and two groups of associated pixels (210a, 210b, 210c, 210d, 210e, 210f). The two targets 130-1 and 130-2 are located next to each other with target 130-1 being located approximately 10 meters farther away than target 130-2. In particular, there is a difference in pixel distance of approximately 10 meters between pixels 210a, 210b, 210c and pixels 210d, 210e, and 210f. A processor may compare the pixel distances for pixels 210a, 210b, and 210c and determine that target 130-1 is not range-wrapped, since the pixel distances are approximately equal to one another. Similarly, a processor may compare the pixel distance for pixels 210d, 210e, and 210f and determine that target 130-2 is not range-wrapped. The distance variation between pixels 210c and 210d could lead to an incorrect determination that those pixels are range-wrapped. However, the six pixels in FIG. 24 do not exhibit the alternating distance variation of the range-wrapped pixels in FIGS. 19 and 23, and by considering more than two pixels at a time, the correct determination that the targets 130-1 and 130-2 are not range-wrapped may be made. For example, a processor may compare the pixel distances for 3, 4, 5, or 6 of the pixels to determine that the pixels are not range-wrapped and that the distance associated with each pixel corresponds to an actual non-range-wrapped distance.

Figure 25:
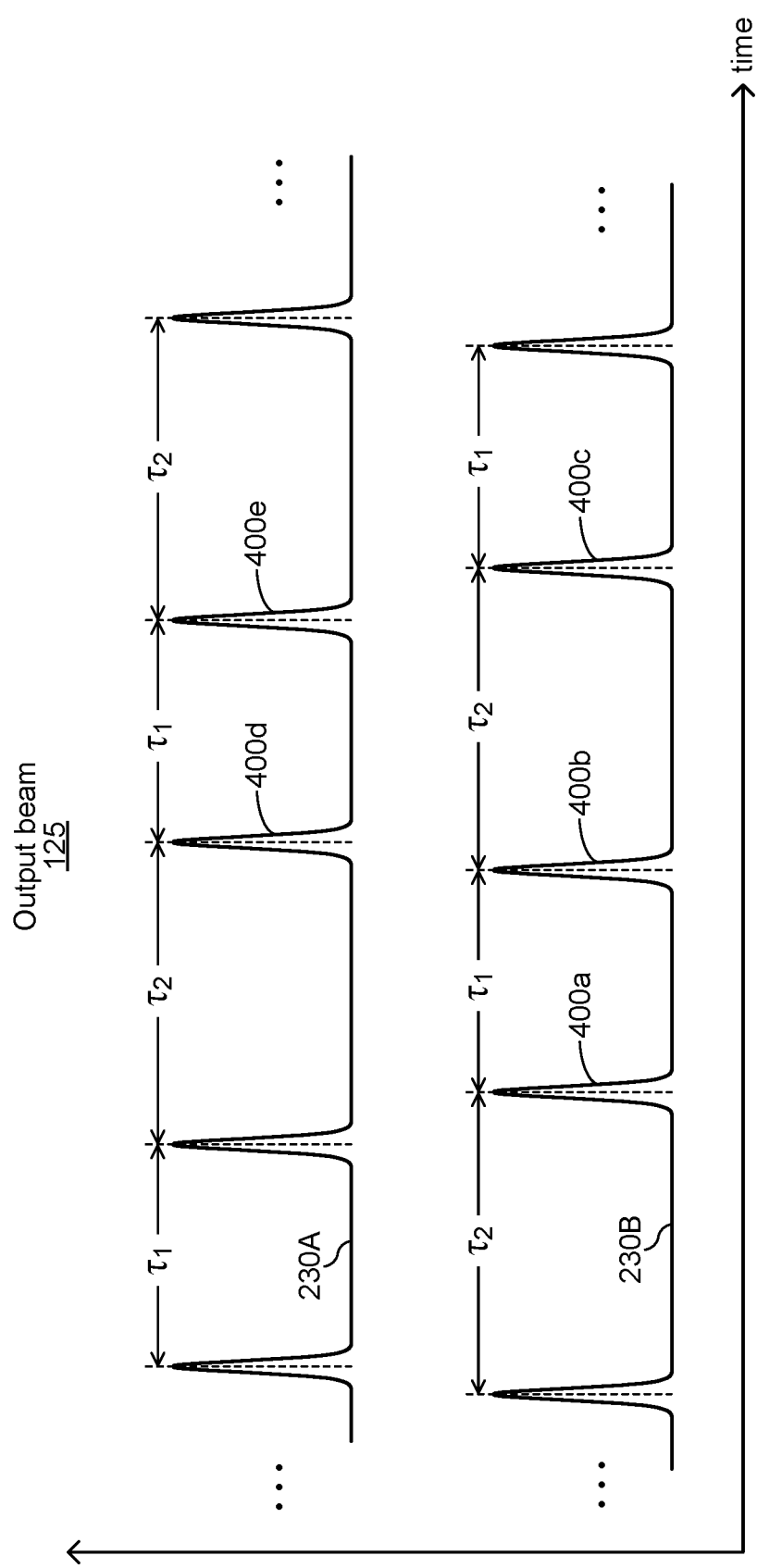
FIG. 25 illustrates an example output-beam temporal profile that alternates between two different pulse periods ($\tau_1$ and $\tau_2$).

FIG. 25 illustrates an example output-beam temporal profile that alternates between two different pulse periods ($\tau_1$ and $\tau_2$). The output beam 125 includes scan line 230A and scan line 230B, where the scan lines may be part of a scan pattern 200, and each emitted optical pulse or each input optical pulse may correspond to a pixel 230. In particular embodiments, adjacent scan lines of a scan pattern may have temporally offset pulse periods so that the pulse period varies along the direction of the scan as well as along the direction orthogonal to the scan. In FIG. 25, the pulse periods of scan lines 230A and 230B are temporally offset so that adjacent pulses along the vertical direction have different pulse periods. For example, a pixel corresponding to an input pulse that is received between the emitted pulses 400b and 400c may be associated with the pulse period $\tau_2$, while a pixel corresponding to an input pulse that is received between the emitted pulses 400d and 400e may be associated with the pulse period $\tau_1$. As another example, a distance or a time interval associated with emitted pulse 400b (e.g., a preliminary distance, or a time interval $\Delta T$ between emission of optical pulse 400b and detection of a subsequent input optical pulse) may be compared with corresponding distances or time intervals associated with emitted pulses 400a and 400c, where pulses 400a, 400b, and 400c are part of scan line 230B. Additionally or alternatively, the distance or time interval associated with emitted pulse 400b may be compared with a corresponding distance or time interval associated with emitted pulse 400d of scan line 230A.

Figure 26:
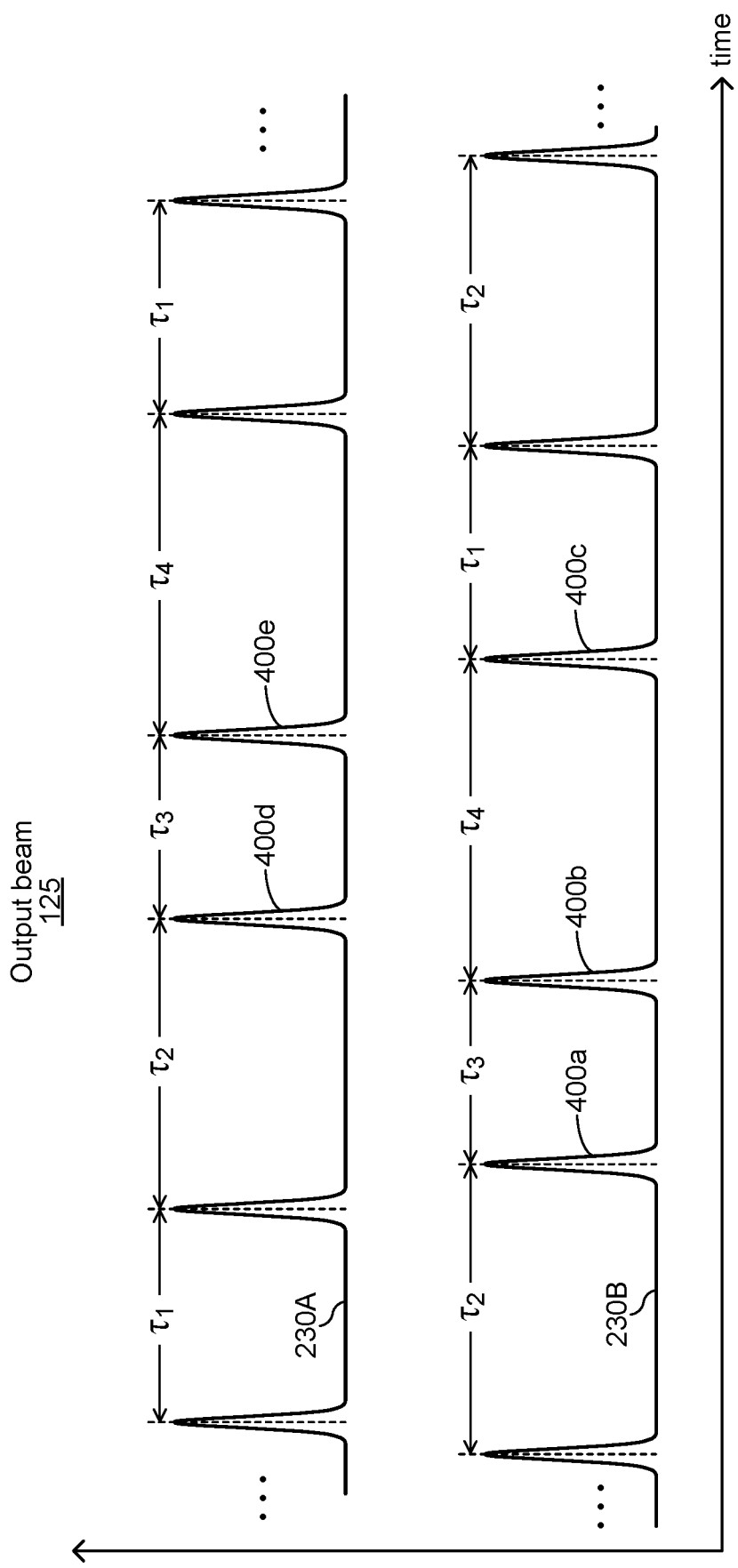
FIG. 26 illustrates an example output-beam temporal profile that alternates between four different pulse periods ($\tau_1$, $\tau_2$, $\tau_3$, and $\tau_4$).

FIG. 26 illustrates an example output-beam temporal profile that alternates between four different pulse periods ($\tau_1$, $\tau_2$, $\tau_3$, and $\tau_4$). A light source 110 may emit optical signals with time periods that alternate sequentially between two or more different time periods. The output beam 125 in FIG. 26 includes scan line 230A and scan line 230B, where the scan lines may be part of a scan pattern 200, and each emitted optical pulse or each input optical pulse may correspond to a pixel 210. The pulse periods of scan lines 230A and 230B are temporally offset so that adjacent pulses along the vertical direction have different pulse periods. For example, a pixel corresponding to an input pulse that is received between the emitted pulses 400b and 400c may be associated with the pulse period $\tau_4$, while a pixel corresponding to an input pulse that is received between the emitted pulses 400d and 400e may be associated with the pulse period $\tau_3$. As another example, a distance or a time interval associated with emitted pulse 400b may be compared with corresponding distances or time intervals associated with emitted pulses 400a and 400c, where pulses 400a, 400b, and 400c are part of scan line 230B. Additionally or alternatively, the distance or time interval associated with emitted pulse 400b may be compared with a corresponding distance or time interval associated with emitted pulse 400d of scan line 230A.

In particular embodiments, a processor of a lidar system 100 may generate a pixel 210 in response to receiving an input optical pulse. For example, controller 150 in FIG. 1 may be configured to generate multiple pixels 210, where each pixel corresponds to an input optical pulse detected by the receiver 140. A pixel 210 may refer to a data element that corresponds to an input optical pulse. A pixel 210 may include (1) location information for the pixel, (2) a pulse repetition interval (PRI) associated with the input optical pulse or with a most recently emitted optical pulse, or (3) range-wrap information for the pixel. A time period $\tau$ between successive optical pulses may be referred to as a time period, a pulse period, or a pulse repetition interval (PRI).

Location information for a pixel 210 may include a pixel distance. A pixel 210 may represent a point in space relative to a lidar system 100, and a pixel distance may correspond to the distance of the pixel 210 from the lidar system 100. A pixel distance may be determined from a time interval $\Delta T$ between emission of a corresponding most recently emitted optical pulse and subsequent detection of the input optical pulse, where $\Delta T$ is less than the PRI associated with the most recently emitted optical pulse. For example, a pixel distance D may be determined from the expression $D = c \cdot \Delta T/2$. Additionally or alternatively, the location information for a pixel 210 may include cartesian coordinates for the pixel (e.g., three rectangular coordinates x, y, and z) or spherical coordinates for the pixel (e.g., an azimuth angle $\Theta_x$, an altitude angle $\Theta_y$, and a radial distance), and the coordinates may represent the pixel location with respect to the lidar system. For example, for pixel 210 in FIG. 5, the spherical coordinates for the pixel may include the angles $\Theta_x$ and $\Theta_y$ associated with the pixel (e.g., +8° and +14°, respectively). The radial distance for a pixel may correspond to the distance of the pixel from the lidar system 100. In the example of FIG. 13, 15, 16, or 17, the radial distance $D_1$ for a pixel associated with the input pulse 410-1 may be determined from the expression $D_1 = c \cdot \Delta T_1/2$.

A pulse repetition interval (PRI) associated with a pixel 210 may include a PRI for the most recently emitted optical pulse by the light source 110 of the lidar system 100. The most recently emitted optical pulse (with respect to an input optical pulse) may refer to the optical pulse emitted immediately prior to detection of the input optical pulse. For example, in each of FIGS. 13, 15, 16, and 17, a pixel associated with the input pulse 410-1 may include an associated PRI value of $\tau_2$, corresponding to the PRI associated with the most recently emitted optical pulse 400-2. Similarly, in each of FIGS. 13 and 15, a pixel associated with the input pulse 410-2 may include an associated PRI value of $\tau_1$, corresponding to the PRI associated with the most recently emitted optical pulse 400-3.

Range-wrap information for a pixel 210 provides an indication that the pixel is range-wrapped and may include, for example, a tag, a probability, a score, or a numeric value. For example, a pixel 210 may be tagged with a digital value (e.g., 0 or 1) that indicates whether the pixel is range-wrapped (e.g., a tag of 0 may indicate that the pixel is not range-wrapped, and a tag of 1 may indicate that the pixel is range-wrapped). As another example, a pixel 210 may be tagged with or may include a numeric value from 0 to 1 that indicates a probability or likelihood that the pixel is range-wrapped. The numeric value may be referred to as a pixel-disparity metric (PDM). A PDM value of 0.0 may correspond to an approximate 0% likelihood that a pixel is range-wrapped, and a PDM value of 1.0 may correspond to an approximate 100% likelihood that a pixel is range-wrapped. A PDM value of 0.8 may correspond to an approximate 80% likelihood that a pixel is range-wrapped.

Figure 27:
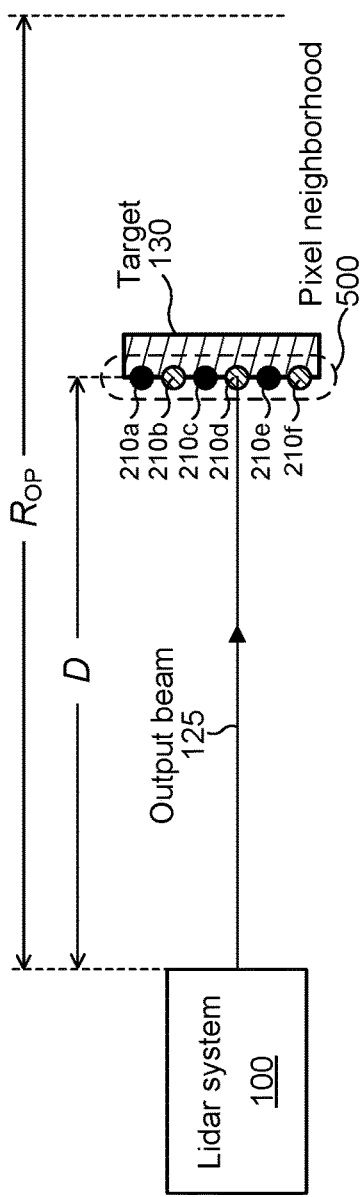
FIG. 27 illustrates an example target located within an operating range of a lidar system and a group of pixels associated with the target.

FIG. 27 illustrates an example target 130 located within an operating range of a lidar system 100 and a group of pixels (210a, 210b, 210c, 210d, 210e, 210f) associated with the target 130. Each of the pixels in FIG. 27 may correspond to an emitted optical signal that is scattered by the target 130 or an input optical signal that includes light from an emitted optical signal scattered by the target 130. For example, pixel 210d (which is associated with PRI $\tau_2$) may correspond to emitted optical pulse 400-2 or input optical pulse 410-1 in FIG. 13, and the associated distance for pixel 210d may be determined based on the time interval $\Delta T_1$. Similarly, pixel 210e (which is associated with PRI $\tau_1$) may correspond to emitted optical pulse 400-3 or input optical pulse 410-2 in FIG. 13, and the associated distance for pixel 210e may be determined based on the time interval $\Delta T_2$. The target 130 in FIG. 27 is not range-wrapped since it is located a distance D that is less than $R_{OP}$. Accordingly, the pixels in FIG. 27 are not range-wrapped, and the distance associated with each pixel corresponds to an actual non-range-wrapped distance to the target 130. For example, the operating range $R_{OP}$ may be approximately 200 m, and each of the pixels may have an associated distance from the lidar system that is approximately equal to 150 m.

In particular embodiments, each of the pixels of a point cloud may be associated with a particular pulse repetition interval (PRI). In FIG. 27, the black pixels 210a, 210c, and 210e are associated with the PRI $\tau_1$, and the striped pixels 210b, 210d, and 210f are associated with the PRI $\tau_2$. A pixel being associated with a particular PRI may indicate that the input pulse corresponding to the pixel was detected following the emission of an optical pulse associated with that particular PRI. For example, in FIG. 13, the emitted optical pulse 400-2 may be associated with the PM $\tau_2$, and the emitted optical pulse 400-3 may be associated with the PRI $\tau_1$. Additionally, in FIG. 13, a pixel that corresponds to the input optical pulse 410-1 may be associated with the PM $\tau_2$, and a pixel that corresponds to the input optical pulse 410-2 may be associated with the PM $\tau_1$. The lidar system 100 in FIG. 27 may include a light source 110 that emits optical pulses with alternating PRIs. For example, the light source 110 may emit optical pulses with PRIs that alternate between the two PRIs $\tau_1$ and $\tau_2$, and each resulting pixel may be associated with one of the two PRIs. As another example, a light source 110 may emit optical pulses with PRIs that alternate sequentially or in a pseudo-random manner between M different PRIs (e.g., $\tau_1, \tau_2, \ldots, \tau_M$), where M is an integer greater than or equal to 2. Each resulting pixel may be associated with one of the MPRIs.

Figure 28:
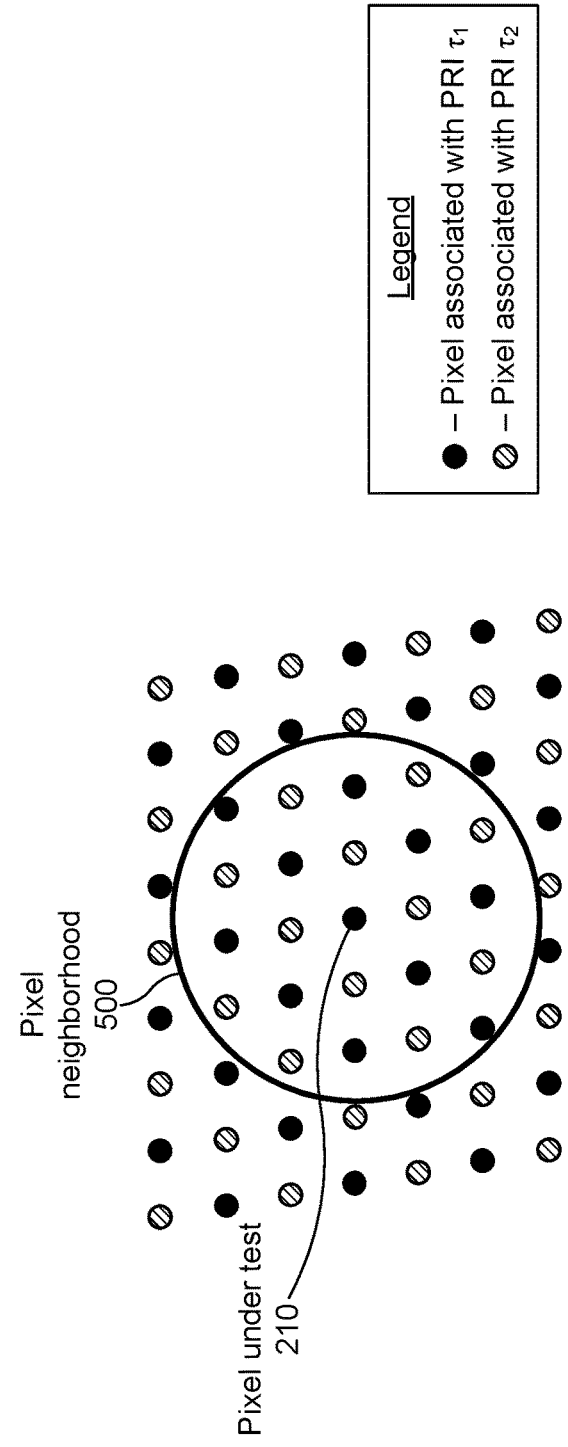
FIG. 28 illustrates an example pixel neighborhood for a pixel associated with the target in FIG. 27.

FIG. 28 illustrates an example pixel neighborhood 500 for a pixel 210 associated with the target 130 in FIG. 27. Pixel 210 may correspond to an input optical pulse scattered from the target 130. FIG. 28 represents a front view of an array of pixels with locations on or near the target 130 of FIG. 27, and a portion of the pixels are contained within the pixel neighborhood 500. In FIG. 27, a side view of the target 130 and the pixel neighborhood 500 is shown with the pixels 210a, 210b, 210c, 210d, 210e, and 210f contained in the pixel neighborhood 500. A pixel neighborhood 500 for a pixel 210 may refer to a region or volume around the pixel, and the pixel neighborhood 500 may contain a group of pixels. The group of pixels contained in a pixel neighborhood 500 for a pixel 210 may be referred to as a group of neighboring pixels for the pixel 210. The particular pixel associated with the pixel neighborhood 500 may be referred to as a pixel under test 210. Based on the pixels located within the pixel neighborhood 500, a determination may be made whether the pixel under test 210 is range-wrapped. For example, a particular pixel may be designated as a pixel under test 210, and a group of pixels located within a pixel neighborhood 500 corresponding to the pixel under test 210 may be identified. The group of pixels located within the pixel neighborhood may be used to determine whether the pixel under test 210 is range-wrapped. For example, in FIG. 28, a determination may be made whether the pixel under test 210 is range-wrapped based at least in part on how many pixels in the pixel neighborhood 500 are associated with each of the PRIs ($\tau_1$ and $\tau_2$).

A pixel neighborhood 500 may include approximately 1, 2, 5, 10, 20, 50, 100, 200, 500, 1,000 pixels, or any other suitable number of pixels. The pixel neighborhood 500 in FIG. 28 includes a total of 23 pixels, where 11 pixels are associated with PM $\tau_1$ and 12 pixels are associated with PM $\tau_2$. A pixel neighborhood 500 for a pixel under test 210 may be a three-dimensional volume of space that encompasses the pixel under test 210 as well as one or more neighboring pixels. A pixel neighborhood 500 may have a shape that is approximately spherical, ellipsoidal, cylindrical, cuboid, rectangular, or a pixel neighborhood 500 may have any other suitable shape or any suitable combination of shapes. A pixel neighborhood 500 may be approximately centered on the pixel under test 210. For example, the pixel neighborhood 500 in FIG. 28 may have a spherical or cylindrical shape, and the pixel under test 210 may be located at the approximate center of the spherical or cylindrical shape.

Figure 29:
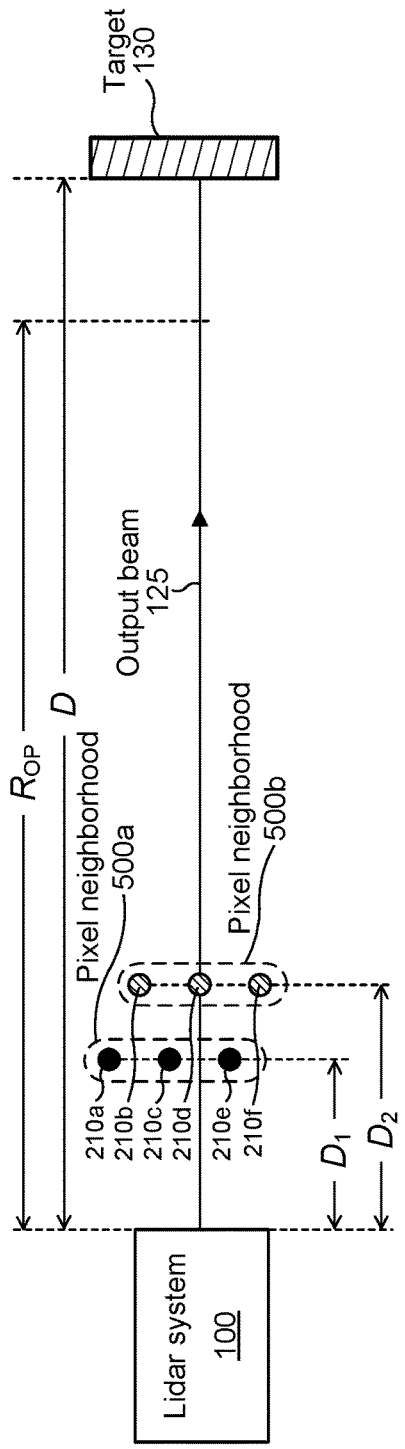
FIG. 29 illustrates an example target located beyond an operating range of a lidar system and two groups of range-wrapped pixels associated with the target.

FIG. 29 illustrates an example target 130 located beyond an operating range of a lidar system 100 and two groups of range-wrapped pixels (pixels 210a, 210c, 210e and pixels 210b, 210d, 210f) associated with the target 130. The pixels 210a, 210c, and 210e are included in pixel neighborhood 500a, and the pixels 210b, 210d, 210f are included in pixel neighborhood 500b. Each of the pixels in FIG. 29 may correspond to an emitted optical signal that is scattered by the target 130 or an input optical signal that includes light from an emitted optical signal scattered by the target 130. For example, pixel 210d (which is associated with PRI $\tau_2$) may correspond to input optical pulse 410-1 in FIG. 15, and the associated range-wrapped distance for pixel 210d may be determined based on the time interval $\Delta T_1$. Similarly, pixel 210e (which is associated with PRI $\tau_1$) may correspond to input optical pulse 410-2 in FIG. 15, and the associated range-wrapped distance for pixel 210e may be determined based on the time interval $\Delta T_2$. The target 130 in FIG. 29 is range-wrapped since it is located a distance D that is greater than $R_{OP}$. Accordingly, the pixels in FIG. 29 are range-wrapped and have pixel distances that alternate between $D_1$ and $D_2$. For example, pixels 210a, 210c, and 210e may be located at a distance $D_1$ of approximately 40 meters, and pixels 210b, 210d, and 210f may be located at a distance $D_2$ of approximately 50 meters.

Figure 30:
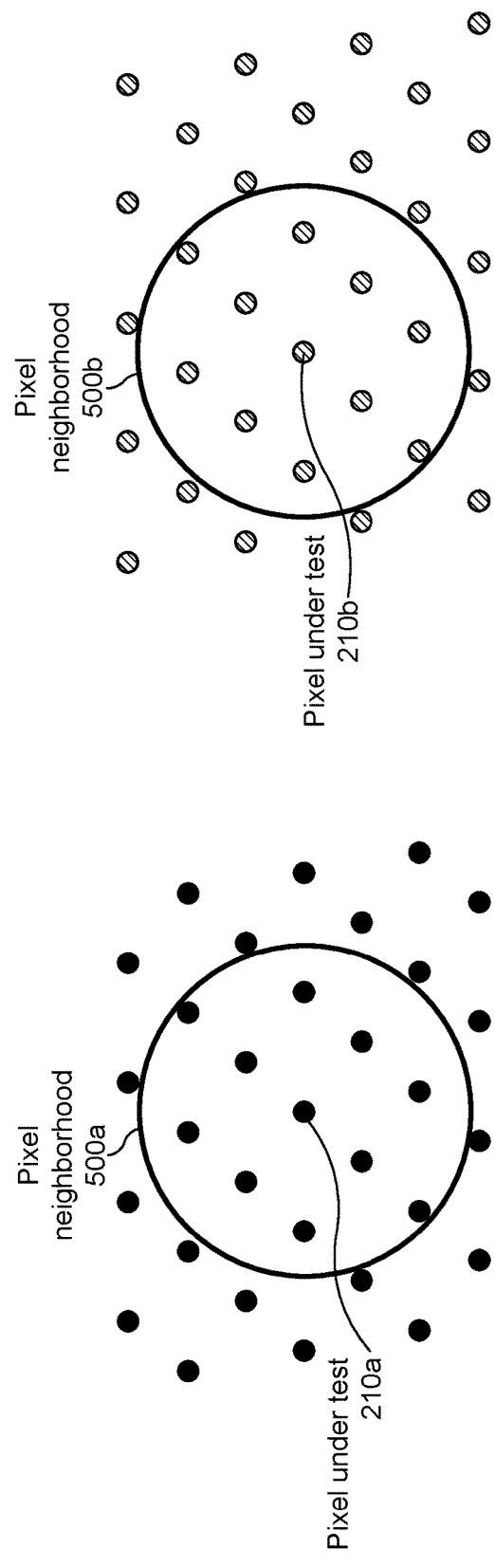
FIG. 30 illustrates two example pixel neighborhoods for two pixels associated with the target in FIG. 29.

FIG. 30 illustrates two example pixel neighborhoods (500a, 500b) for two pixels (210a, 210b) associated with the target in FIG. 29. The two pixels 210a and 210b may each correspond to an input optical pulse scattered from the target 130. FIG. 30 represents a front view of two pixel neighborhoods (500a, 500b) and two arrays of pixels associated with the target 130 of FIG. 29, and FIG. 29 illustrates a side view of the target 130 and the two pixel neighborhoods. In FIG.

30, the pixel under test 210a has an associated pixel neighborhood 500a that includes 11 pixels associated with PM $\tau_1$ and zero pixels associated with PM $\tau_2$. The pixel under test 210b has an associated pixel neighborhood 500b that includes zero pixels associated with PRI $\tau_1$ and 11 pixels associated with PM $\tau_2$. The pixels 210a and 210b may each be determined to be range-wrapped based at least in part on the type of pixels that are located within their respective pixel neighborhoods. For example, pixel 210a may be determined to be range-wrapped based on the pixel neighborhood 500a containing 11 pixels associated with PRI $\tau_1$ and zero pixels associated with PRI $\tau_2$. Similarly, pixel 210b may be determined to be range-wrapped based on the pixel neighborhood 500b containing zero pixels associated with PRI $\tau_1$ and 11 pixels associated with PRI $\tau_2$.

Figure 31:
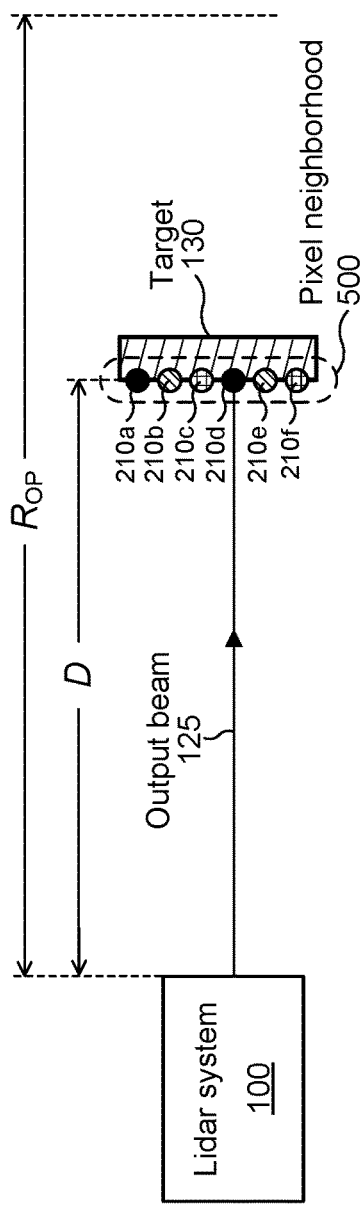
FIG. 31 illustrates an example target located within an operating range of a lidar system and a group of pixels associated with the target.

FIG. 31 illustrates an example target 130 located within an operating range of a lidar system 100 and a group of pixels (210a, 210b, 210c, 210d, 210e, 210f) associated with the target 130. Each of the pixels in FIG. 31 may correspond to an emitted optical signal that is scattered by the target 130 or an input optical signal that includes light from an emitted optical signal scattered by the target 130. For example, pixel 210d (which is associated with PRI $\tau_1$) may correspond to emitted optical pulse 400-3 or input optical pulse 410-2 in FIG. 13, and the associated distance for pixel 210d may be determined based on the time interval $\Delta T_2$. The target 130 in FIG. 31 is not range-wrapped since it is located a distance D that is less than $R_{OP}$. Accordingly, the pixels in FIG. 31 are not range-wrapped, and the distance associated with each pixel corresponds to an actual non-range-wrapped distance to the target 130. For example, the operating range $R_{OP}$ may be approximately 200 m, and each of the pixels may have an associated distance from the lidar system that is approximately equal to 150 m. The pixel neighborhood 500 in FIG. 31 contains the pixels 210a, 210b, 210c, 210d, 210e, and 210f. The black pixels 210a and 210d are associated with the PRI $\tau_1$; the striped pixels 210b and 210e are associated with the PRI $\tau_2$; and the checked pixels 210c and 210f are associated with the PRI $\tau_3$. The lidar system 100 in FIG. 31 may include a light source 110 that emits optical pulses with alternating PRIs. For example, the light source 110 may emit optical pulses with PRIs that alternate between the three different PRIs $\tau_1$, $\tau_2$, and $\tau_3$, and each resulting pixel may be associated with one of the three PRIs.

Figure 32:
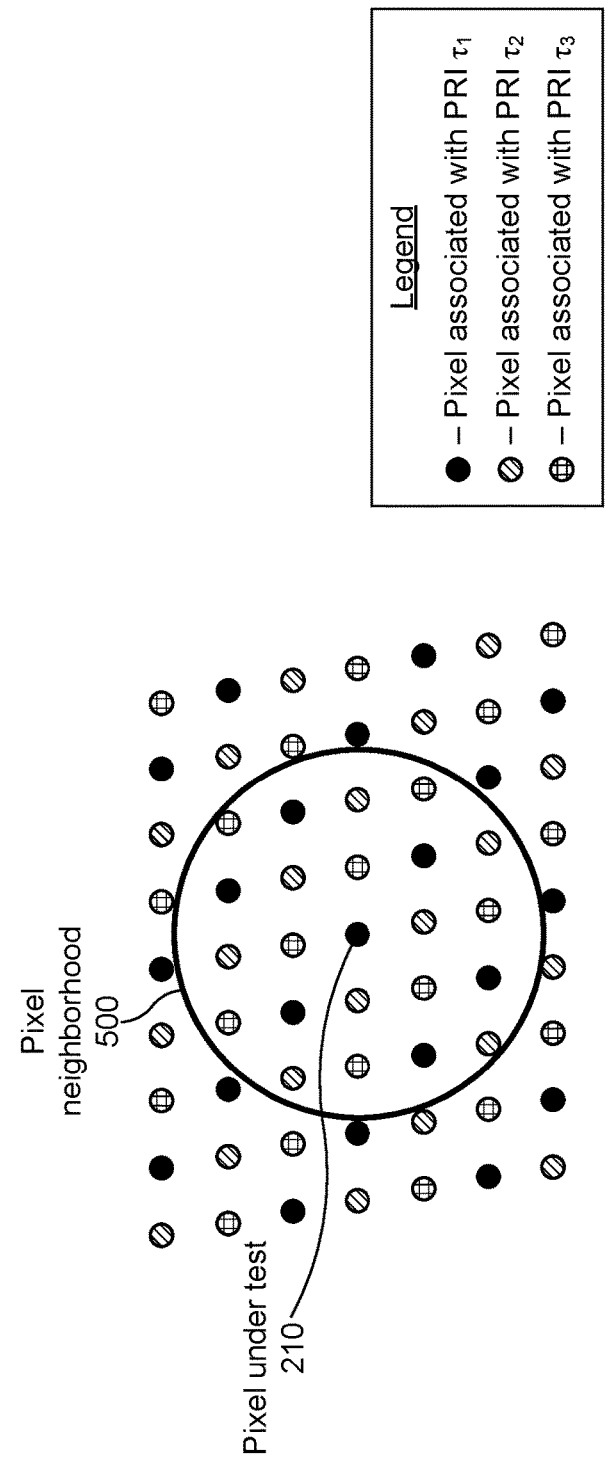
FIG. 32 illustrates an example pixel neighborhood for a pixel associated with the target in FIG. 31.

FIG. 32 illustrates an example pixel neighborhood 500 for a pixel 210 associated with the target 130 in FIG. 31. Pixel 210 may correspond to an input optical pulse scattered from the target 130. FIG. 32 represents a front view of an array of pixels with locations on or near the target 130 of FIG. 31, and a portion of the pixels are contained within the pixel neighborhood 500. In FIG. 31, a side view of the target 130 and the pixel neighborhood 500 is shown. The pixel under test 210 in FIG. 32 is associated with the pixel neighborhood 500, and the group of pixels located within the pixel neighborhood may be used to determine whether the pixel under test 210 is range-wrapped. For example, a determination may be made whether the pixel under test 210 is range-wrapped based at least in part on how many pixels in the pixel neighborhood 500 are associated with each of the PRIs ($\tau_1$, $\tau_2$, and $\tau_3$). The pixel neighborhood 500 in FIG. 32 includes a total of 23 pixels, where 7 pixels are associated with PRI $\tau_1$, 8 pixels are associated with PRI $\tau_2$, and 8 pixels are associated with PRI $\tau_3$. The pixel neighborhood 500 in FIG. 32 may have a spherical or cylindrical shape, and the pixel under test 210 may be located at the approximate center of the pixel neighborhood 500.

Figure 33:
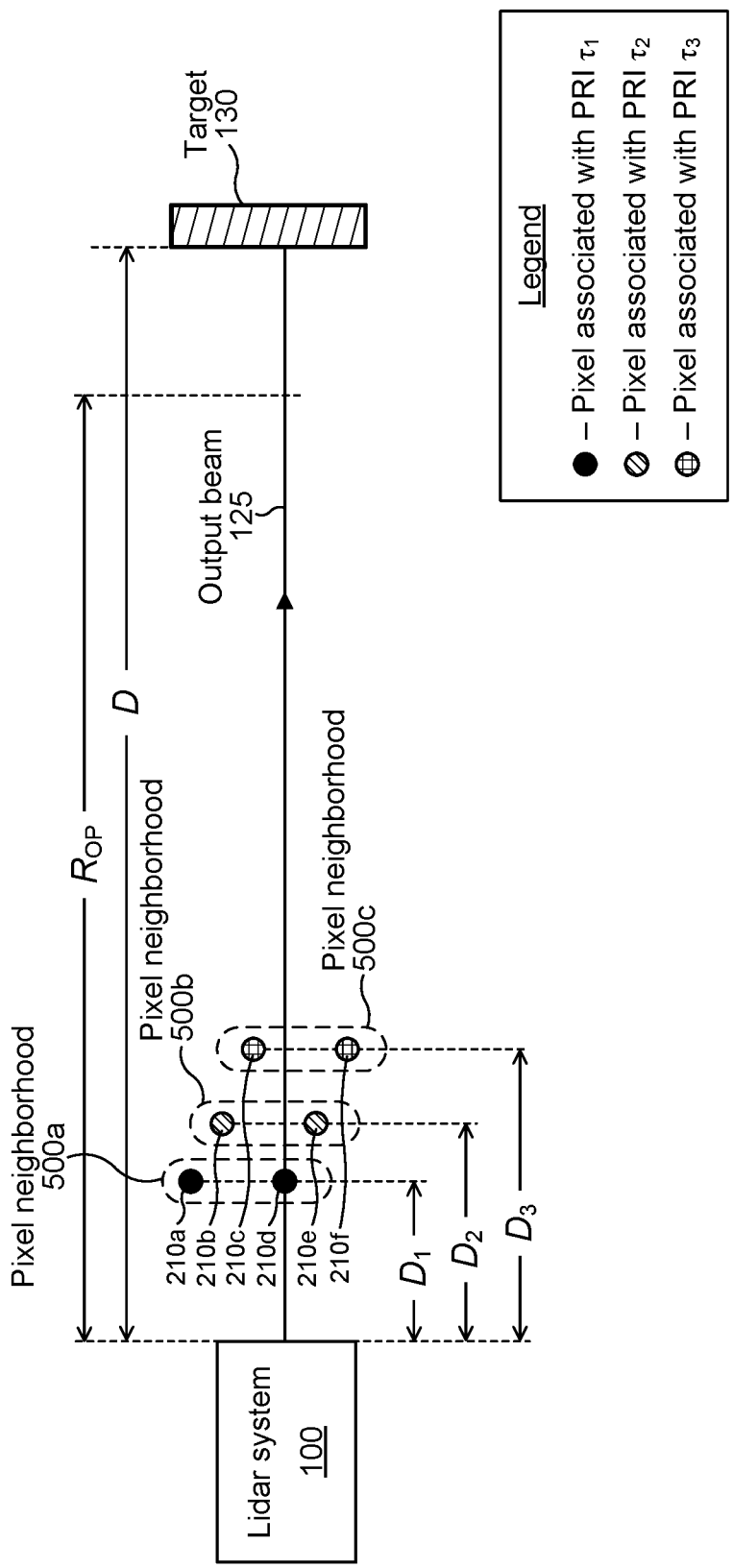
FIG. 33 illustrates an example target located beyond an operating range of a lidar system and three groups of range-wrapped pixels associated with the target.

FIG. 33 illustrates an example target 130 located beyond an operating range of a lidar system 100 and three groups of range-wrapped pixels (pixels 210a and 210d, pixels 210b and 210e, and pixels 210c and 210f) associated with the target 130. The pixels 210a and 210d (which are associated with PRI $\tau_1$) are contained in pixel neighborhood 500a; the pixels 210b and 210e (which are associated with PRI $\tau_2$) are contained in pixel neighborhood 500b; and the pixels 210c and 210f (which are associated with PRI $\tau_3$) are contained in pixel neighborhood 500c. Each of the pixels in FIG. 33 may correspond to an emitted optical signal that is scattered by the target 130 or an input optical signal that includes light from an emitted optical signal scattered by the target 130. For example, pixel 210f (which is associated with PRI $\tau_3$) may correspond to input optical pulse 410-2 in FIG. 16, and the associated range-wrapped distance for pixel 210f may be determined based on the time interval $\Delta T_2$. The target 130 in FIG. 33 is range-wrapped since it is located a distance D that is greater than $R_{OP}$. Accordingly, the pixels in FIG. 33 are range-wrapped and have pixel distances that alternate between $D_1$, $D_2$, and $D_3$. For example, pixels 210a and 210d may be located at a distance $D_1$ of approximately 40 meters; pixels 210b and 210e may be located at a distance $D_2$ of approximately 50 meters; and pixels 210c and 210f may be located at a distance $D_3$ of approximately 60 meters.

Figure 34:
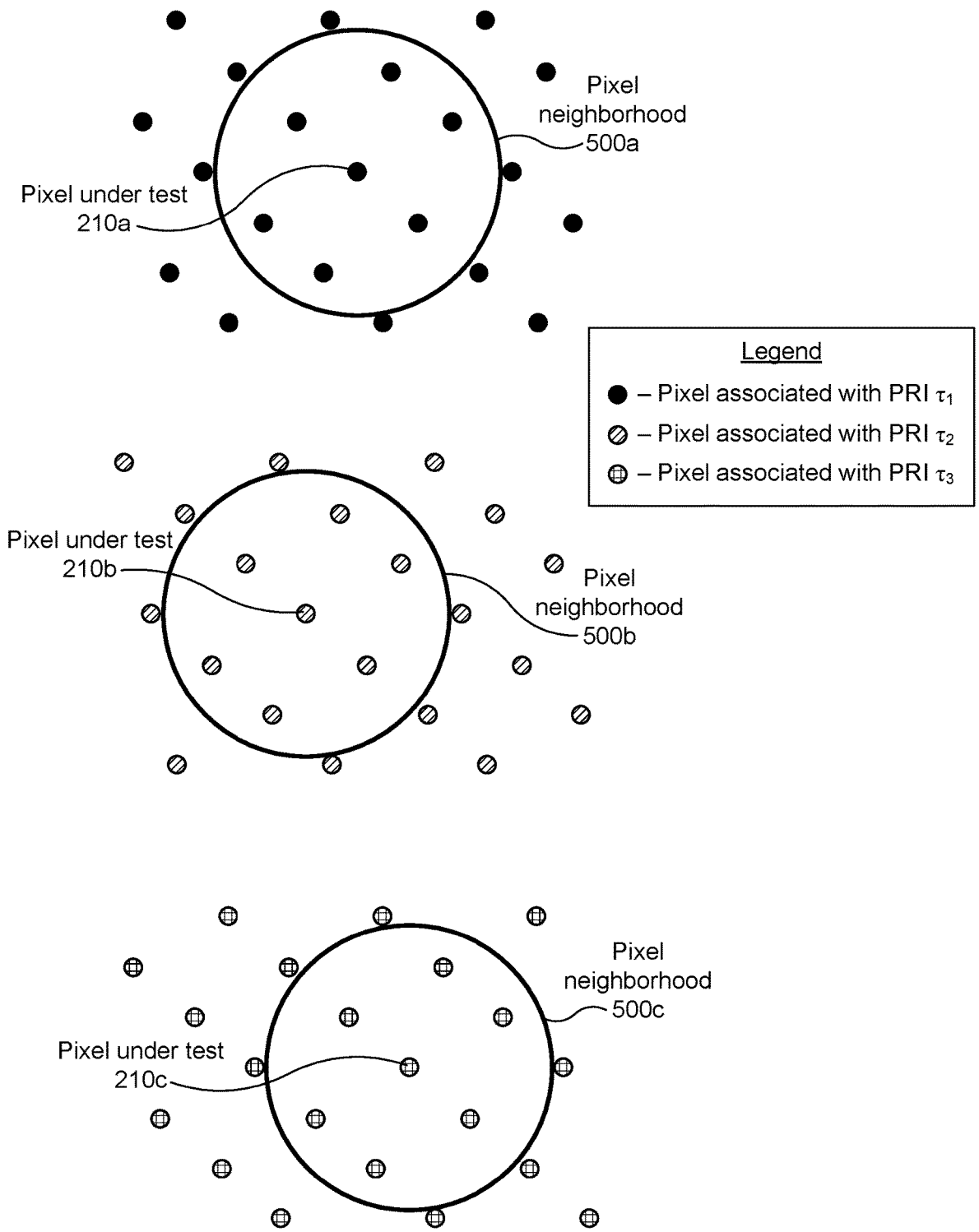
FIG. 34 illustrates three example pixel neighborhoods for three pixels associated with the target in FIG. 33.

FIG. 34 illustrates three example pixel neighborhoods (500a, 500b, 500c) for three pixels (210a, 210b, 210c) associated with the target in FIG. 33. The three pixels 210a, 210b, and 210c may each correspond to an input optical pulse scattered from the target 130. FIG. 34 represents a front view of three pixel neighborhoods (500a, 500b, 500c) and three arrays of pixels associated with the target 130 of FIG. 33, and FIG. 33 illustrates a side view of the target 130 and the three pixel neighborhoods. In FIG. 34, the pixel under test 210a has an associated pixel neighborhood 500a that includes 7 pixels associated with PM $\tau_1$ and zero pixels associated with PM $\tau_2$ or $\tau_3$. The pixel under test 210b has an associated pixel neighborhood 500b that includes 7 pixels associated with PRI $\tau_2$ and zero pixels associated with PRI $\tau_1$ or $\tau_3$. The pixel under test 210c has an associated pixel neighborhood 500c that includes 7 pixels associated with PRI $\tau_3$ and zero pixels associated with PRI $\tau_1$ or $\tau_2$. The pixels 210a, 210b, and 210c may each be determined to be range-wrapped based at least in part on the type of pixels that are located within their respective pixel neighborhoods. For example, pixel 210a may be determined to be range-wrapped based on the pixel neighborhood 500a containing 7 pixels associated with PRI $\tau_1$ and zero pixels associated with PRI $\tau_2$ or $\tau_3$. Similarly, pixel 210b may be determined to be range-wrapped based on the pixel neighborhood 500b containing 7 pixels associated with PRI $\tau_2$ and zero pixels associated with PRI $\tau_1$ or $\tau_3$. Similarly, pixel 210c may be determined to be range-wrapped based on the pixel neighborhood 500c containing 7 pixels associated with PRI $\tau_3$ and zero pixels associated with PRI $\tau_1$ or $\tau_2$.

Figure 35:
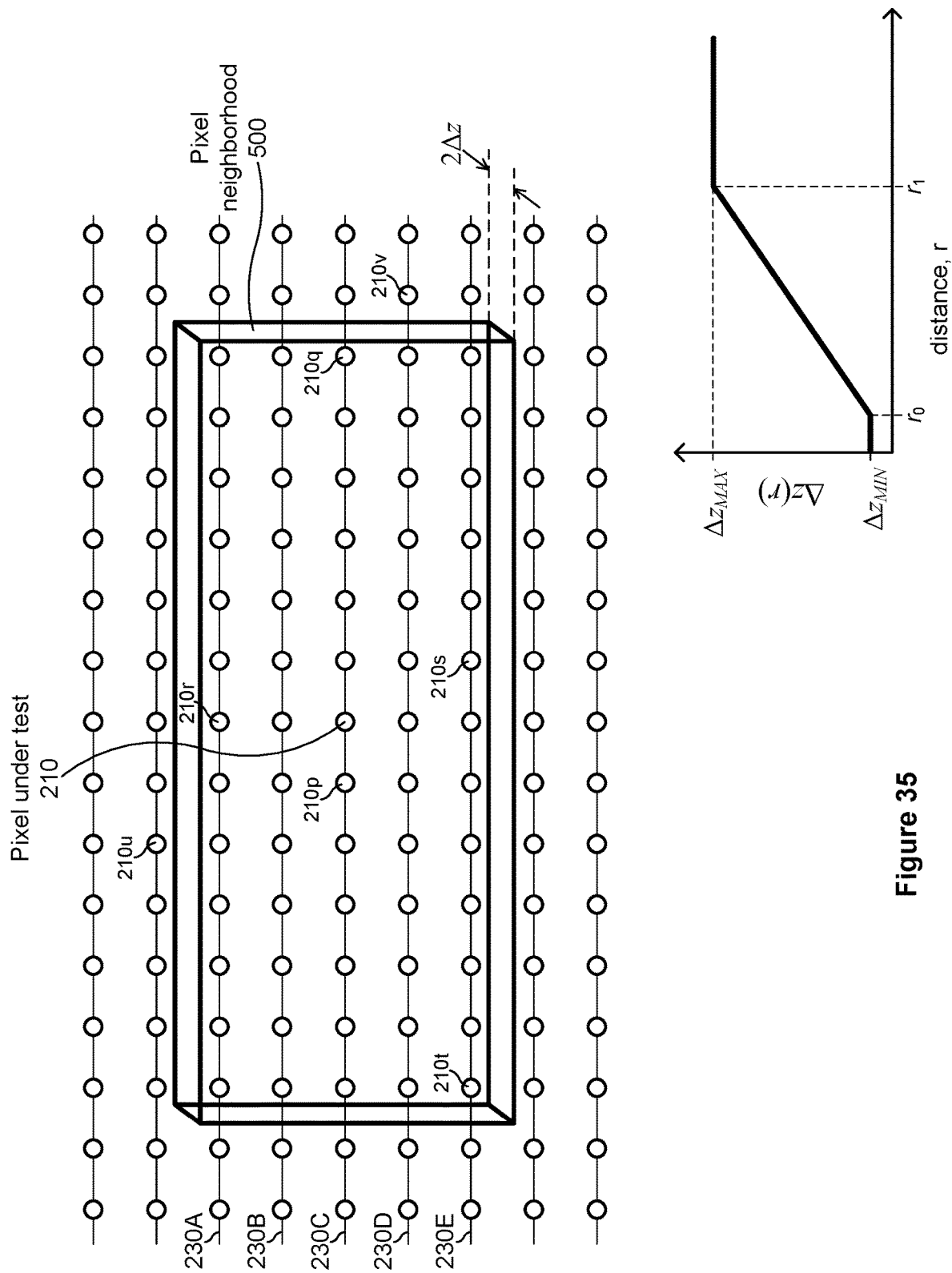
FIG. 35 illustrates an example pixel neighborhood for a pixel under test.

FIG. 35 illustrates an example pixel neighborhood 500 for a pixel under test 210. The pixel neighborhood 500 is approximately 13 pixels wide by 5 scan lines tall and has a depth or thickness of 2·$\Delta z$. Each of the circles in FIG. 35 represents a pixel, and the pixel neighborhood 500 includes a total of 65 pixels: the pixel under test 210 along with 64 neighboring pixels for the pixel under test 210. The pixel neighborhood 500 in FIG. 35 has a rectangular or cuboid shape and includes pixels from the five scan lines 230A, 230B, 230C, 230D, and 230E. Each of the five scan lines has 13 pixels that are contained in the pixel neighborhood 500, corresponding to a total of 65 pixels within the pixel neighborhood. The pixel under test 210 is part of scan line 230C, and the two scan lines above (230A and 230B) and the two scan lines below (230D and 230E) are included in the pixel neighborhood.

In particular embodiments, a pixel under test 210 may be determined to be range-wrapped based at least in part on a group of neighboring pixels for the pixel under test 210. For example, a lidar system 100 may determine whether a pixel under test 210 is range-wrapped based at least in part on the PM associated with each pixel in the group of neighboring pixels. A group of neighboring pixels for a pixel under test 210 may be identified in any suitable manner. For example, a group of neighboring pixels may be determined based on the pixels being located within a threshold distance from the pixel under test 210. The pixel neighborhood 500 may be a sphere of radius Δz centered on the pixel under test 210, and pixels located within the sphere may be identified as being part of the group of neighboring pixels. A pixel located a distance from the pixel under test 210 that is less than Δz may be determined to be part of the group of neighboring pixels for the pixel under test 210. A pixel located a distance from the pixel under test 210 that is greater than Δz may not be part of the group of neighboring pixels. As another example, a pixel neighborhood 500 may be a cylinder of radius R and depth or thickness 2·Δz centered on the pixel under test 210. As discussed below, the distance parameter Δz may have a fixed value or may have a value that varies with the distance of the pixel under test 210 from the lidar system 100.

In particular embodiments, a pixel may be determined to be part of a group of neighboring pixels for a pixel under test 210 based at least in part on one or more of the following criteria: (1) the pixel being part of a scan line that is located within Y scan lines of the pixel under test 210; (2) the pixel being located, along the scan line, within X pixels of the pixel under test 210; and (3) a distance of the pixel from the lidar system 100 being within a threshold distance Δz of the distance of the pixel under test 210 from the lidar system 100. The parameter Y is an integer greater than or equal to zero, and Y may have any suitable value, such as for example, 0, 1, 2, 3, 4, 5, 6, 8, 10, or 20. The parameter X is an integer greater than or equal to 1, and X may have any suitable value, such as for example, 1, 2, 3, 4, 5, 6, 8, 10, 20, or 50. For example, Y may be 1 and X may be 3, which corresponds to the pixel neighborhood 500 including a 3×7 array of 21 pixels total: seven pixels on each of three scan lines (the three scan lines include the scan line with the pixel under test 210 along with two adjacent scan lines). As another example, Y may be 0 and X may be 1, which corresponds to the pixel neighborhood 500 including three pixels total: the pixel under test 210 and two adjacent pixels on the same scan line.

In the example of FIG. 35, Y is 2 and X is 6, which corresponds to a pixel neighborhood 500 that contains a 5×13 array of pixels. In FIG. 35, each pixel that is part of the group of neighboring pixels for the pixel under test 210 meets the following criteria: (1) the pixel is part of a scan line located within Y=2 scan lines of the pixel under test 210; (2) the pixel is located, along the scan line, within X=6 pixels of the pixel under test 210; and (3) the distance of the pixel from the lidar system 100 is within Δz of the distance of the pixel from the lidar system 100. Pixels 210p, 210q, 210r, 210s, and 210t are each part of the group of neighboring pixels for the pixel under test 210. Pixel 210p is located on the same scan line 230C as the pixel under test 210 and within one pixel of the pixel under test 210. Pixel 210q is located on the same scan line and within six pixels of the pixel under test 210. Pixel 210r is located within two scan lines and within zero pixels of the pixel under test 210. Pixel 210s is located within two scan lines and within one pixel of the pixel under test 210. Pixel 210t is located within two scan lines and within six pixels of the pixel under test 210. Pixels 210u and 210v are not part of the group of neighboring pixels for the pixel under test 210. Pixel 210u is located three scan lines from scan line 230C (which is beyond the Y=2 scan-line threshold), and pixel 210v is located seven pixels from the pixel under test 210 (which is beyond the X=6 pixel threshold).

In FIG. 35, the pixel under test 210 may not be range-wrapped, and the 65 pixels in the pixel neighborhood 500 may have approximately the same distance to the lidar system 100. In the case where the pixel under test 210 is range-wrapped, the pixel neighborhood 500 in FIG. 35 may include less than 65 pixels. For example, if the light source emits optical pulses with two alternating PRIs $\tau_1$ and $\tau_2$, then the pixel neighborhood 500 may include approximately 33 pixels associated with PRI $\tau_1$. The remaining 32 pixels may be associated with PRI $\tau_2$ and may be located outside of the 2·Δz thickness of the pixel neighborhood 500. As another example, if the light source emits optical pulses with three alternating PRIs $\tau_1$, $\tau_2$, and $\tau_3$, then the pixel neighborhood 500 may include approximately 22 pixels associated with PRI $\tau_1$. The remaining 43 pixels (which may include approximately 22 pixels associated with PRI $\tau_2$ and approximately 21 pixels associated with PRI $\tau_3$) may be located outside of the 2·Δz thickness of the pixel neighborhood 500.

In FIG. 35, the parameter Δz, which may be referred to as a threshold distance, represents an amount of distance offset a pixel may have with respect to the pixel under test 210 and still be part of the group of neighboring pixels. For example, if the distance from the lidar system 100 to the pixel under test 210 is D, then a pixel whose distance from the lidar system 100 is within the range D±Δz may be part of the group of neighboring pixels. If the distance to a pixel is greater than D+Δz or less than D−Δz, then that pixel may not be part of the group of neighboring pixels. In particular embodiments, the threshold distance Δz may be a fixed parameter and may have any suitable value, such as for example, approximately 0 m, 0.1 m, 0.5 m, 1 m, 2 m, 4 m, 10 m, or 20 m. For example, if the distance to the pixel under test 210 is 100 m and the threshold distance Δz is 8 m, then a pixel located a distance of 100 m±8 m from the target (e.g., between 92 m and 108 m from the target 100) may be part of the group of neighboring pixels for the pixel under test 210.

In particular embodiments, a threshold distance Δz may be a parameter whose value depends on the distance of the pixel under test 210 from the lidar system 100. For example, the threshold distance Δz may increase monotonically with increasing distance from the lidar system 100. The threshold distance Δz may change with distance from the lidar system in a piecewise linear manner, in a continuous or curved manner (e.g., quadratic or exponential), or in any other suitable manner. The graph of Δz(r) versus distance in FIG. 35 illustrates an example threshold distance that increases in piecewise linear manner. For distances from the target 100 that are less than $r_0$, the threshold distance Δz has a fixed value of $\Delta z_{MIN}$, and for distances that are greater than $r_1$, the threshold distance has a fixed value of $\Delta z_{MAX}$. Between the distances $r_0$ and $r_1$, the threshold distance increases approximately linearly. The parameter $r_0$ may have any suitable value, such as for example, 0 m, 1 m, 2 m, 5 m, 10 m, or 20 m, and the parameter $r_1$ may have any suitable value, such as for example, 50 m, 75 m, 100 m, 150 m, 200 m, 250 m, or 300 m. The minimum threshold distance $\Delta z_{MIN}$ may have any suitable value, such as for example, 0 m, 0.1 m, 0.5 m, 1 m, 2 m, 3 m, 5 m, or 10 m, and the maximum threshold distance $\Delta z_{MAX}$ may have any suitable value, such as for example, 2 m, 4 m, 6 m, 8 m, 10 m, 15 m, or 20 m. For example, $r_0$ and $\Delta z_{MIN}$ may both be zero, and the $\Delta z(r)$ curve may increase linearly from the origin until reaching a value of $\Delta z_{MAX}=8$ mat a distance of $r_1=100$ m from the lidar system 100. For a pixel under test 210 located a distance of 50 m from the lidar system, the threshold distance $\Delta z$ may be approximately 4 m. For a pixel under test 210 located a distance from the lidar system that is greater than or equal to 100 m, the threshold distance $\Delta z$ is set to the maximum value of 8 m. As another example, $r_0$ may be 30 m and $\Delta z_{MIN}$ may be 1 m so that for distances within 30 meters of the lidar system 100, the threshold distance $\Delta z$ is set to the minimum value of 1 m. As another example, $r_1$ may be approximately equal to the operating range $R_{OP}$ so that the threshold distance increases linearly until the operating range is reached.

Figure 36:
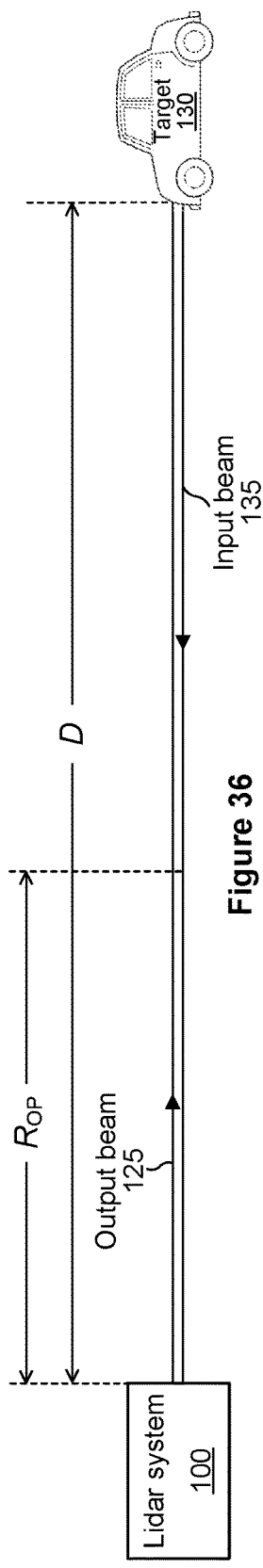
FIG. 36 illustrates an example lidar system and a target that is located a distance that is more than twice the operating range of the lidar system.

FIG. 36 illustrates an example lidar system 100 and a target 130 that is located a distance D that is more than twice the operating range of the lidar system. In FIG. 36, the distance D from the lidar system 100 to the target 130 is greater than $2 \times R_{OP}$ and less than $3 \times R_{OP}$.

Figure 37:
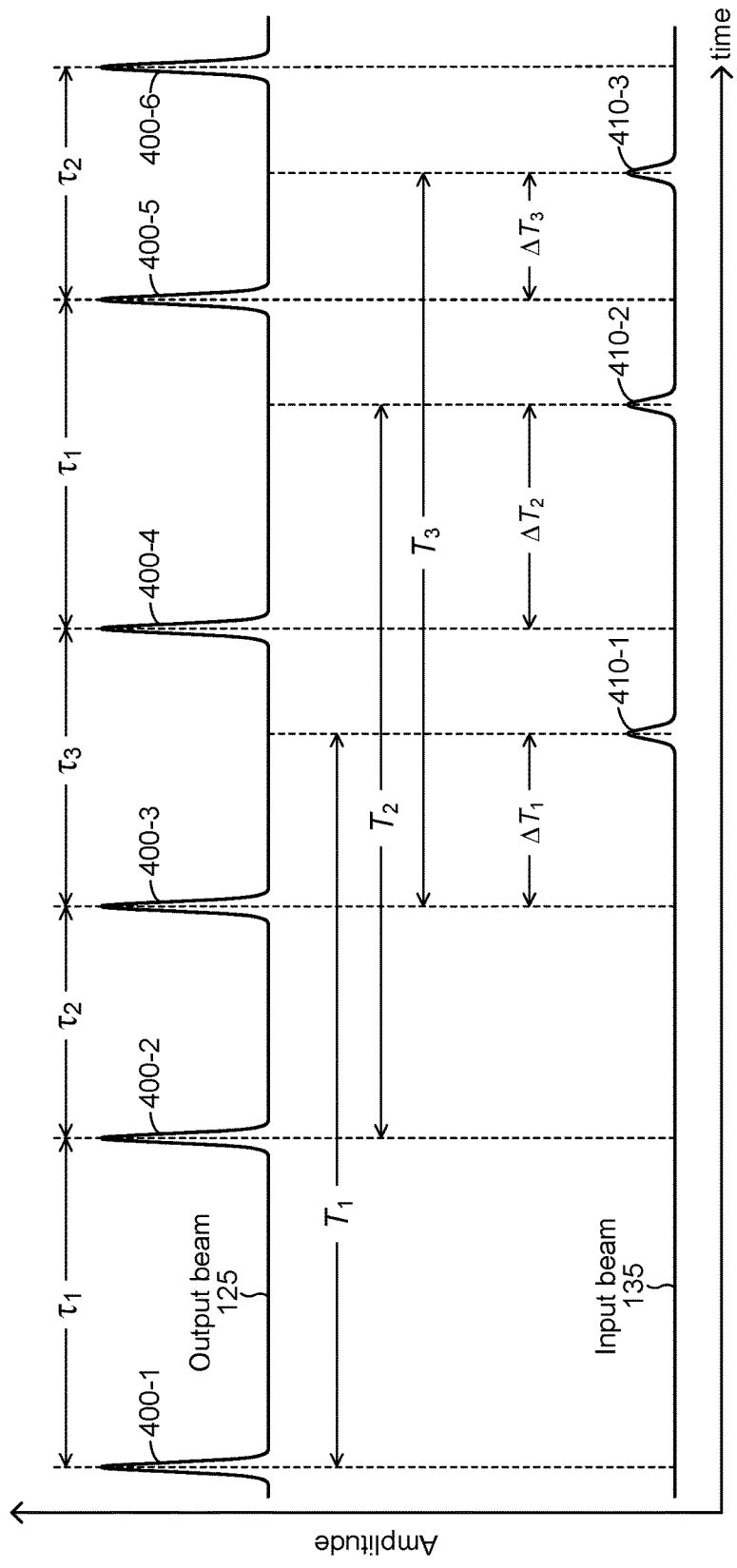
FIG. 37 illustrates a temporal profile for an output beam emitted by the lidar system in FIG. 36 and a corresponding temporal profile for an input beam received by the lidar system.

FIG. 37 illustrates a temporal profile for an output beam 125 emitted by the lidar system 100 in FIG. 36 and a corresponding temporal profile for an input beam 135 received by the lidar system 100. A pixel 210 that is located a distance from a lidar system 100 that is less than the operating range of the lidar system ($R_{OP}$) may be referred to as a non-range-wrapped pixel, and a pixel 210 that is located a distance that is greater than $R_{OP}$ may be referred to as a range-wrapped pixel. A range-wrapped pixel that is located a distance between $R_{OP}$ and $2 \times R_{OP}$ from the lidar system 100 may be referred to as a single range-wrapped pixel. A range-wrapped pixel that is located a distance between $2 \times R_{OP}$ and $3 \times R_{OP}$ from the lidar system 100 may be referred to as a double range-wrapped pixel. A range-wrapped pixel that is located a distance between $3 \times R_{OP}$ and $4 \times R_{OP}$ from the lidar system 100 may be referred to as a triple range-wrapped pixel. A range-wrapped pixel that is located a distance between $q \times R_{OP}$ and $(q+1) \times R_{OP}$ from the lidar system 100 may be referred to as a q-times range-wrapped pixel, where q is a positive integer. A pixel 210 corresponding to the input optical pulse 410-1 in FIG. 13 may be a non-range-wrapped pixel (e.g., $D<R_{OP}$ in FIG. 13), and a pixel 210 corresponding to the input optical pulse 410-1 in FIG. 15 may be a single range-wrapped pixel (e.g., $R_{OP}<D<2 \times R_{OP}$ in FIG. 15). In FIGS. 36 and 37, since the distance D from the lidar system 100 to the target 130 is greater than $2 \times R_{OP}$ and less than $3 \times R_{OP}$, a pixel corresponding to the input pulse 410-1 in FIG. 37 may be a double range-wrapped pixel. Additionally, pixels corresponding to each of the input pulses 410-2 and 410-3 may be double range-wrapped pixels.

The output beam 125 in FIG. 37 includes the emitted optical pulses 400-1, 400-2, 400-3, 400-4, 400-5, and 400-6, and the optical pulses are emitted with PRIs that alternate between $\tau_1$, $\tau_2$, and $\tau_3$. The input beam 135 in FIG. 16 includes the received optical pulses 410-1, 410-2, and 410-3. The input optical pulses 410-1, 410-2, and 410-3 may each include light from an emitted optical pulse (e.g., pulse 400-1, 400-2, 400-3, 400-4, or 400-5) that is scattered by the target 130. For example, the input optical pulse 410-1 may include scattered light from emitted optical pulse 400-1. Additionally, the input optical pulse 410-2 may include scattered light from emitted optical pulse 400-2, and the input optical pulse 410-3 may include scattered light from emitted optical pulse 400-3.

In FIG. 37, the first input optical pulse 410-1 is detected a time interval $T_1$ after the first optical pulse 400-1 is emitted and a time interval $\Delta T_2$ after the third optical pulse 400-3 is emitted. The second input optical pulse 410-2 is detected a time interval $T_2$ after the second optical pulse 400-2 is emitted and a time interval $\Delta T_2$ after the fourth optical pulse 400-4 is emitted. The third input optical pulse 410-3 is detected a time interval $T_3$ after the third optical pulse 400-3 is emitted and a time interval $\Delta T_3$ after the fifth optical pulse 400-5 is emitted. Additionally, the first input optical pulse 410-1 is detected before the fourth optical pulse 400-4 is emitted, which corresponds to the time interval $\Delta T_1$ being less than the third PRI $\tau_3$. Similarly, the second input optical pulse 410-2 is detected before the fifth optical pulse 400-5 is emitted, which corresponds to the time interval $\Delta T_2$ being less than the first PRI $\tau_1$. Similarly, the third input optical pulse 410-3 is detected before the sixth optical pulse 400-6 is emitted, which corresponds to the time interval $\Delta T_3$ being less than the second PRI $\tau_2$. The time intervals $\Delta T_1$, $\Delta T_2$, and $\Delta T_3$ may each be determined by a processor, for example, by determining a difference between time-count values associated with the emission of an optical pulse and the subsequent detection of an input optical pulse (e.g., with no other intervening emitted or detected pulses occurring during the respective time interval).

In particular embodiments, range ambiguity for a q-times range-wrapped pixel 210 may be mitigated by a lidar system 100 configured to emit optical pulses having (q+1) different PRIs, where q is a positive integer. Range-ambiguity mitigation may include (1) determining that a pixel is range-wrapped, (2) discarding or ignoring a pixel that is range-wrapped, (3) tagging a pixel that is range-wrapped with range-wrap information, or (4) determining a corrected distance for a pixel that is range-wrapped. In particular embodiments, a lidar system 100 that emits optical pulses with two different PRIs (e.g., q=1) may be configured to mitigate range ambiguity for a single range-wrapped pixel. In the example of FIGS. 14 and 15, the lidar system 100 emits optical pulses with two different PRIs, and the lidar system 100 may be configured to determine that a pixel associated with input pulse 410-1 is single range-wrapped. However, the lidar system 100 in FIGS. 14 and 15 may not be able to identify a double range-wrapped pixel. Since a double range-wrapped pixel corresponds to an input optical pulse with a round-trip time that is greater than $\tau_1+\tau_2$ (and less than $2\tau_1+\tau_2$), an associated time interval $\Delta T$ for a double range-wrapped pixel may not vary depending on whether the pixel is associated with the PRI $\tau_1$ or $\tau_2$. As a result, a lidar system with two different PRIs may not be configured to determine that a pixel is double range-wrapped.

In particular embodiments, a lidar system 100 that emits optical pulses with three different PRIs (e.g., q=2) may be configured to mitigate range ambiguity for a double range-wrapped pixel 210. In the example of FIGS. 36 and 37, the lidar system 100 emits optical pulses with three different PRIs, and the lidar system 100 may be configured to determine that a pixel associated with input pulse 410-1 is double range-wrapped. Additionally, the lidar system 100 may be configured to determine whether a pixel associated with an input pulse is (1) not range-wrapped, (2) single range-wrapped, or (3) double range-wrapped, and this determination may be based at least in part on two or more of the time intervals $\Delta T_1$, $\Delta T_2$, and $\Delta T_3$. For example, in FIG. 37, if $\Delta T_1$ is approximately equal to $\Delta T_2$, then this may indicate that pixels associated with the input optical pulses 410-1 and 410-2 are not range-wrapped. Alternatively, in FIG. 37, if ($\Delta T_1-\Delta T_2$) is approximately equal to ($\tau_3-\tau_2$), then this may indicate that pixels associated with the input optical pulses 410-1 and 410-2 are single range-wrapped. Alternatively, in FIG. 37, if ($\Delta T_1-\Delta T_2$) is approximately equal to ($\tau_3-\tau_1$), then this may indicate that pixels associated with the input optical pulses 410-1 and 410-2 are double range-wrapped. Additionally, in FIG. 37, if ($\Delta T_2-\Delta T_3$) is approximately equal to ($\tau_1-\tau_2$), then this may indicate that pixels associated with the input optical pulses 410-2 and 410-3 are double range-wrapped.

In response to determining that a pixel is double range-wrapped, a processor may determine a corrected distance for the pixel. In FIG. 37, a processor may determine a preliminary distance $D_1$ for a pixel associated with the input optical pulse 410-1 from the expression $D_1 = c \cdot \Delta T_1/2$. In response to determining that the pixel associated with input optical pulse 410-1 is double range-wrapped, a corrected distance $D'_1$ from the target 130 to the pixel may be determined from the expression $D'_1 = c \cdot T_1/2$, the expression $D'_1 = D_1 + c \cdot (\tau_1+\tau_2)/2$, or the expression $D'_1 = c \cdot (\tau_1+\tau_2+\Delta T_1)/2$.

In particular embodiments, a lidar system 100 that emits optical pulses with four different PRIs (e.g., q=3) may be configured to mitigate range ambiguity for a triple range-wrapped pixel 210. Additionally, the lidar system 100 may be configured to determine whether a pixel associated with an input pulse is (1) not range-wrapped, (2) single range-wrapped, (3) double range-wrapped, or (4) triple range-wrapped, and this determination may be based at least in part on two or more of the time intervals $\Delta T$ between emission of an optical pulse and the subsequent detection of an input optical pulse (e.g., with no other intervening emitted or detected pulses occurring during the respective time interval).

In particular embodiments, a light source 110 of a lidar system 100 may emit optical pulses using multiple alternating pulse repetition intervals (PRIs). For example, the optical pulses may be emitted with two PRIs, $\tau_1$ and $\tau_2$, where the two PRIs are not equal (e.g., as illustrated in FIG. 13, 15, 25, 27, 28, 29, or 30). As another example, the optical pulses may be emitted with three PRIs, $\tau_1$, $\tau_2$, and $\tau_3$, where the three PRIs have different values (e.g., as illustrated in FIG. 16, 31, 32, 33, or 34). As another example, the optical pulses may be emitted with MPRIs, $\tau_1$, $\tau_2$, . . . , $\tau_M$, where the MPRIs have different values and M is an integer greater than or equal to 2. The light source 110 may alternate sequentially between each of the PRIs, or the light source 110 may emit optical pulses with PRIs that vary in a pseudo-random manner between the M different PRIs, where any two sequential optical pulses have different PRIs. FIG. 26 illustrates an example pulse sequence that alternates sequentially between four (M=4) different pulse periods: $\tau_1$, $\tau_2$, $\tau_3$, and $\tau_4$.

In particular embodiments, a lidar system 100 may include a receiver 140 configured to detect multiple input optical pulses. As illustrated in the example of FIG. 6, a receiver 140 may include a detector 340 configured to receive an input optical pulse and produce a pulse of photocurrent that corresponds to the input optical pulse. Additionally, a receiver 140 may include one or more amplifiers 350, one or more comparators 370, or one or more TDCs 380. Each input optical pulse detected by a receiver 140 may include light from an emitted optical pulse that is scattered by a target 130 located a distance from the lidar system 100. For example, input optical pulse 410-1 in FIG. 13 may include light from emitted optical pulse 400-2 that is scattered by the target 130. In FIG. 15, the range-wrapped input optical pulse 410-1 may include light from the emitted optical pulse 400-1 that is scattered by the target 130.

In particular embodiments, each input optical pulse detected by a receiver 140 may be detected a time interval $\Delta T$ after emission of a corresponding most recently emitted optical pulse. Additionally, during the time interval $\Delta T$, no other optical pulse is emitted by the light source 110 of the lidar system 100, and no other input optical pulse is detected by the receiver 140 of the lidar system 100. When an input optical pulse is detected by a receiver 140, a lidar system 100 may determine a time interval $\Delta T$ associated with the input optical pulse, where the time interval corresponds to the time between emission of the most recently emitted optical pulse and subsequent detection of the input optical pulse. The time interval $\Delta T$ may be less than the PM associated with the most recently emitted optical pulse. In the example of FIG. 13, input optical pulse 410-1 is detected a time interval $\Delta T_1$ after the emission of optical pulse 400-2, and no other optical pulses are emitted or detected during the time interval $\Delta T_1$. Additionally, the time interval $\Delta T_1$ is less than the PRI $\tau_2$ associated with the most recently emitted optical pulse 400-2. The input optical pulse 410-1 in FIG. 13 may include scattered light from the emitted optical pulse 400-2. In the example of FIG. 15, input optical pulse 410-1 is detected a time interval $\Delta T_1$ after the emission of optical pulse 400-2, and no other optical pulses are emitted or detected during the time interval $\Delta T_1$. The received input optical pulse 410-1 in FIG. 15 may include scattered light from the previously emitted optical pulse 400-1. However, since the input optical pulse 410-1 is detected a time interval $\Delta T_1$ after the emission of optical pulse 400-2, the input optical pulse 410-1 may, at least initially, be associated with the time interval $\Delta T_1$. As an example, a lidar system 100 may determine a distance $D_1$ associated with the input optical pulse 410-1 based on the time interval $\Delta T_1$ (e.g., $D_1$ may be determined from the expression $D_1 = c \cdot \Delta T_1/2$). If the input optical pulse 410-1 in FIG. 15 is determined to be range-wrapped, a corrected distance associated with the input optical pulse 410-1 may be determined (e.g., the corrected distance may be based at least in part on one or more of the time intervals $\tau_1$, $T_1$, and $\Delta T_1$).

In particular embodiments, a processor may be configured to generate multiple respective pixels 210. Each pixel 210 may correspond to an input optical pulse detected by a receiver 140 of the lidar system, and each pixel may include a PRI associated with a corresponding most recently emitted optical pulse. Additionally, a processor may be configured to determine a group of neighboring pixels for a pixel under test, and based on the PRI associated with each of the neighboring pixels, the processor may determine whether the pixel under test is range-wrapped. Determining whether the pixel under test is range-wrapped may be based on the PRI associated with the pixel under test, as well as the PRIs of the neighboring pixels. All or part of the processor may be (1) located within a receiver 140 of the lidar system 100, (2) located elsewhere within the lidar system (e.g., controller 150 in FIG. 1), (3) located external to the lidar system 100 (e.g., within an ADAS or an autonomous-vehicle driving system), or any suitable combination thereof.

In particular embodiments, determining that a pixel under test 210 is range-wrapped may include determining that most of the pixels in a corresponding group of neighboring pixels are associated with the same PM. Having most of the pixels in a group of neighboring pixels associated with the same PRI may refer to greater than a particular percentage of the pixels being associated with the same PM (e.g., greater than approximately 60%, 70%, 80%, 90%, 95%, 99%, or any other suitable percentage). For example, determining that a pixel under test 210 is range-wrapped may require that greater than 80% of the neighboring pixels (including the pixel under test 210) are associated with the same PM. In FIG. 28, approximately 48% of the pixels in the pixel neighborhood 500 are associated with PRI $\tau_1$, and approximately 52% of the pixels are associated with PRI $\tau_2$. Since most of the pixels in FIG. 28 are not associated with the same PRI, the determination may be made that the pixel under test 210 is not range-wrapped. In FIG. 30, for pixel under test 210a, 100% of the pixels in the pixel neighborhood 500a are associated with PRI $\tau_1$, which indicates that the pixel under test 210a is range-wrapped. Similarly, for pixel under test 210b, 100% of the pixels in the pixel neighborhood 500b are associated with PRI $\tau_2$, which indicates that the pixel under test 210b is range-wrapped. In FIG. 32, most of the pixels in the pixel neighborhood 500 are not associated with a single PRI (e.g., approximately 30% of the pixels are associated with PRI $\tau_1$ and approximately 35% are associated with each of PRIs $\tau_2$ and $\tau_3$), which indicates that the pixel under test 210 is not range-wrapped. In FIG. 34, each of the pixels under test 210a, 210b, and 210c may be determined to be range-wrapped based on their respective pixel neighborhoods 500a, 500b, and 500c including one type of PRI. For example, pixel 210a may be determined to be range-wrapped since 100% of the pixels in pixel neighborhood 500a are associated with PRI $\tau_1$.

In particular embodiments, a processor may be configured to determine whether a pixel under test 210 is not range-wrapped. Determining that a pixel under test 210 is not range-wrapped may include determining that the pixels in a corresponding group of neighboring pixels include approximately equal numbers of pixels associated with each of the PRIs. For example, if a light source 110 emits optical pulses having M different PRIs (where M is an integer greater than or equal to 2), then a pixel under test 210 may be determined to be not range-wrapped if the corresponding group of neighboring pixels includes approximately equal numbers of pixels associated with each of the M PRIs. If $N_T$ is the total number of pixels within the group of neighboring pixels, then there may be approximately $N_T/M$ pixels in the group associated with each of the MPRIs. For example, if a light source 110 emits optical pulses having M=3 different PRIs, then a pixel neighborhood 500 with 60 pixels may include approximately 20 pixels associated with each of the three PRIs. A pixel neighborhood 500 including approximately equal numbers of pixels associated with each of the PRIs may refer to the number of pixels being equal to within any suitable percentage (e.g., within approximately 0%, 1%, 2%, 5%, 10%, 20%, or 30%) or to within any suitable number of pixels (e.g., within approximately 0 pixels, 1 pixel, 2 pixels, 5 pixels, 10 pixels, or 20 pixels). For example, if a light source 110 emits optical pulses having M=2 different PRIs, then, for a pixel neighborhood with 60 pixels total, a pixel under test 210 may be determined to be not range-wrapped if the pixel neighborhood includes 30 pixels±10% (e.g., 27-33 pixels) associated with each of the two PRIs. As another example, if a light source 110 emits optical pulses having M=3 different PRIs, then, for a pixel neighborhood with 60 pixels total, a pixel under test 210 may be determined to be not range-wrapped if the pixel neighborhood includes 20±4 pixels (e.g., 16-24 pixels) associated with each of the three PRIs.

In FIG. 28, the pixel neighborhood 500 includes 11 pixels associated with PRI $\tau_1$ and 12 pixels associated with PRI $\tau_2$. Since the number of pixels associated with each of the two PRIs are equal to within 10% (or to within 1 pixel), the determination may be made that the pixel under test 210 is not range-wrapped. In FIG. 30, both of the pixels 210a and 210b may be determined to be range-wrapped since each of their respective pixel neighborhoods 500a and 500b does not include approximately equal numbers of pixels associated with the two PRIs. In FIG. 32, the pixel neighborhood 500 includes 7 pixels associated with PRI $\tau_1$, 8 pixels associated with PRI $\tau_2$, and 8 pixels associated with PRI $\tau_3$. Since the number of pixels associated with each of the two PRIs are equal to within 15% (or to within 1 pixel), the determination may be made that the pixel under test 210 is not range-wrapped. In FIG. 34, the pixels 210a, 210b, and 210c may each be determined to be range-wrapped since each of their respective pixel neighborhoods 500a, 500b, and 500c does not include approximately equal numbers of pixels associated with the three PRIs.

In particular embodiments, determining that a pixel under test 210 is range-wrapped may include determining a pixel-disparity metric (PDM) based on the PRIs associated with the pixels in a corresponding group of neighboring pixels. The PDM value of a pixel under test 210 may correspond to a likelihood or probability that the pixel under test 210 is range-wrapped. For example, a PDM may be a numeric value from 0 to 1, where 0 corresponds to an approximate 0% likelihood that a pixel is range-wrapped and 1 corresponds to an approximate 100% likelihood that a pixel is range-wrapped. In particular embodiments, one or more thresholds may be applied to a PDM value to determine whether or not a pixel under test 210 is range-wrapped. For example, a pixel under test 210 may be determined to be range-wrapped if its associated PDM value is greater than approximately 0.6, 0.7, 0.8, 0.9, 0.95, 0.99, or any other suitable range-wrap threshold value. As another example, a pixel under test 210 may be determined to be not range-wrapped if its associated PDM value is less than approximately 0.4, 0.3, 0.2, 0.1, 0.05, 0.01, or any other suitable non-range-wrap threshold value. In response to determining that a pixel under test 210 is range-wrapped, a processor may: (1) tag the pixel with a PDM value corresponding to the likelihood that the pixel is range-wrapped; (2) tag the pixel with a value indicating that the pixel is range-wrapped; (3) discard or ignore the range-wrapped pixel; or (4) determine a corrected distance for the range-wrapped pixel.

For a light source 110 that emits optical pulses with two PRIs ($\tau_1$ and $\tau_2$), a pixel-disparity metric (PDM) may be determined from the expression $$PDM = \frac{|N_{\tau 1} - N_{\tau 2}|}{(N_{\tau 1} + N_{\tau 2})},$$

where $N_{\tau 1}$ is the number of neighboring pixels associated with PRI $\tau_1$, and $N_{\tau 2}$ is the number of neighboring pixels associated with PRI $\tau_2$. In FIGS. 27 and 28, the lidar system 100 emits optical pulses that alternate between the two PRIs $\tau_1$ and $\tau_2$. The pixel neighborhood 500 in FIG. 28 includes 11 pixels associated with PRI $\tau_1$ (e.g., $N_{\tau 1}$=11) and 12 pixels associated with PRT $\tau_2$ (e.g., $\Delta T_{\tau 2}$=12). Based on this, the PDM for the pixel under test 210 is $$\frac{|11-12|}{(11+12)},$$

or approximately 0.04. If the non-range-wrap threshold for determining that a pixel is not range-wrapped is 0.1, then the pixel under test 210 in FIG. 28 may be determined to be not range-wrapped since its PDM value is less than the 0.1 threshold. In FIG. 30, the pixel neighborhood 500*a* includes $N_{\tau 1}=11$ pixels associated with PRI $\tau_1$ and $N_{\tau 2}=0$ pixels associated with PRI $\tau_2$. This corresponds to a PDM value of 1.0 for the pixel under test 210*a*, which may indicate that pixel 210*a* is range-wrapped. Similarly, in FIG. 30, the PDM value for the pixel under test 210*b* is 1.0, which may indicate that the pixel 210*b* is range-wrapped. If the pixel neighborhood 500*b* also included $N_{\tau 2}=1$ pixel associated with PRI $\tau_2$, then the PDM for the pixel under test 210 would be $$\frac{|11-1|}{(11+1)},$$

or approximately 0.83. If the range-wrap threshold for determining that a pixel is range-wrapped is 0.8, then the pixel under test 210 may be determined to be range-wrapped based on the PDM value 0.83 being greater than the 0.8 threshold.

For a light source 110 that emits optical pulses with three PRIs ($\tau_1$, $\tau_2$, and $\tau_3$), a pixel-disparity metric associated with the first PRI ($PDM_{\tau 1}$) may be determined from the expression $$PDM_{\tau 1} = \frac{|3N_{\tau 1} - N_T|}{2N_T},$$

where $N_{\tau 1}$ is the number of neighboring pixels associated with the PM $\tau_1$, and $N_T$ is the total number of pixels in the pixel neighborhood 500. Similarly, a pixel-disparity metric associated with the second PRI ($PDM_{\tau 2}$) may be determined from the expression $$PDM_{\tau 2} = \frac{|3N_{\tau 2} - N_T|}{2N_T},$$

where $N_{\tau 2}$ is the number of neighboring pixels associated with PRI $\tau_2$. Additionally, a pixel-disparity metric associated with the third PRI ($PDM_{\tau 3}$) may be determined from the expression $$PDM_{\tau 3} = \frac{|3N_{\tau 3} - N_T|}{2N_T},$$

where $N_{\tau 3}$ is the number of neighboring pixels associated with PRI $\tau_3$.

The pixel neighborhood 500 in FIG. 32 includes a total of $N_T=23$ pixels, where $N_{\tau 1}=7$ pixels are associated with PRI $\tau_1$, $N_{\tau 2}=8$ pixels are associated with PRI $\tau_2$, and $N_{\tau 3}=8$ pixels are associated with PRI $\tau_3$. The pixel-disparity metric associated with the first PRI is $$PDM_{\tau 1} = \frac{|3 \cdot 7 - 23|}{2 \cdot 23},$$

or approximately 0.04. The pixel-disparity metric associated with the second PRI is approximately 0.02, and the pixel-disparity metric associated with the third PRI is approximately 0.02. In particular embodiments, a processor may determine whether the pixel under test 210 is range-wrapped based at least in part on one or more of the values of $PDM_{\tau 1}$, $PDM_{\tau 2}$, and $PDM_{\tau 3}$. For example, a processor may determine a PDM value for the pixel under test 210 based at least in part on: the value of $PDM_{\tau 1}$, $PDM_{\tau 2}$, or $PDM_{\tau 3}$; the maximum of the three values of $PDM_{\tau 1}$, $PDM_{\tau 2}$, and $PDM_{\tau 3}$; or the average of the three values of $PDM_{\tau 1}$, $PDM_{\tau 2}$, and $PDM_{\tau 3}$. In FIG. 32, if the PDM value for the pixel under test 210 is based on the maximum of the three values, then the PDM value for the pixel under test 210 in FIG. 32 is approximately 0.04. If the threshold for determining that a pixel is not range-wrapped is 0.1, then the pixel under test 210 in FIG. 32 may be determined to be not range-wrapped since its PDM value is less than the 0.1 threshold.

In FIG. 34, the pixel neighborhood 500*a* includes $N_{\tau 1}=7$ pixels associated with PRI $\tau_1$ and zero pixels associated with each of the other two PRIs ($\tau_2$ and $\tau_3$). For the pixel under test 210*a*, this corresponds to a value of 1.0 for $PDM_{\tau 1}$ and a value of 0.5 for each of $PDM_{\tau 2}$ and $PDM_{\tau 3}$. The maximum of the three PDM values is then 1.0, which may indicate that the pixel under test 210*a* is range-wrapped. In FIG. 34, a similar determination may be made that the pixel under test 210*b* is range-wrapped, based at least in part on the corresponding values of $PDM_{\tau 1}$, $PDM_{\tau 2}$, and $PDM_{\tau 3}$ for the pixel neighborhood 500*b* (e.g., $PDM_{\tau 2}$ may have a value of 1.0, and $PDM_{\tau 1}$ and $PDM_{\tau 3}$ may each have a value of 0.5). Additionally, in FIG. 34, a determination may be made that the pixel under test 210*c* is range-wrapped, based at least in part on the corresponding values of $PDM_{\tau 1}$, $PDM_{\tau 2}$, and $PDM_{\tau 3}$ for the pixel neighborhood 500*c* (e.g., $PDM_{\tau 3}$ may have a value of 1.0, and $PDM_{\tau 1}$ and $PDM_{\tau 2}$ may each have a value of 0.5).

For the pixel neighborhood 500*a* in FIG. 34, the value of 0.5 for each of $PDM_{\tau 2}$ and $PDM_{\tau 3}$ may indicate that the pixel neighborhood 500*a* contains zero pixels associated with PRI $\tau_2$ or $\tau_3$, which may correspond to the pixel under test 210*a* being range-wrapped. In particular embodiments, for a lidar system with three PRIs ($\tau_1$, $\tau_2$, and $\tau_3$), a processor may determine that a pixel under test 210 is range-wrapped if (1) the value of one of $PDM_{\tau 1}$, $PDM_{\tau 2}$, and $PDM_{\tau 3}$ is greater than a particular range-wrap threshold value (e.g., greater than 0.9) or (2) the values of the other two PDMs are each approximately equal to 0.5. For example, for a pixel neighborhood 500 with $N_{\tau 1}=60$ pixels associated with PRI $\tau_1$, $N_{\tau 2}=1$ pixel associated with PRI $\tau_2$, and $N_{\tau 3}=2$ pixels associated with PRI$_{\tau 3}$, the corresponding PDM values are approximately $PDM_{\tau 1}=0.93$, $PDM_{\tau 2}=0.48$, and $PDM_{\tau 3}=0.45$. A processor may determine that the associated pixel under test 210 is range-wrapped based on the value for $PDM_{\tau 1}$ being greater than a particular range-wrap threshold value (e.g., $PDM_{\tau 1}$ is greater than 0.9). Alternatively, a processor may determine that the associated pixel under test 210 is range-wrapped based on the values for each of $PDM_{\tau 2}$ and $PDM_{\tau 3}$ being approximately equal to 0.5 (e.g., both $PDM_{\tau 2}$ and $PDM_{\tau 3}$ are within 10% of 0.5). Alternatively, a processor may determine that the associated pixel under test 210 is range-wrapped based on (1) $PDM_{\tau 1}$ being greater than a particular range-wrap threshold value and (2) each of $PDM_{\tau 2}$ and $PDM_{\tau 3}$ being approximately equal to 0.5.

For a light source 110 that emits optical pulses with M different PRIs (where M is an integer greater than or equal to 2), a pixel-disparity metric associated with the first PRI ($PDM_{\tau 1}$) may be determined from the expression $$PDM_{\tau 1} = \frac{|M \cdot N_{\tau 1} - N_T|}{(M-1)N_T},$$

where $N_{\tau 1}$ is the number of neighboring pixels associated with PRI $\tau_1$, and $N_T$ is the total number of pixels in the pixel neighborhood 500. Similarly, a pixel-disparity metric associated with the kth PRI ($PDM_{\tau k}$), where k is a positive integer less than or equal to M may be determined from the expression $$PDM_{\tau k} = \frac{|M \cdot N_{\tau k} - N_T|}{(M-1)N_T},$$

where $N_{\tau k}$ is the number of neighboring pixels associated with PM $\tau_k$. From the expression for $PDM_{\tau k}$, M PDM values may be determined for a pixel neighborhood 500 associated with a pixel under test 210, where each PDM value corresponds to one of the MPRIs.

In particular embodiments, a processor may determine that a pixel under test 210 is range-wrapped if (1) the value of one of the M $PDM_{\tau k}$ values is greater than a particular range-wrap threshold value, (2) the $PDM_{\tau k}$ with the maximum value of the M $PDM_{\tau k}$ values exceeds a particular range-wrap threshold value, or (3) the values of (M−1) of the PDM values are each approximately equal to 1/(M−1). For example, for a lidar system 100 that emits optical pulses with M=4 different PRIs, a pixel neighborhood 500 may include the following: $N_{\tau 1}$=60 pixels associated with PRI $\tau_1$, $N_{\tau 2}$=0 pixels associated with PRI $\tau_2$, $N_{\tau 3}$=1 pixel associated with PRI $\tau_3$, and $N_{\tau 4}$=2 pixels associated with PRI $\tau_4$. The corresponding PDM values for the pixel neighborhood are approximately: $PDM_{\tau 1}$=0.94, $PDM_{\tau 2}$=0.33, $PDM_{\tau 3}$=0.31, and $PDM_{\tau 4}$=0.29. A processor may determine that the associated pixel under test 210 is range-wrapped based on the value for $PDM_{\tau 1}$ being greater than a particular threshold value (e.g., $PDM_{\tau 1}$ is greater than 0.9). Alternatively, a processor may determine that the associated pixel under test 210 is range-wrapped based on the values for each of $PDM_{\tau 2}$, $PDM_{\tau 3}$, and $PDM_{\tau 4}$ being approximately equal to 1/(M−1), or approximately 0.33 (e.g., $PDM_{\tau 2}$, $PDM_{\tau 3}$, and $PDM_{\tau 4}$ are each within 15% of 0.33). Alternatively, a processor may determine that the associated pixel under test 210 is range-wrapped based on (1) $PDM_{\tau 1}$ being greater than a particular threshold value and (2) each of $PDM_{\tau 2}$, $PDM_{\tau 3}$, and $PDM_{\tau 4}$ being approximately equal to 0.33.

In particular embodiments, a processor may determine that a pixel under test 210 is not range-wrapped based on the value of each of the M $PDM_{\tau k}$ values for the pixel neighborhood associated with the pixel under test 210. For example, a processor may determine that a pixel under test 210 is not range-wrapped if (1) the value of each of the M $PDM_{\tau k}$ values is less than a particular non-range-wrap threshold value, (2) the maximum of the M $PDM_{\tau k}$ values is less than a particular non-range-wrap threshold value, or (3) the average of the M $PDM_{\tau k}$ values is less than a particular non-range-wrap threshold value. As an example, for a lidar system 100 that emits optical pulses with M=4 different PRIs, a pixel neighborhood 500 may include the following: $N_{\tau 1}$=14 pixels associated with PRI $\tau_1$, $N_{\tau 2}$=15 pixels associated with PRI $\tau_2$, $N_{\tau 3}$=16 pixel associated with PRI $\tau_3$, and $N_{\tau 4}$=17 pixels associated with PRI $\tau_4$. The corresponding PDM values for the pixel neighborhood 500 are approximately: $PDM_{\tau 1}$=0.03, $PDM_{\tau 2}$=0.01, $PDM_{\tau 3}$=0.01, and $PDM_{\tau 4}$=0.03. These relatively low PDM values may indicate that the pixel neighborhood 500 includes approximately equal numbers of pixels associated with each of the four PRIs, which in turn may indicate that the associated pixel 210 is not range-wrapped. If the threshold for determining that a pixel is not range-wrapped is 0.1, then a processor may determine that the associated pixel under test 210 is not range-wrapped based on each of the PDM values being less than the 0.1 non-range-wrap threshold value.

Figure 38:
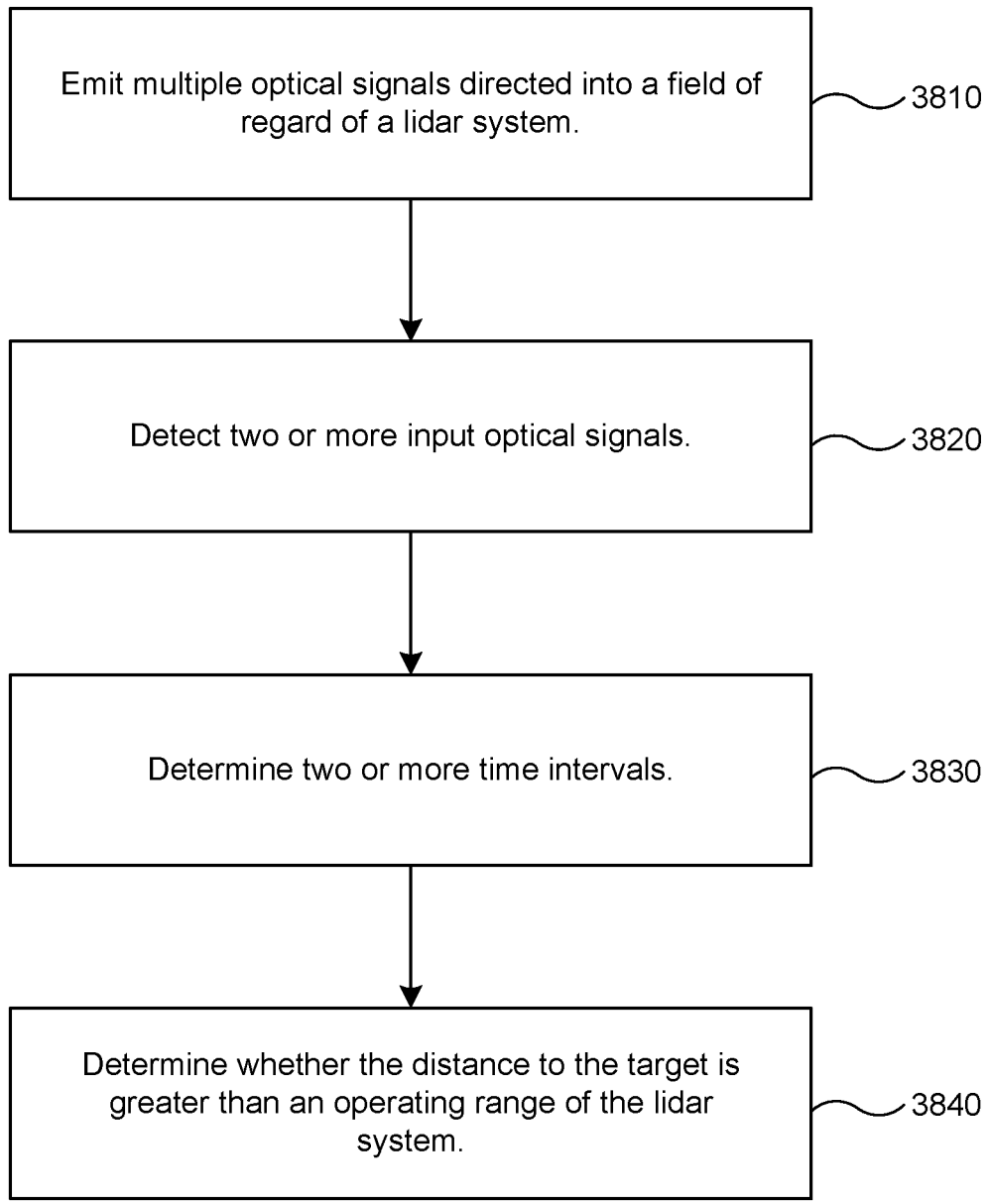
FIG. 38 illustrates an example method for determining whether a distance to a target is greater than an operating range.

FIG. 38 illustrates an example method 3800 for determining whether a distance to a target 130 is greater than an operating range. The method 3800 illustrated in FIG. 38 may correspond to or may be part of a method for mitigating range ambiguity. For example, in FIG. 12 or 14, the lidar system 100 may emit optical signals toward a target 130, and method 3800 may be used to determine whether the target 130 is located a distance that is greater than the operating range of the lidar system or a distance that is less than the operating range of the lidar system. The method may begin at step 3810, where a light source 110 of a lidar system 100 may emit multiple optical signals that are directed into a field of regard of the lidar system 100. The optical signals may include: a first optical signal; a second optical signal emitted a first time period $\tau_1$ after the first optical signal; and a third optical signal emitted a second time period $\tau_2$ after the second optical signal, where $\tau_2$ is different from $\tau_1$. Each of the optical signals may include a pulse of light (e.g., for a pulsed lidar system) or frequency-modulated light (e.g., for a FMCW lidar system). At step 3820, a receiver 140 of the lidar system 100 may detect two or more input optical signals. For example, the receiver 140 may detect a first input optical signal and a second input optical signal. The first and second input optical signals may each include light from one of the emitted optical signals that is scattered by a target 130 located a distance D from the lidar system 100. The first input optical signal may be detected a first time interval $\Delta T_1$ after the second optical signal is emitted, and the second input optical signal may be detected a second time interval $\Delta T_2$ after the third optical signal is emitted. At step 3830, two or more time intervals may be determined. Each time interval may correspond to a time between the emission of an optical signal and the subsequent detection of an input optical signal. For example, a processor of the lidar system 100 may determine the first time interval $\Delta T_1$ between emission of the second optical signal and detection of the first input optical signal. Additionally, the processor may determine the second time interval $\Delta T_2$ between emission of the third optical signal and detection of the second input optical signal. At step 3840, the processor of the lidar system 100 may determine whether the distance D is greater than an operating range $R_{OP}$ of the lidar system 100, at which point the method may end. The determination of whether D is greater than $R_{OP}$ may be based at least in part on the time intervals $\Delta T_1$ and $\Delta T_2$. For example, if $\Delta T_1$ and $\Delta T_2$ are approximately equal, then this may indicate that the distance to the target is less than $R_{OP}$ and the first and second input optical signals may not be associated with range ambiguity. As another example, if $(\Delta T_1 - \Delta T_2)$ is approximately equal to $(\tau_2 - \tau_1)$, then this may indicate that the distance to the target is greater than $R_{OP}$ and the first and second input optical signals may be associated with range ambiguity.

In particular embodiments, a processor may be part of a receiver 140 (e.g., an ASIC or FPGA that is located within the receiver 140), or a processor may be located elsewhere within a lidar system 100 or external to the lidar system 100. Alternatively, a processor may include two or more processors, where one or more of the processors are part of the receiver 140 and one or more other processors are located elsewhere within the lidar system 100 or external to the lidar system 100. For example, a processor that is part of a receiver 140 may determine the time intervals $\Delta T_1$ and $\Delta T_2$ and may determine whether a distance D is greater than $R_{OP}$. Alternatively, a receiver 140 may include a processor that determines the time intervals $\Delta T_1$ and $\Delta T_2$, and another processor located external to the receiver 140 may determine whether a distance D is greater than $R_{OP}$.

Figure 39:
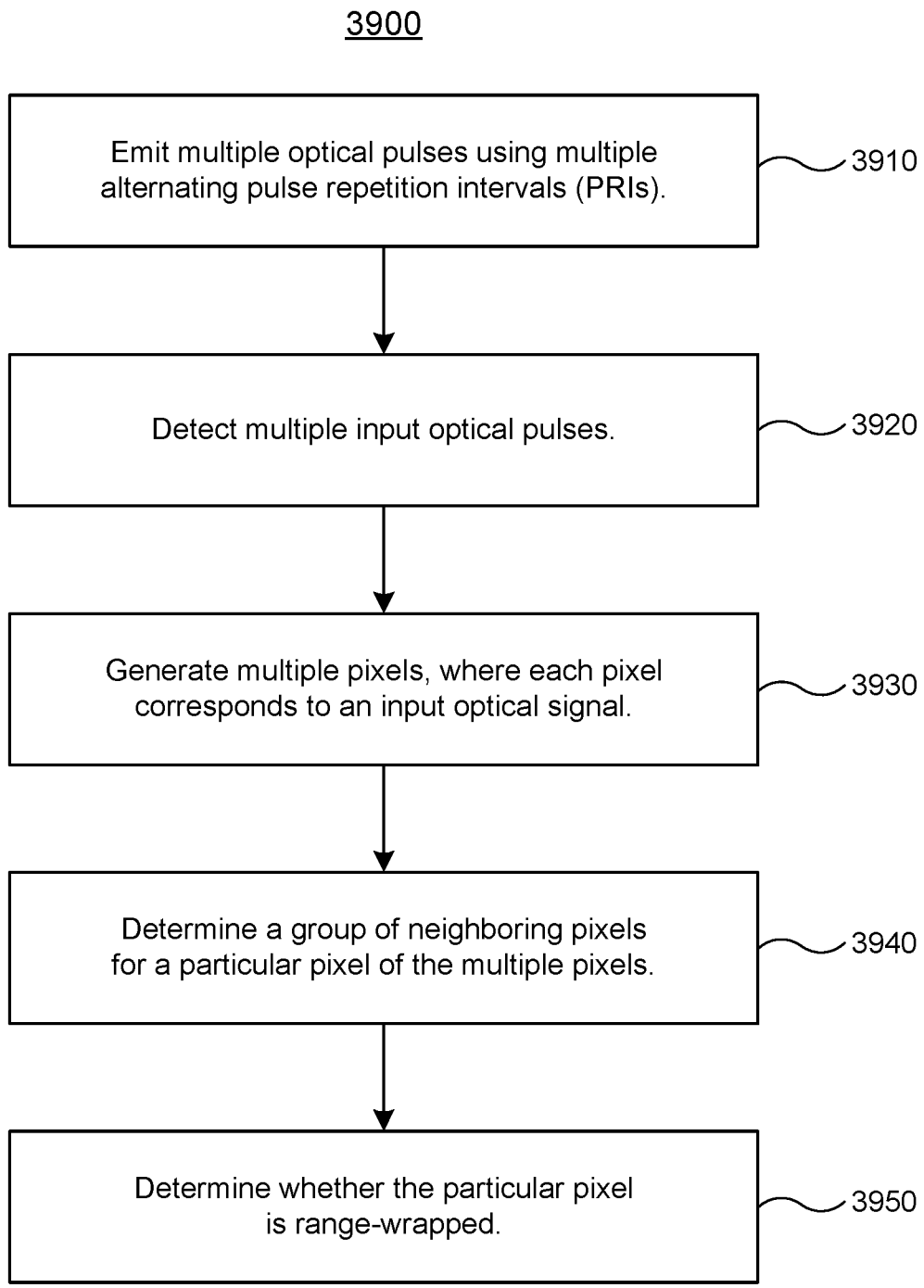
FIG. 39 illustrates an example method for determining whether a pixel is range-wrapped.

FIG. 39 illustrates an example method for determining whether a pixel is range-wrapped. The method 3900 illustrated in FIG. 39 may correspond to or may be part of a method for mitigating range ambiguity. The method may begin at step 3910, where a light source 110 of a lidar system 100 may emit multiple optical pulses using multiple alternating pulse repetition intervals (PRIs). The PRIs may include a first PRI and a second PRI, where the first PRI and the second PRI are not equal. At step 3920, a receiver 140 of the lidar system 100 may detect multiple input optical pulses. Each of the input optical pulses may include light from one of the emitted optical pulses that is scattered by a target 130 located a distance from the lidar system 100. At step 3930, a processor of the lidar system 100 may generate multiple pixels 210, where each pixel corresponds to one of the input optical pulses. Each pixel may include a PRI associated with a most recently emitted optical pulse. At step 3940, the processor may determine a group of neighboring pixels for a particular pixel (e.g., pixel under test 210) of the multiple pixels. For example, the neighboring pixels may be located within a threshold distance of the particular pixel, or the neighboring pixels may be located in a cuboid approximately centered on the particular pixel. At step 3950, the processor may determine whether the particular pixel is range-wrapped based at least in part on the PRI associated with each pixel of the group of neighboring pixels, at which point the method may end. The determination of whether the particular pixel is range-wrapped may include determining a pixel-disparity metric (PDM) that corresponds to a likelihood or probability that the particular pixel is range-wrapped.

In some embodiments, after the processor has determined range-wrap information for a particular pixel or has determined that the distance to a target represented by a particular pixel is greater than the operating range of the lidar system, the processor may update the particular pixel. The processor may update the particular pixel by, for example, (1) tagging the pixel with range-wrap information, (2) discarding or ignoring the pixel if it is range-wrapped; or (3) determining a corrected distance for the pixel if it is range-wrapped. The processor may use an updated point cloud comprising updated pixels for various functions associated with autonomous vehicles, such as perception and identification of objects and environmental features, motion planning, and providing control signals to one or more driving systems of the autonomous vehicle to effectuate maneuvering of the autonomous vehicle. The processor may directly or indirectly use the updated point cloud to accomplish the various functions. For example, the processor may use the updated point cloud for object perception, and may use the identified objects rather than the updated point cloud for motion planning.

The following paragraphs describe various specific embodiments of a lidar system:

A lidar system comprising: a light source configured to emit a plurality of optical signals directed into a field of regard of the lidar system; a receiver configured to detect two or more input optical signals, each input optical signal comprising light from one of the emitted optical signals that is scattered by a target located a distance from the lidar system; and a processor configured to determine whether the distance to the target is greater than an operating range of the lidar system based at least in part on two or more time intervals, wherein each time interval corresponds to a duration of time between emission of one of the optical signals and a subsequent detection of one of the input optical signals.

The lidar system, further comprising a scanner configured to scan the emitted optical signals along a scan pattern within the field of regard of the lidar system.

The lidar system, wherein the scanner comprises one or more scan mirrors, wherein each scan mirror is mechanically driven by a galvanometer scanner, a synchronous electric motor, a microelectromechanical systems (MEMS) device, a resonant scanner, or a voice coil motor.

The lidar system, wherein the scanner comprises: a scanning mirror configured to scan the emitted optical signals along a first direction; and a polygon mirror configured to scan the emitted optical signals along a second direction substantially orthogonal to the first direction.

The lidar system, wherein the scanner comprises a solid-state scanning device comprising one or more of the following: an optical phased array scanning device; a liquid-crystal scanning device; a liquid lens scanning device; or a quantum-dot array scanning device.

The lidar system, wherein the receiver comprises an avalanche photodiode or a PIN photodiode.

The lidar system, wherein the lidar system is a pulsed lidar system wherein the plurality of optical signals comprise optical pulses having: a pulse energy between 0.1 µJ and 100 µJ; a pulse repetition frequency between 80 kHz and 10 MHz; and a pulse duration between 0.1 ns and 50 ns.

The lidar system, wherein: the lidar system is a frequency-modulated continuous-wave (FMCW) lidar system wherein each of the plurality of emitted optical signals comprises frequency-modulated light; and the receiver is further configured to determine a frequency difference between an emitted optical signal and an input optical signal.

The lidar system, wherein the light source comprises a direct-emitter laser diode configured to emit the optical signals.

The lidar system, wherein the light source comprises a seed laser diode configured to produce a plurality of seed optical signals and a fiber-optic amplifier configured to amplify the seed optical signals to produce the emitted optical signals.

The lidar system, wherein the light source comprises a seed laser diode configured to produce a plurality of seed optical signals and a semiconductor optical amplifier (SOA) configured to amplify the seed optical signals to produce the emitted optical signals.

The lidar system, wherein the light source comprises a Q-switched diode-pumped solid-state (DPSS) laser configured to produce the emitted optical signals comprising a series of pulses of light, the DPSS laser comprising: a gain medium; one or more pump laser diodes configured to optically pump the gain medium; and a passive or active Q-switch.

The lidar system, wherein the lidar system is part of a vehicle comprising an advanced driver assistance system (ADAS) configured to assist a driver of the vehicle in operating the vehicle, wherein the lidar system is configured to provide information about a surrounding environment of the vehicle to the ADAS.

The lidar system, wherein the lidar system is part of an autonomous vehicle comprising an autonomous-vehicle driving system configured to guide the autonomous vehicle through a surrounding environment toward a destination, wherein the lidar system is configured to provide information about the surrounding environment to the autonomous-vehicle driving system.

A lidar system comprising: a light source configured to emit a plurality of optical signals directed into a field of regard of the lidar system, the optical signals comprising a first series of optical signals having a first pulse period $\tau_1$ followed by a second series of optical signals having a second pulse period $\tau_2$, wherein $\tau_2$ is different from $\tau_1$; a receiver configured to detect: one or more first input optical signals comprising light from the first series of optical signals scattered by a target located a distance from the lidar system; and one or more second input optical signals comprising light from the second series of optical signals scattered by the target; and a processor configured to: determine a first preliminary distance to the target based at least in part on timing information associated with the first input optical signals; determine a second preliminary distance to the target based at least in part on timing information associated with the second input optical signals; and determine, based at least in part on the first and second preliminary distances, whether the distance to the target is greater than an operating range of the lidar system.

The lidar system, wherein the processor is configured to determine that the distance to the target is greater than the operating range if $(D_1-D_2)$ is approximately equal to $c\cdot(\tau_2-\tau_1)/2$, wherein: $D_1$ is the first preliminary distance; $D_2$ is the second preliminary distance; and c is a speed of light.

The lidar system, wherein the processor is further configured to determine that the distance to the target is less than the operating range if the first preliminary distance is approximately equal to the second preliminary distance.

The lidar system, wherein the processor is further configured, in response to determining that the distance to the target is less than the operating range, to determine that the distance to the target is approximately equal to the first preliminary distance.

The lidar system, further comprising a scanner configured to scan the emitted optical signals along a scan pattern within the field of regard of the lidar system, the scan pattern comprising a series of scan lines, wherein: the first series of optical signals is scanned along a first scan line; and the second series of optical signals is scanned along a subsequent second scan line.

The lidar system, further comprising a scanner configured to scan the emitted optical signals across the field of regard, wherein the lidar system is configured to capture a series of frames of the field of regard, wherein the first series of optical signals is associated with a first frame and the second series of optical signals is associated with a subsequent second frame.

A lidar system comprising: a light source configured to emit a plurality of optical signals directed into a field of regard of the lidar system, the optical signals comprising a first series of optical signals having a first pulse period $\tau_1$ followed by a second series of optical signals having a second pulse period $\tau_2$, wherein $\tau_2$ is different from $\tau_1$; a receiver configured to detect: a first series of input optical signals comprising scattered light from the first series of optical pulses; and a second series of input optical signals comprising scattered light from the second series of optical pulses; and a processor configured to: produce a first point cloud based on the first series of input optical signals, the first point cloud comprising a plurality of first pixels, wherein each first pixel corresponds to an input optical signal of the first series of input optical signals; produce a second point cloud based on the second series of input optical signals, the second point cloud comprising a plurality of second pixels, wherein each second pixel corresponds to an input optical signal of the second series of input optical signals; partition the first point cloud to identify a group of the first pixels associated with a target; partition the second point cloud to identify a group of the second pixels associated with the target; determine a first preliminary distance to the target based at least in part on the first group of pixels; determine a second preliminary distance to the target based at least in part on the second group of pixels; and determine, based at least in part on the first and second preliminary distances, whether the distance to the target is greater than an operating range of the lidar system.

Figure 40:
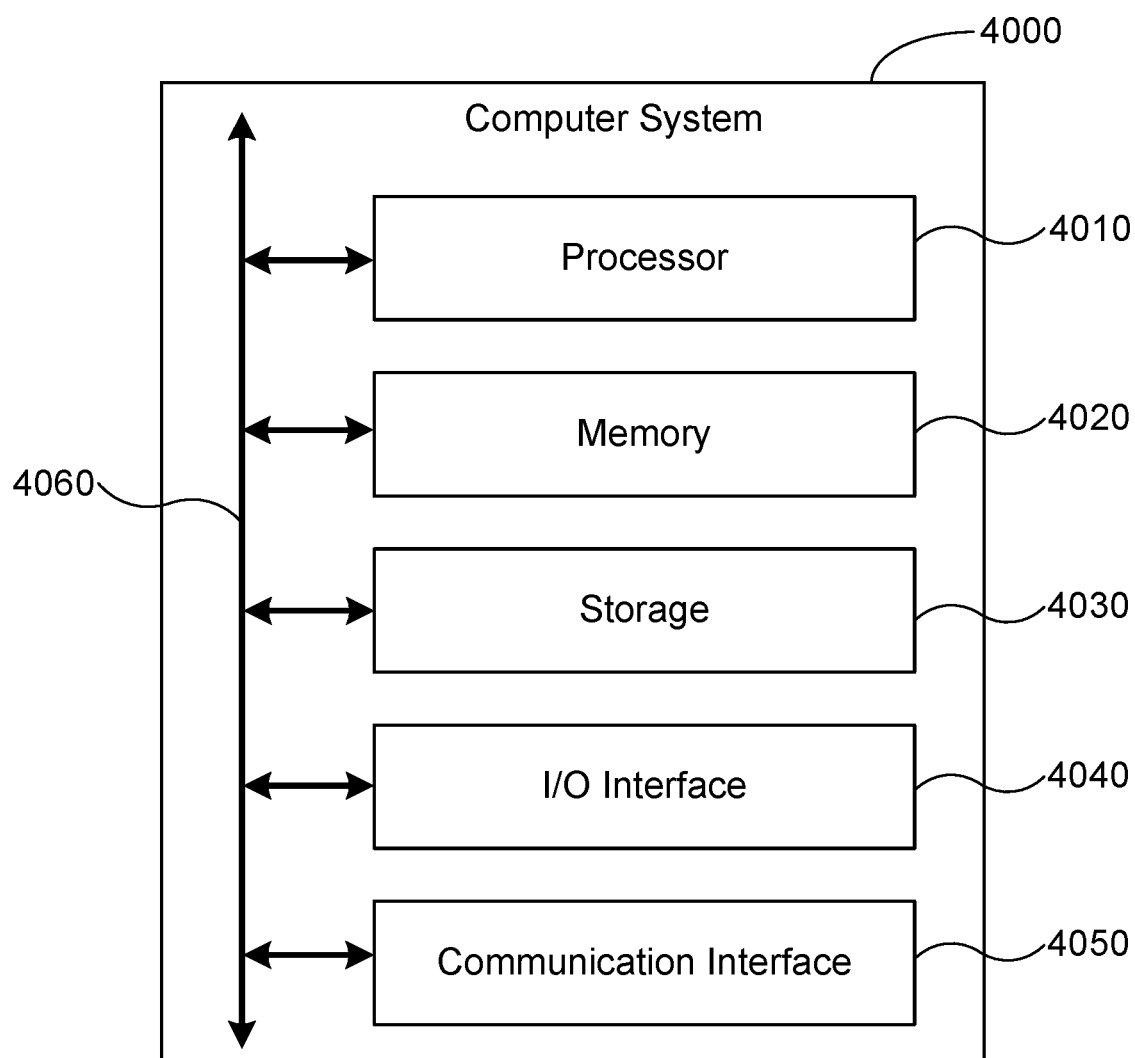
FIG. 40 illustrates an example computer system.

FIG. 40 illustrates an example computer system 4000. In particular embodiments, one or more computer systems 4000 may perform one or more steps of one or more methods described or illustrated herein. In particular embodiments, one or more computer systems 4000 may provide functionality described or illustrated herein. In particular embodiments, software running on one or more computer systems 4000 may perform one or more steps of one or more methods described or illustrated herein or may provide functionality described or illustrated herein. Particular embodiments may include one or more portions of one or more computer systems 4000. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 4000 may take any suitable physical form. As an example, computer system 4000 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 4000 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 4000 may include one or more computer systems 4000; be unitary or distributed; span multiple locations; span multiple machines; span multiple data centers; or reside in a cloud, which may include one or more cloud components in one or more networks. Where appropriate, one or more computer systems 4000 may perform without substantial spatial or temporal limitation one or more steps of one or more methods described or illustrated herein. As an example, one or more computer systems 4000 may perform in real time or in batch mode one or more steps of one or more methods described or illustrated herein. One or more computer systems 4000 may perform at different times or at different locations one or more steps of one or more methods described or illustrated herein, where appropriate.

As illustrated in the example of FIG. 40, computer system 4000 may include a processor 4010, memory 4020, storage 4030, an input/output (I/O) interface 4040, a communication interface 4050, or a bus 4060. Computer system 4000 may include any suitable number of any suitable components in any suitable arrangement.

In particular embodiments, processor 4010 may include hardware for executing instructions, such as those making up a computer program. As an example, to execute instructions, processor 4010 may retrieve (or fetch) the instructions from an internal register, an internal cache, memory 4020, or storage 4030; decode and execute them; and then write one or more results to an internal register, an internal cache, memory 4020, or storage 4030. In particular embodiments, processor 4010 may include one or more internal caches for data, instructions, or addresses. Processor 4010 may include any suitable number of any suitable internal caches, where appropriate. As an example, processor 4010 may include one or more instruction caches, one or more data caches, or one or more translation lookaside buffers (TLBs). Instructions in the instruction caches may be copies of instructions in memory 4020 or storage 4030, and the instruction caches may speed up retrieval of those instructions by processor 4010. Data in the data caches may be copies of data in memory 4020 or storage 4030 for instructions executing at processor 4010 to operate on; the results of previous instructions executed at processor 4010 for access by subsequent instructions executing at processor 4010 or for writing to memory 4020 or storage 4030; or other suitable data. The data caches may speed up read or write operations by processor 4010. The TLBs may speed up virtual-address translation for processor 4010. In particular embodiments, processor 4010 may include one or more internal registers for data, instructions, or addresses. Processor 4010 may include any suitable number of any suitable internal registers, where appropriate. Where appropriate, processor 4010 may include one or more arithmetic logic units (ALUs); may be a multi-core processor; or may include one or more processors 4010.

In particular embodiments, memory 4020 may include main memory for storing instructions for processor 4010 to execute or data for processor 4010 to operate on. As an example, computer system 4000 may load instructions from storage 4030 or another source (such as, for example, another computer system 4000) to memory 4020. Processor 4010 may then load the instructions from memory 4020 to an internal register or internal cache. To execute the instructions, processor 4010 may retrieve the instructions from the internal register or internal cache and decode them. During or after execution of the instructions, processor 4010 may write one or more results (which may be intermediate or final results) to the internal register or internal cache. Processor 4010 may then write one or more of those results to memory 4020. One or more memory buses (which may each include an address bus and a data bus) may couple processor 4010 to memory 4020. Bus 4060 may include one or more memory buses. In particular embodiments, one or more memory management units (MMUs) may reside between processor 4010 and memory 4020 and facilitate accesses to memory 4020 requested by processor 4010. In particular embodiments, memory 4020 may include random access memory (RAM). This RAM may be volatile memory, where appropriate. Where appropriate, this RAM may be dynamic RAM (DRAM) or static RAM (SRAM). Memory 4020 may include one or more memories 4020, where appropriate.

In particular embodiments, storage 4030 may include mass storage for data or instructions. As an example, storage 4030 may include a hard disk drive (HDD), a floppy disk drive, flash memory, an optical disc, a magneto-optical disc, magnetic tape, or a Universal Serial Bus (USB) drive or a combination of two or more of these. Storage 4030 may include removable or non-removable (or fixed) media, where appropriate. Storage 4030 may be internal or external to computer system 4000, where appropriate. In particular embodiments, storage 4030 may be non-volatile, solid-state memory. In particular embodiments, storage 4030 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 4030 may include one or more storage control units facilitating communication between processor 4010 and storage 4030, where appropriate. Where appropriate, storage 4030 may include one or more storages 4030.

In particular embodiments, I/O interface 4040 may include hardware, software, or both, providing one or more interfaces for communication between computer system 4000 and one or more I/O devices. Computer system 4000 may include one or more of these I/O devices, where appropriate. One or more of these I/O devices may enable communication between a person and computer system 4000. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 4040 may include one or more device or software drivers enabling processor 4010 to drive one or more of these I/O devices. I/O interface 4040 may include one or more I/O interfaces 4040, where appropriate.

In particular embodiments, communication interface 4050 may include hardware, software, or both providing one or more interfaces for communication (such as, for example, packet-based communication) between computer system 4000 and one or more other computer systems 4000 or one or more networks. As an example, communication interface 4050 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 4000 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 4000 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 4000 may communicate using fiber-optic communication based on 100 Gigabit Ethernet (100 GbE), 10 Gigabit Ethernet (10 GbE), or Synchronous Optical Networking (SONET). Computer system 4000 may include any suitable communication interface 4050 for any of these networks, where appropriate. Communication interface 4050 may include one or more communication interfaces 4050, where appropriate.

In particular embodiments, bus 4060 may include hardware, software, or both coupling components of computer system 4000 to each other. As an example, bus 4060 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 4060 may include one or more buses 4060, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 4000. As an example, computer software may include instructions configured to be executed by processor 4010. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
   a light source configured to emit a plurality of optical signals directed into a field of regard of the lidar system, wherein the optical signals comprise:
   a first optical signal;
   a second optical signal emitted a first time period $\tau_1$ after the first optical signal; and
   a third optical signal emitted a second time period $\tau_2$ after the second optical signal,
   wherein $\tau_2$ is different from $\tau_1$;
   a receiver configured to detect a first input optical signal and a second input optical signal, the first and second input optical signals each comprising light from one of the emitted optical signals that is scattered by a target located a distance from the lidar system; and
   a processor configured to:
   determine a first time interval $\Delta T_1$ between a time when the second optical signal is emitted and a time when the first input optical signal is detected;
   determine a second time interval $\Delta T_2$ between a time when the third optical signal is emitted and a time when the second input optical signal is detected; and
   determine whether the distance to the target is greater than an operating range of the lidar system based at least in part on the time intervals $\Delta T_1$ and $\Delta T_2$.

2. The lidar system of claim 1, wherein:
   $\Delta\tau=(\tau_2-\tau_1)$ represents a range-ambiguity time parameter; and
   the processor is configured to determine that the distance to the target is greater than the operating range if $(\Delta T_1-\Delta T_2)$ is approximately equal to $\Delta t$.

3. The lidar system of claim 1, wherein:
   $\Delta d=c\cdot(\tau_2-\tau_1)/2$ represents a range-ambiguity distance parameter, wherein c is a speed of light; and
   the processor is configured to determine that the distance to the target is greater than the operating range if $c\cdot(\Delta T_1-\Delta T_2)/2$ is approximately equal to $\Delta d$.

4. The lidar system of claim 1, wherein the processor is further configured to determine that the distance to the target is less than the operating range if $\Delta T_1$ is approximately equal to $\Delta T_2$.

5. The lidar system of claim 1, wherein the processor is further configured to determine:
   a preliminary distance $D_1$ associated with the first input optical signal, wherein $D_1$ is determined from an expression $D_1=c\cdot\Delta T_1/2$, wherein c is a speed of light; and
   a preliminary distance $D_2$ associated with the second input optical signal, wherein $D_2$ is determined from an expression $D_2=c\cdot\Delta T_2/2$.

6. The lidar system of claim 5, wherein the processor is further configured to determine that the distance to the target is less than the operating range of the lidar system if $D_1$ is approximately equal to $D_2$.

7. The lidar system of claim 6, wherein, in response to determining that the distance to the target is less than the operating range, the processor is further configured to:
   determine that the distance to the target associated with the second emitted optical signal is approximately equal to $D_1$; and
   determine that the distance to the target associated with the third emitted optical signal is approximately equal to $D_2$.

8. The lidar system of claim 5, wherein:
   $\Delta d=c\cdot(\tau_2-\tau_1)/2$ represents a range-ambiguity distance parameter, wherein c is a speed of light; and
   the processor is configured to determine that the distance to the target is greater than the operating range if $D_1-D_2$ is approximately equal to $\Delta d$.

9. The lidar system of claim 8, wherein, in response to determining that the distance to the target is greater than the operating range, the processor is further configured to:

determine a corrected distance $D'_1$ associated with the first emitted optical signal, wherein $D'_1$ is determined from an expression $D'_1 = D_1 + c \cdot \tau_1/2$; and determine a corrected distance $D'_2$ associated with the second emitted optical signal, wherein $D'_2$ is determined from an expression $D'_2 = D_2 + c \cdot \tau_2/2$.

10. The lidar system of claim 1, wherein, in response to determining that the distance to the target is greater than the operating range, the processor is further configured to:

determine a distance $D'_1$ to the target associated with the first emitted optical signal from an expression $D'_1 = c \cdot T_1/2$, wherein:

c is a speed of light; and $T_1$ which corresponds to a round-trip time for the first emitted optical signal to travel to the target and back to the lidar system, is determined from an expression $T_1 = (\tau_1 + \Delta T_1)$; and determine a distance $D'_2$ to the target associated with the second emitted optical signal from an expression $D'_2 = c \cdot T_2/2$, wherein $T_2$, which corresponds to a round-trip time for the second emitted optical signal to travel to the target and back to the lidar system, is determined from an expression $T_2 = (\tau_2 + \Delta T_2)$.

11. The lidar system of claim 1, wherein, in response to determining that the distance to the target is greater than the operating range, the processor is further configured to:

instruct the light source to emit a fourth optical signal;

instruct the light source to emit a fifth optical signal a time period $\tau_4$ after the fourth optical signal, wherein $\tau_4$ is greater than $(\tau_1 + \Delta T_1)$;

determine a time interval $\Delta T_4$ corresponding to a round-trip time for the fourth optical signal to travel to the target and back to the lidar system, wherein $\Delta T_4$ is less than $\tau_4$; and determine the distance to the target $D_4$ from an expression $D_4 = c \cdot \Delta T_4/2$, wherein c is a speed of light.

12. The lidar system of claim 1, wherein the processor is further configured to:

determine that the distance to the target is less than the operating range; and in response to determining that the distance to the target is less than the operating range:

determine a distance $D_1$ to the target associated with the first input optical signal from an expression $D_1 = c \cdot \Delta T_1/2$, wherein c is a speed of light; and determine a distance $D_2$ to the target associated with the second input optical signal from an expression $D_2 = c \cdot \Delta T_2/2$.

13. The lidar system of claim 1, wherein the distance to the target being greater than the operating range of the lidar system is associated with:

the first input optical signal comprising a portion of the first optical signal scattered by the target; and the second input optical signal comprising a portion of the second optical signal scattered by the target.

14. The lidar system of claim 1, wherein the distance to the target being less than the operating range of the lidar system is associated with:

the first input optical signal comprising a portion of the second optical scattered by the target; and the second input optical signal comprising a portion of the third optical signal scattered by the target.

15. The lidar system of claim 1, wherein:

the first input optical signal is detected after the second optical signal is emitted and before the third optical signal is emitted, wherein the time interval $\Delta T_2$ is less than the second time period $\tau_2$;

the emitted optical signals further comprise a fourth optical signal emitted a third time period $\tau_3$ after the third optical signal; and the second input optical signal is detected after the third optical signal is emitted and before the fourth optical signal is emitted, wherein the time interval $\Delta T_2$ is less than the third time period $\tau_3$.

16. The lidar system of claim 1, wherein:

the optical signals emitted by the light source comprise optical signals having two or more different time periods, wherein the first time period $\tau_1$ is a minimum time period of the two or more different time periods; and the operating range $R_{OP}$ of the lidar system is approximately $R_{OP} = c \cdot \tau_1/2$, wherein c is a speed of light.

17. The lidar system of claim 1, wherein the optical signals emitted by the light source comprise optical signals with time periods that alternate between the first time period $\tau_1$ and the second time period $\tau_2$.

18. The lidar system of claim 1, wherein the optical signals emitted by the light source comprise optical signals with time periods that alternate sequentially between M different time periods, wherein M is an integer greater than or equal to 2, and the M different time periods comprise the first time period $\tau_1$ and the second time period $\tau_2$.

19. The lidar system of claim 1, wherein the processor is configured to:

determine three or more time intervals, the three or more time intervals comprising the first and second time intervals, wherein each time interval corresponds to a duration of time between a time when an optical signal is emitted by the light source and a time when a subsequent input optical signal is detected by the receiver; and determine whether the distance to the target is greater than the operating range based at least in part on the three or more time intervals.

20. The lidar system of claim 1, wherein:

the emitted optical signals further comprise a fourth optical signal emitted a third time period $\tau_3$ after the third optical signal, wherein $\tau_3$ is different from $\tau_2$;

the receiver is further configured to detect a third input optical signal comprising light from one of the emitted optical signals that is scattered by the target, wherein the third input optical signal is detected a third time interval $\Delta T_3$ after the fourth optical signal is emitted; and the processor is configured to determine whether the distance to the target is greater than the operating range based at least in part on the time intervals $\Delta T_1$, $\Delta T_2$, and $\Delta T_3$.

21. The lidar system of claim 20, wherein:

the first time period $\tau_1$ is approximately equal to the third time period $\tau_3$; and the processor is configured to determine that the distance to the target is greater than the operating range if:

$\Delta T_1$ is approximately equal to $\Delta T_3$; and $(\Delta T_1 - \Delta T_2)$ is approximately equal to $(\tau_2 - \tau_1)$.

22. The lidar system of claim 20, wherein the processor is configured to determine that the distance to the target is greater than the operating range if:

$(\Delta T_1 - \Delta T_2)$ is approximately equal to $(\tau_2 - \tau_1)$; and $(\Delta T_2 - \Delta T_3)$ is approximately equal to $(\tau_3 - \tau_2)$.

23. The lidar system of claim 20, wherein the processor is further configured to determine that the distance to the target is less than the operating range if $\Delta T_1$, $\Delta T_2$, and $\Delta T_3$ are approximately equal.

24. The lidar system of claim 1, wherein the distance to the target being greater than the operating range of the lidar system corresponds to a range-ambiguity event.

25. The lidar system of claim 1, wherein, in response to determining that the distance to the target is greater than the operating range, the processor is further configured to tag a first pixel associated with the first input optical signal, wherein tagging the first pixel comprises indicating that the first pixel is range-wrapped.

26. The lidar system of claim 1, wherein in response to determining that the distance to the target is greater than the operating range, the processor is further configured to determine one or more corrected distances to the target.

27. The lidar system of claim 1, wherein during each of the first time interval $\Delta T_1$ and the second time interval $\Delta T_2$, the light source emits no other optical signals, and the receiver detects no other input optical signals.

28. The lidar system of claim 1, further comprising a scanner configured to scan the emitted optical signals along a scan pattern within the field of regard of the lidar system, wherein the first, second, and third optical signals correspond to respective first, second, and third pixels which are disposed in series on a scan line of the scan pattern.

29. The lidar system of claim 28, wherein the processor is configured to determine whether the distance to the target is greater than an operating range of the lidar system further based at least in part on one or more additional time intervals associated with one or more pixels located on one or more other scan lines of the scan pattern.

30. A method comprising:
emitting, by a light source of a lidar system, a plurality of optical signals directed into a field of regard of the lidar system, wherein the optical signals comprise:
a first optical signal;
a second optical signal emitted a first time period $\tau_1$ after the first optical signal; and
a third optical signal emitted a second time period $\tau_2$ after the second optical signal, wherein $\tau_2$ is different from $\tau_1$;
detecting, by a receiver of the lidar system, a first input optical signal and a second input optical signal, the first and second input optical signals each comprising light from one of the emitted optical signals that is scattered by a target located a distance from the lidar system;
determining, by a processor of the lidar system, a first time interval $\Delta T_1$ between a time when the second optical signal is emitted and a time when the first input optical signal is detected;
determining, by the processor, a second time interval $\Delta T_2$ between a time when the third optical signal is emitted and a time when the second input optical signal is detected; and
determining, by the processor, whether the distance to the target is greater than an operating range of the lidar system based at least in part on the time intervals $\Delta T_2$ and $\Delta T_2$.

* * * * *